US010280990B2

(12) United States Patent
Ono et al.

(10) Patent No.: US 10,280,990 B2
(45) Date of Patent: May 7, 2019

(54) VEHICLE TRANSMISSION DEVICE

(71) Applicant: HONDA MOTOR CO., Ltd., Tokyo (JP)

(72) Inventors: Junya Ono, Wako (JP); Yoshiaki Nedachi, Wako (JP); Tatsuya Ryuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 15/562,969

(22) PCT Filed: Mar. 30, 2015

(86) PCT No.: PCT/JP2015/060011
§ 371 (c)(1),
(2) Date: Sep. 29, 2017

(87) PCT Pub. No.: WO2016/157390
PCT Pub. Date: Oct. 6, 2016

(65) Prior Publication Data
US 2018/0112727 A1  Apr. 26, 2018

(51) Int. Cl.
*B60W 10/02* (2006.01)
*F16D 48/06* (2006.01)
(Continued)

(52) U.S. Cl.
CPC .......... *F16D 48/064* (2013.01); *B60W 10/02* (2013.01); *B60W 10/11* (2013.01); *B60W 10/30* (2013.01);
(Continued)

(58) Field of Classification Search
CPC . Y10T 477/753; Y10T 477/78; F16D 48/064; F16D 48/02; B60W 10/11;
(Continued)

(56) References Cited

U.S. PATENT DOCUMENTS 6,375,596 B1 * 4/2002 Steeby .................. B60W 10/06
192/103 F
8,725,372 B2 * 5/2014 Rinck ..................... F16D 48/06
192/3.55
(Continued)

FOREIGN PATENT DOCUMENTS

JP 2008-256190 A 10/2008
JP 2010-181014 A 8/2010
(Continued)

OTHER PUBLICATIONS

International Search Report & Written Opinion dated Jun. 23, 2015 corresponding to International Patent Application No. PCT/JP2015/060011, and English translation thereof.
(Continued)

*Primary Examiner* — Roger L Pang
(74) *Attorney, Agent, or Firm* — Squire Patton Boggs (US) LLP

(57) ABSTRACT

A clutch disengagement position is detectable with high precision even during speed change. A vehicle transmission device can include a transmission including a main shaft to which rotational power from an engine is inputted via a clutch, and a countershaft, a clutch operation member that is driven by an actuator and performs disengaging and engaging operations of the clutch, and a driving wheel to which rotational power of the countershaft is transmitted via a driving force transmitting device. A damper member deformed by a driving force is provided in the countershaft, the driving force transmitting device or the driving wheel, or among the countershaft, the driving force transmitting device and the driving wheel. A control device learns a clutch disengagement operation amount when the control device detects deceleration of a predetermined value of the rotational frequency of the main shaft.

10 Claims, 35 Drawing Sheets

(51) Int. Cl.
  *F16D 48/02* (2006.01)
  *B60W 10/11* (2012.01)
  *B60W 10/30* (2006.01)
  *F16H 63/30* (2006.01)
  *F16H 3/08* (2006.01)

(52) U.S. Cl.
  CPC ......... *F16D 48/02* (2013.01); *F16H 63/3043* (2013.01); *B60W 2510/102* (2013.01); *B60W 2510/104* (2013.01); *B60W 2510/1015* (2013.01); *B60W 2510/1045* (2013.01); *B60W 2710/021* (2013.01); *B60W 2710/0605* (2013.01); *F16H 3/08* (2013.01); *Y10T 477/753* (2015.01)

(58) Field of Classification Search
  CPC ........... B60W 10/02; B60W 2710/021; B60W 2510/1015; B60W 2510/102; B60W 2510/104; B60W 2510/1045
  USPC ......................................................... 701/68
  See application file for complete search history.

(56) References Cited

U.S. PATENT DOCUMENTS

| 9,926,989 B2 * | 3/2018 | Kim ..................... F16D 48/08 |
| 2013/0255415 A1 | 10/2013 | Adachi et al. |
| 2014/0136066 A1 * | 5/2014 | Cho ..................... F16D 48/06 701/68 |

FOREIGN PATENT DOCUMENTS

| JP | 2013-228079 A | 11/2013 |
| WO | WO 2010/090196 A1 | 8/2010 |

OTHER PUBLICATIONS

International Preliminary Report on Patentability dated Oct. 4, 2016 corresponding to International Patent Application No. PCT/JP2015/060011, and English translation thereof.

\* cited by examiner

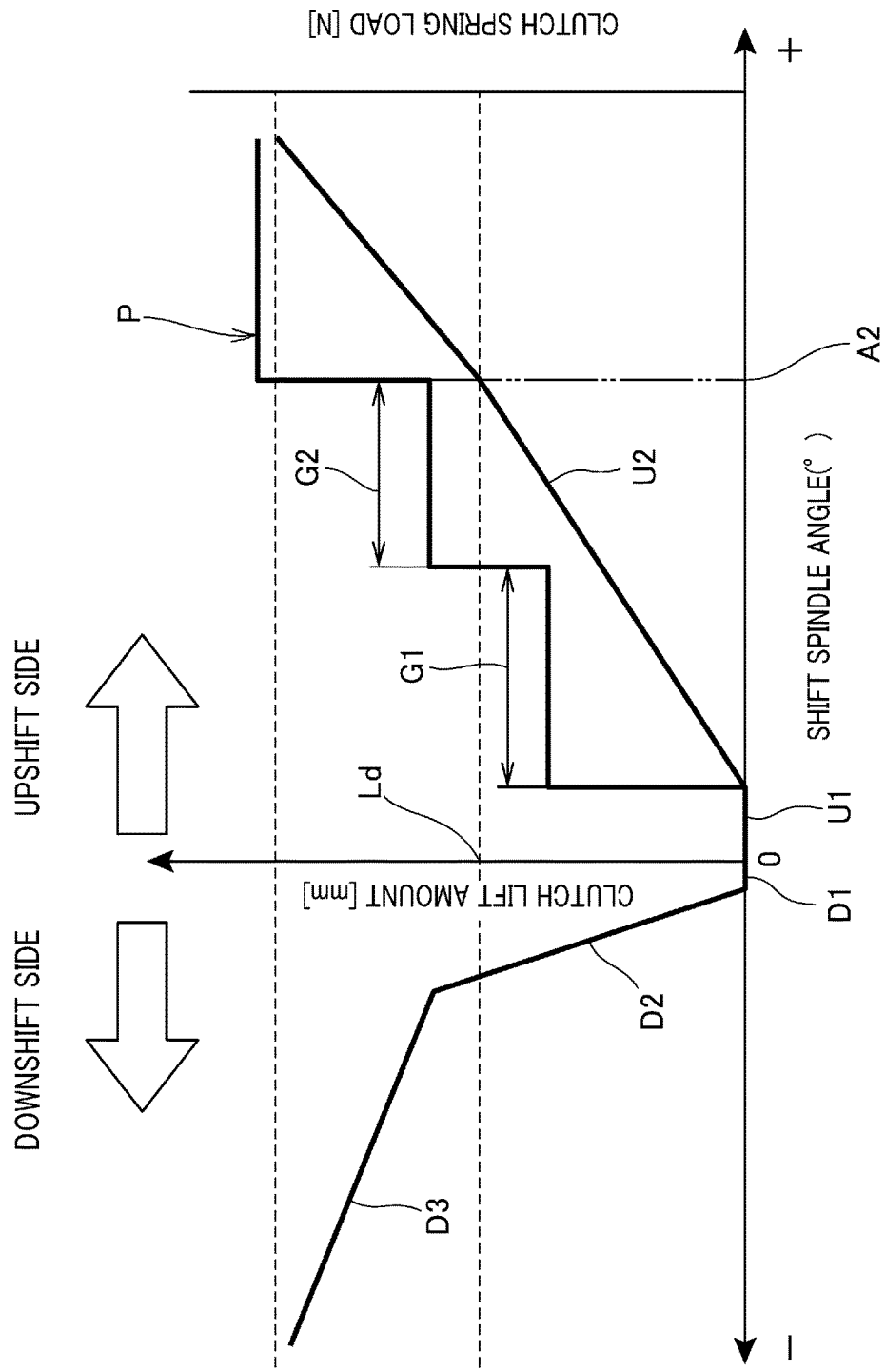

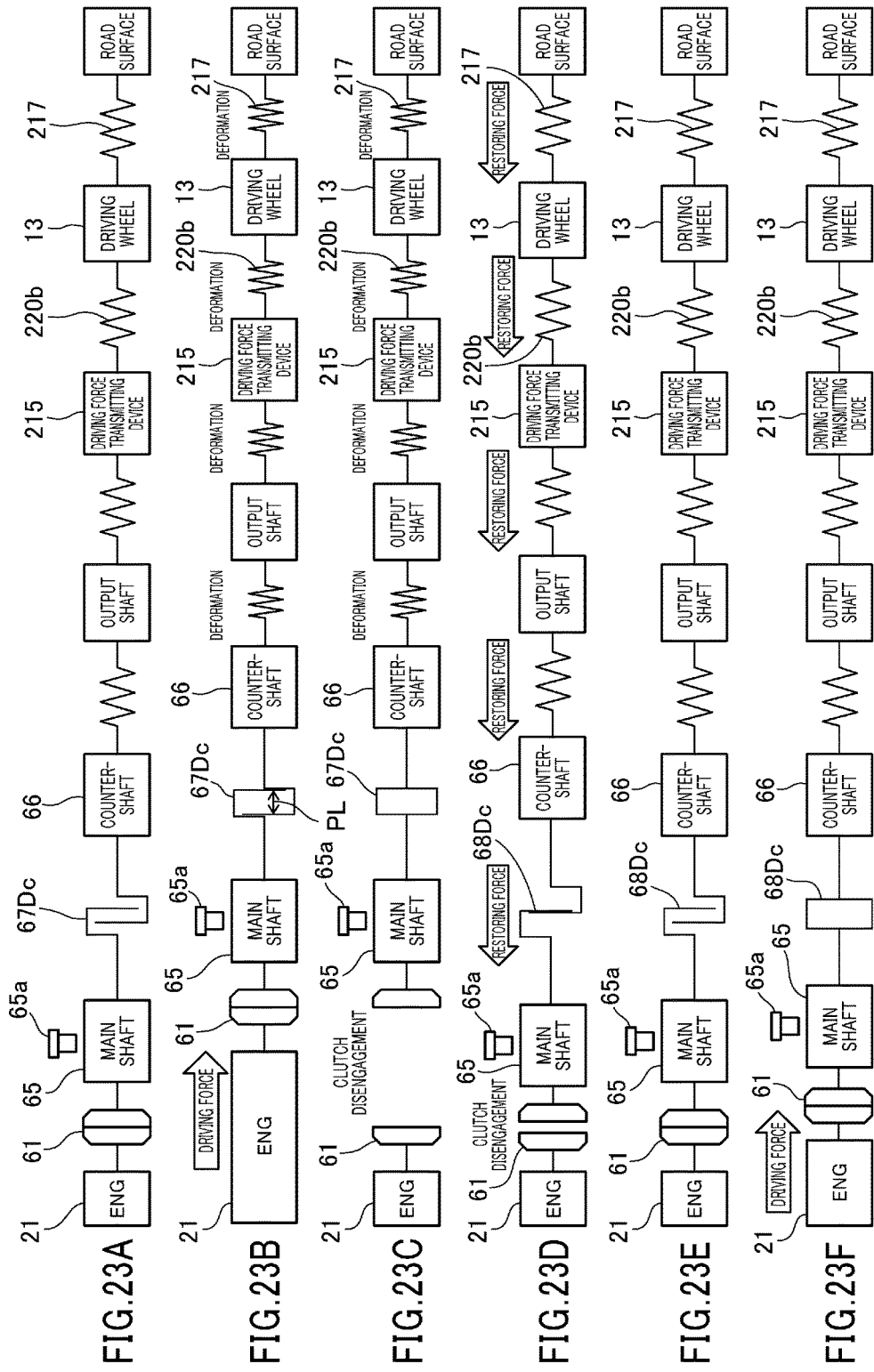

VEHICLE TRANSMISSION DEVICE

TECHNICAL FIELD

The present invention relates to a vehicle transmission device.

BACKGROUND ART

A conventional example discloses a motorcycle loaded with a so-called AMT (Automated Manual Transmission) transmission that performs a speed change operation, that is, a clutch operation and an operation of a change mechanism by electric power in a constant-mesh transmission. In the conventional example, rotational power from the engine is inputted to a main shaft of the transmission via a change clutch, is transmitted to a countershaft (also serving as an output shaft) via a constant-mesh gear, and is transmitted to a rear wheel as a driving wheel from the output shaft, through a driving force transmitting device configured by a driving/driven sprocket and a winding chain. The change clutch is operated to be disengaged and engaged by a clutch lever (a clutch operation member) provided at a motor-driven shift spindle (refer to Patent Literature 1, for example).

The conventional change mechanism includes a master arm, a shift drum rotated by the master arm, and a shift fork that is driven by the shift drum and moves a shifter gear forming a part of a gear train of the transmission in an axial direction. Further, on a shift spindle, a power storing mechanism is provided, which includes a gearshift arm that is provided to be relatively rotatable to the shift spindle and rotates the master arm, a power storage collar that rotates integrally with the shift spindle, and a power storage spring provided between the gear shift arm and the power storage collar.

When a speed change signal is outputted during traveling and the shift spindle rotates in the motorcycle including the power storing mechanism like this, the gear shift arm receives a load in a direction to rotate the master arm via the power storage spring from the power storage collar. However, until the change clutch is disengaged by the clutch lever, a frictional force is applied to dog teeth side surfaces by a travel driving force in the shifter gear in the gear train of the transmission, so that the shift fork cannot move the shifter gear. That is, the shift drum cannot rotate. Consequently, even if the shift spindle rotates, the gear shift arm does not rotate the master arm, and a load is stored with rotation of the power storage spring. When the clutch lever disengages the change clutch after that, the frictional force on the dog teeth side surfaces is released by the travel driving force in the shifter gear in the gear train of the transmission, and the gear shift arm, the master arm and the shift drum are rotated at once by the load stored in the power storage spring and the rotation angle. Thereby, the time required for change of the gear train can be shortened.

In the AMT system, it is usual that the operation amount of the clutch operation member with which the change clutch is disengaged is known in advance, in order to be able to use the operation amount in various kinds of clutch control. Further, when it is desired to detect the clutch disengagement position with high precision with tolerance variation of each transmission taken into consideration, the clutch disengagement position is detected by various methods for each transmission, and the detected clutch disengagement position is stored in a nonvolatile memory (EEPROM, or the like) of the ECU in some cases, in the period until the transmission is used in traveling after completion of assembly of the transmission.

CITATION LIST

Patent Literature

Patent Literature 1: Japanese Patent Laid-Open No. 2013-228079

SUMMARY OF INVENTION

Technical Problem

Incidentally, even when the AMT transmission is under using environment (speed change during ordinary use) of a driver, it is sometimes good to be able to detect or estimate the clutch disengagement position. For example, when the clutch disengagement position slightly changes due to aging or the external environment, the clutch disengagement position can be corrected if the clutch disengagement position at that point of time is known, or when the clutch disengagement position is significantly different as compared with a normal state of the transmission, the clutch disengagement position can be used in fault diagnosis.

Although the conventional example does not have a statement from the viewpoint like this, as the method of detecting the clutch disengagement position at the time of ordinary speed change, the method of estimating the clutch disengagement position with the rotation starting position of the shift drum as the reference is conceivable, for example. The reason of this is that in the speed change operation, a change operation is performed after clutch disengagement, and since the conventional example is provided with the power storing mechanism so as to perform the change operation quickly in speed change in the upshift direction, the rotation starting position of the shift drum tends to be significantly close to the clutch disengagement position. However, although the power storing mechanism is provided, there is a problem in precision in estimation of the clutch disengagement position even if the power storing mechanism is present, for the reasons that there is a time difference though it is very small until the change mechanism completes operation, and rotation of the shift drum becomes slow due to occurrence of dog hit in which the dog teeth top surfaces hit. Further, in the conventional example, the shift direction in which the power storing mechanism operates is only upshift, so that a clutch disengagement position at the downshift side cannot be estimated with high precision.

The present invention is made in the light of the aforementioned circumstances, and has an object to enable a clutch disengagement position to be detected with high precision even in speed change in ordinary use, in a constant mesh type transmission device.

Solution to Problem

In order to attain the above described object, the present invention is a vehicle transmission device including a transmission (60, 360, 460) including a main shaft (65, 365, 465) to which rotational power from an engine (21, 321, 421) is inputted via a clutch (61, 361, 461), and a countershaft (66, 366, 466) to which rotational power of the main shaft (65, 365, 465) is transmitted via a constant-mesh gear, a clutch operation member (76, 361*a*) that is driven by an actuator (75, 375) and performs disengaging and engaging operations of the clutch (61, 361, 461), a clutch operation amount detecting sensor (79, 375*a*) that detects an operation amount of the clutch operation member (76, 361*a*), a control device (17, 317) that operates the actuator (75, 375), and a driving wheel (13, 313, 413) to which rotational power of the countershaft (66, 366, 466) is transmitted via a driving force transmitting device (215, 315), wherein at least one of a main shaft rotation sensor (65*a*) that detects a rotational frequency (Nm) of the main shaft (65, 365, 465), or a countershaft rotation sensor (73) that detects a rotational frequency (Nc) of the countershaft (66, 366, 466) is provided, a damper member (13*c*, 15, 220) elastically deformed by a driving force is provided in at least any one of the countershaft (66, 366, 466), the driving force transmitting device (215, 315) and the driving wheel (13, 313, 413), or among the countershaft, the driving force transmitting device and the driving wheel, and the control device (17, 317) learns a clutch disengagement operation amount (θrls, Prls) of the clutch operation member (76, 361*a*) when the control device (17, 317) detects deceleration of a predetermined value (ΔNm1) or more of the rotational frequency (Nm) of the main shaft or the rotational frequency of the countershaft during a clutch operation.

According to the present invention, the damper member transmits the driving force to the downstream driving wheel side in the state in which the damper member is elastically deformed by the drive torque from the engine, but when the clutch is disengaged and the driving force from the engine is removed, the rotation of the main shaft is decelerated by a restoring force to the elastic deformation. Thereby, the rotational frequencies of the main shaft and the countershaft are reduced, the moment the clutch is disengaged. When the control device detects the deceleration of the predetermined value or more of the rotational frequency of the main shaft or the rotational frequency of the countershaft, the control device learns the clutch disengagement operation amount of the clutch operation member, so that the clutch disengagement position can be detected with high precision even in the speed change during ordinary use, based on the deceleration of the rotational frequency of the main shaft or the rotational frequency of the countershaft. The similar effect can be also obtained at the time of factory shipment or the like.

Further, in the present invention, a throttle valve (53) that adjusts an intake air amount by being opened and closed is provided in an intake pipe (52) that supplies intake air to the engine (21), and learning of the clutch disengagement operation amount (θrls, Prls) is executed when an opening degree of the throttle valve (53) is a predetermined opening degree (Th) or more.

According to the present invention, when the opening degree of the throttle valve is the predetermined opening degree or more, the restoring force of the damper member becomes large, and the deceleration of the rotational frequency of the main shaft or the rotational frequency of the countershaft becomes large. Consequently, learning of the clutch disengagement operation amount can be executed based on large deceleration of the rotational frequency of the main shaft or the rotational frequency of the countershaft, and the clutch disengagement position can be detected with high precision.

Further, in the present invention, an operation of the clutch operation member (76, 361*a*) is performed at a time of a speed change operation, and the control device (17, 317) stores a minimum rotational frequency (Nmmin) of the main shaft (65, 365, 465) or the countershaft (66, 366, 466) after occurrence of the deceleration of the predetermined value (ΔNm1) or more, and determines of propriety of learning of the clutch disengagement operation amount (θrls, Prls), by comparing a rotational frequency (Nmfin) of the main shaft (65, 365, 465) or the countershaft (66, 366, 466) at a time of end of absorption of a rotation difference of the clutch (61, 361, 461) and the minimum rotational frequency (Nmmin).

According to the present invention, the control device stores the minimum rotational frequency of the main shaft or the countershaft after occurrence of the deceleration of the predetermined value or more, and determines propriety of learning of the clutch disengagement operation amount by comparing the rotational frequency of the main shaft or the countershaft at the time of end of absorption of the rotational difference of the clutch and the minimum rotational frequency. Thereby, by comparison of the minimum rotational frequency after deceleration of rotation and the rotational frequency at the time of end of absorption of the rotational difference of the clutch, the clutch disengagement operation amount can be learned when deceleration is large, and the clutch disengagement position can be detected with high precision.

Further, in the present invention, the transmission (60, 360, 460) of a constant-mesh type is a dog clutch type transmission including a dog clutch (67Dc) provided to be engageable and disengageable by a drive side shifter gear (67*b*) that rotates integrally with the main shaft (65, 365, 465) and is movable in an axial direction, a drive side free gear (67*c*) that is rotatable relatively to the main shaft (65, 365, 465) and is fixed in the axial direction, and dog teeth (67*b*1, 67*c*1) that are provided to be raised in the axial direction from opposing surfaces of the drive side shifter gear (67*b*) and the drive side free gear (67*c*), and a dog clutch (68Dc) provided to be engageable and disengageable by a driven side shifter gear (68*c*) that rotates integrally with the countershaft (66, 366, 466) and is movable in the axial direction, a driven side free gear (68*b*) that is rotatable relatively to the countershaft (66, 366, 466) and is fixed in the axial direction, and dog teeth (68*b*1, 68*c*1) that are provided to be raised in the axial direction from opposing surfaces of the driven side shifter gear (68*c*) and the driven side free gear (68*b*), and the deceleration of the predetermined value (ΔNm1) or more is detected from the rotational frequency (Nm) of the main shaft (65, 365, 465).

According to the present invention, the constant-mesh transmission is the dog clutch type transmission including the main shaft and the countershaft, and the deceleration of the predetermined value or more is detected from the rotational frequency of the main shaft. In the dog clutch type transmission, a play is present in the circumferential direction of the dog clutch, so that when the driving force is removed, variation of the rotational frequency easily occurs at the main shaft side. Consequently, by detecting the deceleration of the predetermined value or more from the rotational frequency of the main shaft, the clutch disengagement position can be detected with high precision.

Further, in the present invention, the rotational frequency (Nm) of the main shaft (65, 365, 465) is a value obtained by multiplying an actual rotational frequency of the main shaft (65, 365, 465) detected by the main shaft rotation sensor (65*a*) by a deceleration ratio between the main shaft (65, 365, 465) and a crankshaft (23) of the engine (21, 321, 421), and when the control device (17, 317) detects that the rotational frequency (Nm) of the main shaft (65, 365, 465) momentarily becomes a rotational frequency substantially equal to an engine speed (Ne) of the engine (21, 321, 421) while engaging the clutch (61, 361, 461), the control device (17, 317) calculates a time period between a time of the detection and a time at which the deceleration of the predetermined value (ΔNm1) or more starts, as a driving force removal time period (V1m).

According to the present invention, the rotational frequency (Nm) of the main shaft (65, 365, 465) is the value obtained by multiplying the actual rotational frequency of the main shaft (65, 365, 465) detected by the main shaft rotation sensor (65a) by the deceleration ratio of the main shaft (65, 365, 465) and the crankshaft (23) of the engine (21, 321, 421), and when the control device (17, 317) detects that the rotational frequency (Nm) of the main shaft (65, 365, 465) momentarily becomes the rotational frequency substantially equal to the engine speed (Ne) of the engine (21, 321, 421) while engaging the clutch (61, 361, 461), the control device calculates the time period between the time of the detection and the time at which the deceleration of the predetermined value (ΔNm1) or more starts, as the driving force removal time period (V1m). Thereby, the time period between the time of start of the deceleration of the predetermined value or more and the time at which the rotational frequency of the main shaft momentarily increases at the time of engagement of the clutch can be calculated as the driving force removal time period, and the driving force removal time period can be easily detected from the change of the rotational frequency of the main shaft.

Further, in the present invention, the driving force transmitting device (215) includes a drive sprocket (72) provided at a side of the countershaft (66), a driven sprocket (216) provided at a side of the driving wheel (13), and a chain (15) that is wound between the drive sprocket (72) and the driven sprocket (216), and the damper member (220) is provided between a hub (13a) of the driving wheel (13) and the driven sprocket (216).

According to the present invention, the damper member is provided between the hub of the driving wheel and the driven sprocket. The damper member provided between the hub of the driving wheel and the driven sprocket has a relatively large deformation amount by the driving force, so that deceleration of the rotational frequencies of the main shaft and the countershaft by the restoring force becomes large. Consequently, the clutch disengagement position can be detected with high precision based on the deceleration of the rotational frequencies.

Further, in the present invention, the driving force transmitting device (315) includes a first bevel gear (306) provided at a side of the countershaft (366), a second bevel gear (307) provided at a side of the driving wheel, and a drive shaft (304) provided between the first bevel gear (306) and the second bevel gear (307), and the damper member (304c) is provided between an outer pipe (304a) and an inner pipe (304b) that configure the drive shaft (304).

According to the present invention, the damper member is provided between the outer pipe and the inner pipe that configure the drive shaft. The damper member provided between the outer pipe and the inner pipe of the drive shaft has a relatively large deformation amount by the driving force, so that deceleration of the rotational frequencies of the main shaft and the countershaft by the restoring force also becomes large. Consequently, the clutch disengagement position can be detected with high precision based on the deceleration of the rotational frequencies.

Further, in the present invention, an output shaft (308) is provided separately from or integrally with the countershaft (366), and the damper member is configured as a cam damper (331) provided at a side of the output shaft.

According to the present invention, the damper member is configured as the cam damper provided at the output shaft side. The cam damper has the relatively large deformation amount by the driving force, so that deceleration of the rotational frequencies of the main shaft and the countershaft by the restoring force also becomes large. Consequently, the clutch disengagement position can be detected with high precision based on the deceleration of the rotational frequencies.

Further, in the present invention, a block portion (417b) is integrally formed on a tire (417) of the driving wheel (413), and the damper member is configured by the block portion (417b).

According to the present invention, the damper member is configured by the block portion of the tire, so that the damper member can be provided, with the simple configuration.

Further, the tire of the driving wheel is a balloon tire (417) with an air pressure of 70 kPa or less.

According to the present invention, the tire of the driving wheel is the balloon tire with the air pressure of 70 kPa or less, so that the tire itself can be caused to function as the damper member, and the damper member can be provided, with the simple configuration.

Advantageous Effects of Invention

In the vehicle transmission device according to the present invention, the clutch disengagement position can be detected with high precision even in speed change during ordinary use, based on the deceleration of the rotational frequency of the main shaft or the rotational frequency of the countershaft.

Further, learning of the clutch disengagement operation amount can be executed based on large deceleration of the rotational frequency of the main shaft or the rotational frequency of the countershaft in the case of the opening degree of the throttle valve being large, and the clutch disengagement position can be detected with high precision.

Further, the clutch disengagement operation amount can be learned when deceleration is large by comparison of the minimum rotational frequency after deceleration of rotation and the rotational frequency at the time of end of absorption of the rotation difference of the clutch, and the clutch disengagement position can be detected with high precision.

Further, by detecting the deceleration of the predetermined value or more from the rotational frequency of the main shaft where variation of the rotational frequency easily occurs, the clutch disengagement position can be detected with high precision.

Further, the driving force removal time period can be calculated easily based on the variation of the rotational frequency of the main shaft.

Further, the clutch disengagement position can be detected with high precision based on deceleration of the rotational frequencies of the main shaft and the countershaft by the restoring force of the damper member provided between the hub of the driving wheel and the driven sprocket.

Further, the clutch disengagement position can be detected with high precision based on deceleration of the rotational frequencies of the main shaft and the countershaft by the restoring force of the damper member provided between the outer pipe and the inner pipe of the drive shaft.

Further, the clutch disengagement position can be detected with high precision based on the deceleration of the rotational frequencies of the main shaft and the countershaft by the restoring force of the cam damper.

Further, the damper member can be provided, with the simple configuration by the block portion of the tire.

Further, the damper member can be provided, with the simple configuration by the balloon tire.

BRIEF DESCRIPTION OF THE DRAWINGS

FIG. 7 is a diagram illustrating a lift amount of a lifter cam plate to the rotation angle of the shift spindle.

FIG. 12A is a front view, and FIG. 12B is a sectional view taken along XII-XII.

FIG. 15A is a neutral state, and FIGS. 15B to 15D are states in which a rotation amount of the shift spindle is further increased in sequence.

FIG. 19A illustrates a state normally shifted in a downshift direction, and FIG. 19B illustrates a state returning to a neutral position side from the state in FIG. 19A.

FIGS. 23A to 23F are conceptual diagrams illustrating a transmitting state of a driving force of an engine from the engine to a road surface.

DESCRIPTION OF EMBODIMENTS

Hereinafter, one embodiment of the present invention will be described with reference to the drawings.

[First Embodiment]

Figure 1:
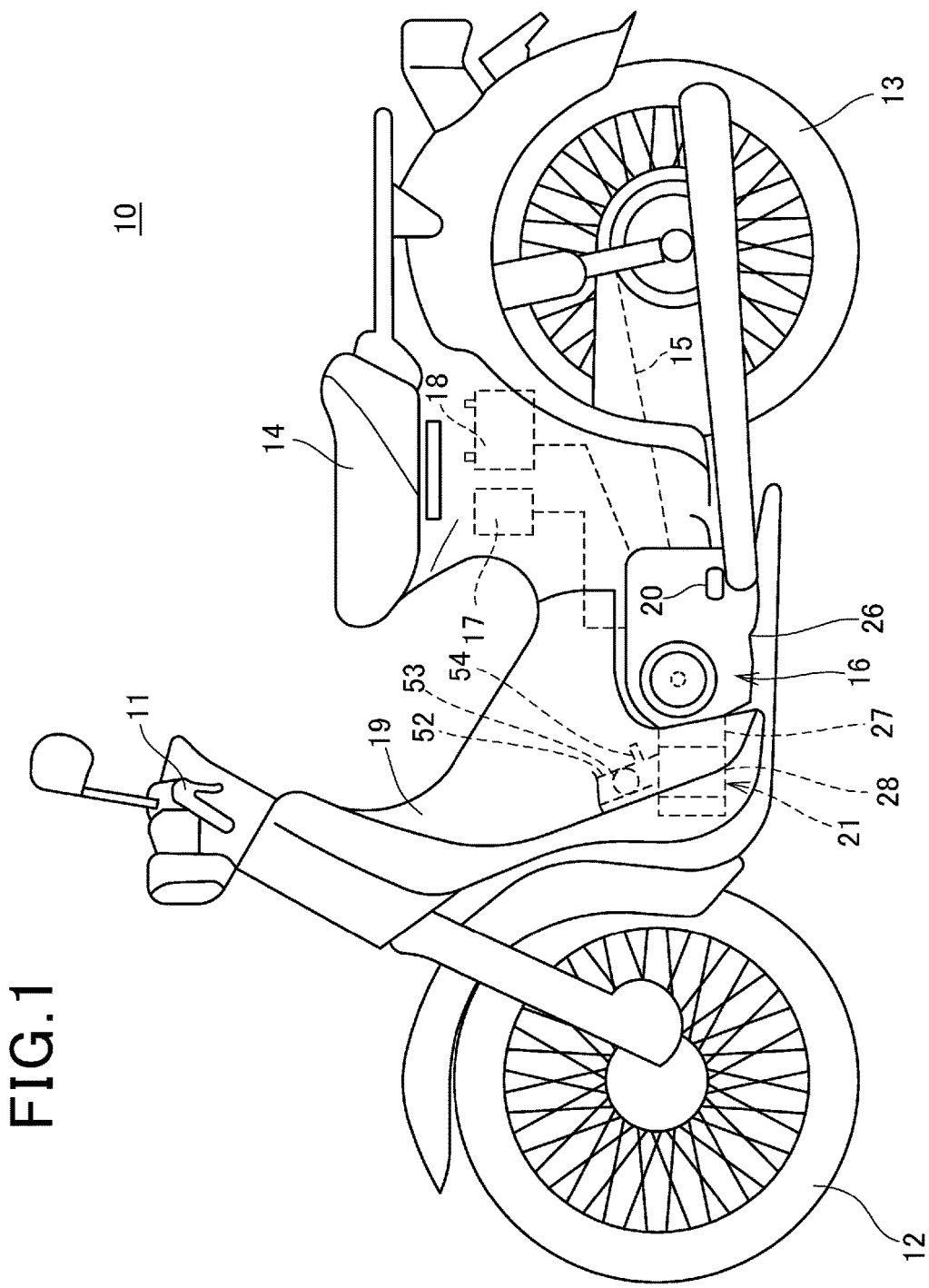
FIG. 1 is a left side view of a motorcycle including an automatic transmission device according to an embodiment of the present invention.

FIG. 1 is a left side view of a motorcycle 10 including an automatic transmission device 25 according to a first embodiment of the present invention.

The motorcycle 10 (vehicle) includes a handle 11 pivotally supported on a head pipe (not illustrated) rotatably, a front wheel 12 steered by the handle 11, a rear wheel 13 that is a driving wheel, a seat 14 on which a driver is seated, a power unit 16 that supplies a driving force to the rear wheel 13 via a chain 15 (a damper member), a control unit 17 (a control device) that conducts control of the power unit 16, and a battery 18.

The motorcycle 10 is configured with a vehicle body frame not illustrated as a base, and the vehicle body frame is covered with a vehicle body cover 19. The control unit 17 and the battery 18 are disposed inside the vehicle body cover 19, under the seat 14. The power unit 16 is provided slightly forward from below the seat 14, substantially in the middle between the front wheel 12 and the rear wheel 13. A pair of left and right steps 20 for a driver are provided at a lower portion of the power unit 16.

Next, a configuration of the power unit 16 will be described.

Figure 2:
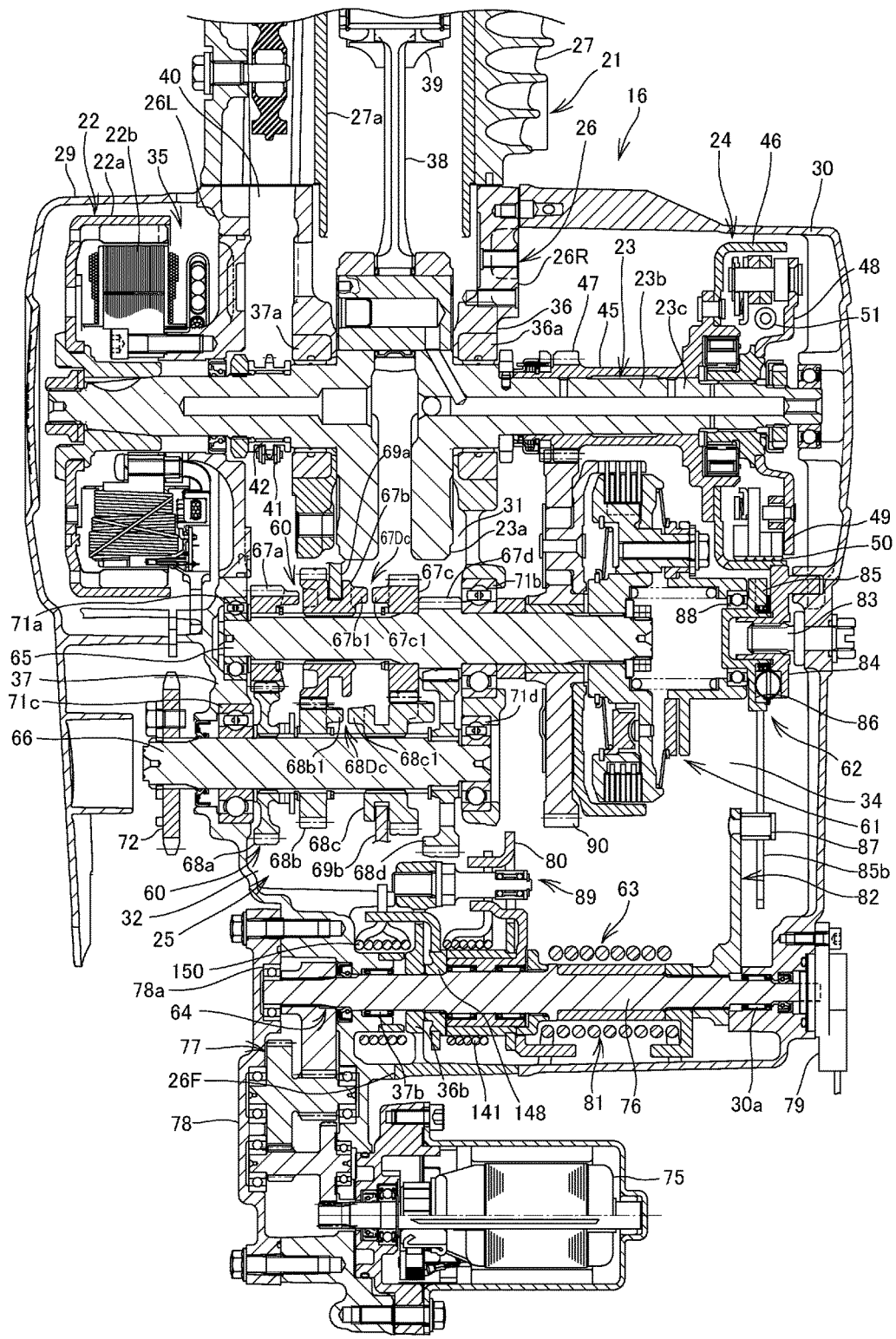
FIG. 2 is a sectional view of a power unit.

FIG. 2 is a sectional view of the power unit 16. In FIG. 2, a lateral direction of the paper surface corresponds to a vehicle width direction, an upward direction corresponds to a front of a vehicle, and a downward direction corresponds to a rear of the vehicle.

The power unit 16 includes an engine 21 generating a travel driving force, a power generator 22, a starting clutch 24 provided at a crankshaft 23 of the engine 21, and an automatic transmission device 25 (a transmission device) that changes a speed of a driving force of the crankshaft 23 outputted via the starting clutch 24 to output the driving force.

The engine 21 is configured by integrally connecting a crankcase 26 (a case member), a cylinder 27 and a cylinder head 28.

As illustrated in FIG. 1, an intake pipe 52 extending from an air cleaner box (not illustrated) is connected to an intake port of the cylinder head 28. The intake pipe 52 is provided with an electronically controlled throttle valve 53 that adjusts an amount of air that is supplied to the engine 21. A fuel injection valve 54 is provided downstream of the throttle valve 53 in the intake pipe 52.

The crankcase 26 is configured by being laterally divided into two parts in the vehicle width direction on a plane orthogonal to the crankshaft 23, and includes one side case half body 26L at a left side, and the other side case half body 26R at a right side. Further, the engine 21 includes a power generator cover 29 that covers the one side case half body 26L from the left side, and a clutch cover 30 that covers the other side case half body 26R from a right side.

The one side case half body 26L and the other side case half body 26R are matched on a matching surface 26F (a matching portion), and are connected by a plurality of case connecting bolts (not illustrated) extending in the vehicle width direction.

A crank chamber 31 that houses the crankshaft 23 is provided in a front part in the crankcase 26, and a transmission chamber 32 is provided behind the crank chamber 31 in the crankcase 26. The transmission chamber 32 is demarcated by a wall portion 37 (a wall portion of the case member, an outer wall) of the one side case half body 26L configuring a left side surface of the crankcase 26, and a wall portion 36 (an inner wall) of the other side case half body 26R configuring a right side surface of the crankcase 26.

A clutch chamber 34 is provided at right sides of the crank chamber 31 and the transmission chamber 32, and a power generator chamber 35 is provided at a left side of the crank chamber 31. The clutch chamber 34 is demarcated by an outer side surface of the wall portion 36 of the other side case half body 26R and an inner surface of the clutch cover 30. The power generator chamber 35 is demarcated by an outer side surface of the wall portion 37 of the one side case half body 26L and an inner surface of the power generator cover 29.

The crankshaft 23 has a crank web 23a, and a shaft portion 23b extending to both sides in the vehicle width direction from the crank web 23a. In the crankshaft 23, the crank web 23a is disposed in the crank chamber 31, and the shaft portion 23b is pivotally supported by bearing portions 36a and 37a respectively provided in the wall portion 36 and the wall portion 37. A connecting rod 38 is connected to the crank web 23a via a crankpin, a piston 39 that is connected to a tip end of the connecting rod 38 reciprocates inside a cylinder bore 27a of the cylinder 27.

One end of the shaft portion 23b of the crankshaft 23 extends to the power generator chamber 35, and a rotor 22a of the power generator 22 is fixed to the one end. A stator 22b of the power generator 22 is fixed to the one side case half body 26L.

The wall portion 37 includes a cam chain chamber 40 inside. A cam chain 41 that drives a valve mechanism (not illustrated) of the cylinder head 28 is wound on a valve drive sprocket 42 at the shaft portion 23b through the cam chain chamber 40.

The other end 23c of the shaft portion 23b of the crankshaft 23 extends to the clutch chamber 34, and the centrifugal type starting clutch 24 is provided at a tip end portion of the other end 23c.

The starting clutch 24 connects and disconnects the crankshaft 23 and the automatic transmission device 25. at a starting time and a stopping time.

The starting clutch 24 includes a cup-shaped outer case 46 fixed to one end of a sleeve 45 relatively rotatable to an outer periphery of the crankshaft 23, a primary gear 47 provided on an outer periphery of the sleeve 45, an outer plate 48 fixed to a right end portion of the crankshaft 23, a shoe 50 mounted to an outer peripheral portion of the outer plate 48 via a weight 49 so as to face outward in a radial direction, and a spring 51 for urging the shoe 50 inward in the radial direction. In the starting clutch 24, the outer case 46 and the shoe 50 separate from each other when an engine speed is at a predetermined value or less, and the crankshaft 23 and the automatic transmission device 25 are in a shutoff state (a disengaged state in which power is not transmitted). When the engine speed increases and exceeds the predetermined value, the weight 49 moves outward in the radial direction against the spring 51 by a centrifugal force, whereby the shoe abuts on an inner peripheral surface of the outer case 46. Thereby, the sleeve 45 is fixed onto the crankshaft 23 with the outer case 46, and rotation of the crankshaft 23 is transmitted to the automatic transmission device 25 via the primary gear 47.

In the automatic transmission device 25, switch of a change clutch 61 described later, and switch of a speed stage (shift) are performed automatically.

The automatic transmission device 25 includes a four speed forward constant-mesh transmission 60, the change clutch 61 (the clutch) that switches connection between the crankshaft 23 side and the transmission 60, a clutch operation mechanism 62 that operates the change clutch 61, a gear change mechanism 63 that shifts the transmission 60, and an actuator mechanism 64 that drives the clutch operation mechanism 62 and the gear change mechanism 63. The actuator mechanism 64 is controlled by the control unit 17 (FIG. 1).

The automatic transmission device 25 is connected to a mode switch 132b (FIG. 9) that performs switch of an automatic transmission (AT) mode and a manual transmission (MT) mode, and a shift select switch 132a (FIG. 9) for a driver to operate upshift and downshift. The automatic transmission device 25 is configured to control the actuator mechanism 64 in response to output signals from the respective sensors, the mode switch 132b and the shift select switch 132a under a control by the control unit 17, and can switch the speed stage of the transmission 60 automatically or semi-automatically.

That is, in the automatic transmission mode, control of the actuator mechanism 64 is performed based on a vehicle speed or the like, and the transmission 60 is shifted automatically. In the manual transmission mode, speed change is performed by the shift select switch 132a being operated by the driver.

The transmission 60 changes speed of rotation that is supplied from the change clutch 61 based on an instruction of the control unit 17 and transmits the rotation to the rear wheel 13. The transmission 60 includes a main shaft 65 as an input shaft, a countershaft 66 disposed parallel with the main shaft 65, drive gears 67a, 67b, 67c and 67d (a drive gear train) provided on the main shaft 65, and driven gears 68a, 68b, 68c and 68d (a driven gear train) provided on the countershaft 66. The drive gears 67a, 67b, 67c and 67d and the driven gears 68a, 68b. 68c and 68d are constant-mesh gears.

The drive gears 67a, 67b, 67c and 67d are meshed with the driven gears 68a, 68b, 68c and 68d in this order. When the drive gear 67b slides laterally, dog teeth on a side surface engage with the adjacent drive gear 67a or 67c, and when the driven gear 68*c* slides laterally, dog teeth on a side surface engage with the adjacent driven gear 68*b* or 68*d*.

The drive gears 67*a* and 67*c* (drive side free gears) and the driven gears 68*b* and 68*d* (driven side free gears) are free gears that are respectively held rotatably to the main shaft 65 and the countershaft 66 and are unmovable in the axial direction.

The drive gear 67*b* (the drive side shifter gear) and the driven gear 68*c* (the driven side shifter gear) are shifter gears that are spline-connected to the main shaft 65 and the countershaft 66 to be incapable of rotating, and are slidable in the axial direction.

The drive gear 67*d* and the driven gear 68*a* are fixed gears that are fixed to the main shaft 65 and the countershaft 66.

For example, when the drive gear 67*b* which is the shifter gear is slid to the side of the drive gear 67*c* which is the free gear by the gear change mechanism 63, dog teeth 67*b*1 and 67*c*1 that are provided to be raised on side surfaces facing each other of the drive gear 67*b* and the drive gear 67*c* are meshed with one another on mutual side portions, and thereby the drive gear 67*b* and the drive gear 67*c* are connected. Thereby, the drive gear 67*c* which is a free gear is fixed onto the main shaft 65 to be incapable of rotating by the drive gear 67*b* that is incapable of rotating relatively to the main shaft 65, and a speed stage by the drive gear 67*c* and the driven gear 68*c* is established. A plurality of dog teeth 67*b*1 and a plurality of dog teeth 67*c*1 are respectively formed at intervals in circumferential directions, and configure a dog clutch 67Dc that connects the drive gear 67*b* and the drive gear 67*c* to be engageable and disengageable.

Further, the driven gear 68*c* and the driven gear 68*b* respectively include dog teeth 68*c*1 and 68*b*1 that are provided to be raised on side surfaces facing each other. A plurality of dog teeth 68*c*1 and a plurality of dog teeth 68*b*1 are respectively formed at intervals in circumferential directions, and configure a dog clutch 68Dc that connects the driven gear 68*c* and the driven gear 68*b* to be engageable and disengageable.

Further, the drive gear 67*b* and the drive gear 67*a*, and the driven gear 68*c* and the driven gear 68*d* are respectively connected by similar dog clutches provided on side surfaces to be engageable and disengageable.

The main shaft 65 is rotatably supported by bearings 71*a* and 71*b*, and the countershaft 66 is rotatably supported by 71*c* and 71*d*.

A drive sprocket 72 is provided at an end portion of the countershaft 66, and the drive sprocket 72 transmits rotation to the rear wheel 13 via the chain 15. Further, in a vicinity of the countershaft 66, a countershaft rotational frequency sensor 73 (FIG. 9) that detects a rotational frequency of the countershaft 66 in a noncontact manner is provided. The control unit 17 calculates a vehicle speed from a detection value of the countershaft rotational frequency sensor 73. Further, in a vicinity of the main shaft 65, a main shaft rotational frequency sensor 65*a* (FIG. 9) that detects a rotational frequency of the main shaft 65 in a noncontact manner is provided.

Figure 3:
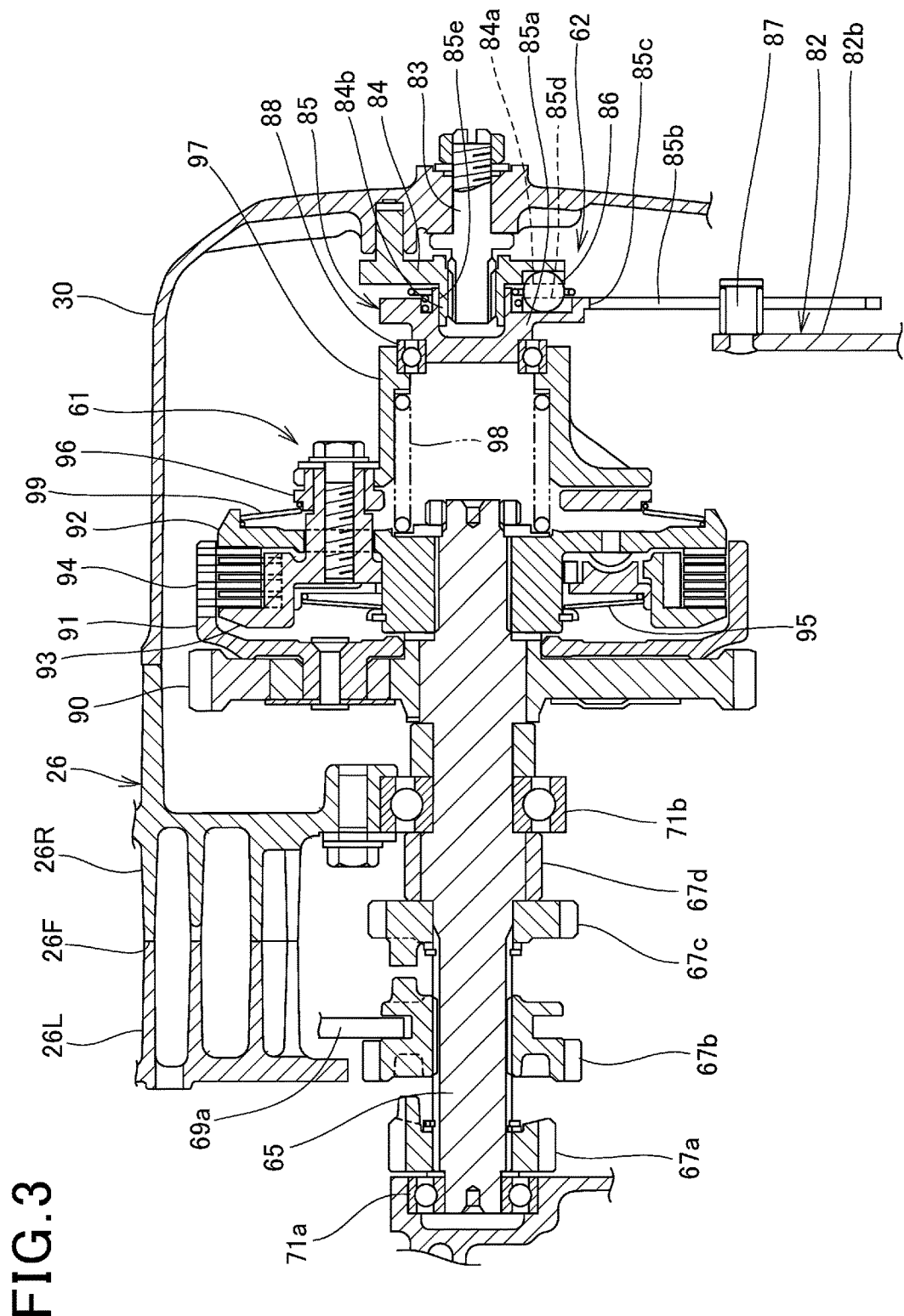
FIG. 3 is a sectional view illustrating a gear change mechanism, an actuator mechanism, a change clutch and a clutch operation mechanism.

FIG. 3 is a sectional view illustrating the change clutch 61 and the clutch operation mechanism 62.

Referring to FIG. 2 and FIG. 3, an actuator mechanism 64 includes a shift motor 75 as an actuator, a shift spindle 76 extending in the vehicle width direction in the crankcase 26, and a speed reduction gear train 77 that reduces speed of rotation of the shift motor 75 to drive the shift spindle 76. One end in the axial direction of the speed reduction gear train is supported by an outer side surface of the wall portion 37 of the one side case half body 26L, and the other end is supported by a cover 78 that covers the wall portion 37 from an outer side.

The shift spindle 76 is provided to penetrate through the clutch chamber 34, has both ends pivotally supported by bearings 78*a* and 30*a* that are respectively provided at the cover 78 and the clutch cover 30, and also has an intermediate portion pivotally supported by a bearing 37*b* provided at the wall portion 37 of the one side case half body 26L. The clutch cover 30 is provided with a shift spindle angle sensor 79 (a clutch operation amount detecting sensor) that detects a rotation position of the shift spindle 76.

The gear change mechanism 63 includes a change mechanism 89 that changes a speed stage by sliding the drive gear 67*b* and the driven gear 68*c*, and a power storing mechanism 81 that stores power in a power storage spring 145 (FIG. 10) described later by rotation of the shift spindle 76, and thereafter releases the stored power to rotate the change mechanism 89 at once. The shift spindle 76 is shared by the power storing mechanism 81 and the clutch operation mechanism 62.

The change mechanism 89 includes a master arm 80 that is supported by the shift spindle 76 and rotated by the power storing mechanism 81, a shift drum 70 (FIG. 13) that rotates in association with rotation of the master arm 80, shift forks 69*a* and 69*b* that connects the shift drum 70 to the drive gear 67*b* and the driven gear 68*c* which are the shifter gears, and a support shaft (not illustrated) that holds the shift forks 69*a* and 69*b* slidably in the axial direction.

The shift drum 70 includes a plurality of grooves 70*a* (FIG. 13) in shapes corresponding to shift patterns, on an outer circumferential portion, and one ends of the shift forks 69*a* and 69*b* are connected to the groove 70*a*.

When the shift drum 70 is driven by the actuator mechanism 64 to rotate, the shift forks 69*a* and 69*b* move in the axial direction along the groove 70*a* of the shift drum 70, and the drive gear 67*b* and the driven gear 68*c* are slid in accordance with the speed stage.

In the transmission 60, in accordance with slide of the drive gear 67*b* and the driven gear 68*c*, a neutral state, or power transmission selectively using a speed gear pair of any one of a first speed to a fourth speed is enabled, between the main shaft 65 and the countershaft 66.

The clutch operation mechanism 62 includes a clutch lever 82 fixed onto the shift spindle 76, a support shaft 83 fixed onto an inner surface of the clutch cover 30 in a positional relationship substantially coaxial with the main shaft 65, a plate-shaped base member 84 fixed to the support shaft 83, a lifter cam plate 85 that is an operation member that is connected to the clutch lever 82 and is provided to face the base member 84, and a plurality of balls 86 that are sandwiched between the lifter cam plate 85 and the base member 84.

The clutch lever 82 includes a cylinder portion 82*a* provided on the shift spindle 76 adjacently to the power storing mechanism 81, and a lever portion 82*b* that extends outward in a radial direction from the cylinder portion 82*a*. The clutch lever 82 rotates integrally with the shift spindle 76.

The lifter cam plate 85 includes a pressing operation portion 85*a* facing the base member 84, a connection arm portion 85*b* that extends from the pressing operation portion 85*a* and is connected to the lever portion 82*b* of the clutch lever 82, and a cam hole portion 85*c* formed in the connection arm portion 85*b*. The lifter cam plate 85 is connected to the clutch lever by a pin 87 provided at a tip end of the lever portion 82b of the clutch lever 82 being inserted through the cam hole portion 85c.

Cam portions 85d and 84a in inclined surface shapes are respectively formed on surfaces facing each other of the pressing operation portion 85a and the base member 84, and the ball 86 is sandwiched between the cam portions 85d and 84a. Movement in the axial direction of the lifter cam plate 85 is guided by a guide shaft 84b of the base member 84 being fitted in a guide hole 85e provided in a center. Further, a ball bearing 88 is provided at a tip end portion of the pressing operation portion 85a, and the lifter cam plate 85 is connected to the change clutch 61 via the ball bearing 88.

When the clutch lever 82 is rotated, the lifter cam plate 85 is rotated around the guide shaft 84b via the pin 87, and moves (lifts) in the axial direction by the cam portion 85d sliding with respect to the ball 86. The change clutch 61 is engaged and disengaged in association with the movement in the axial direction of the lifter cam plate 85. The lifter cam plate 85 moves in a direction to disengage the clutch irrespective of which direction the shift spindle 76 rotates, an upshift direction or a downshift direction, from the normal position.

Figure 4:
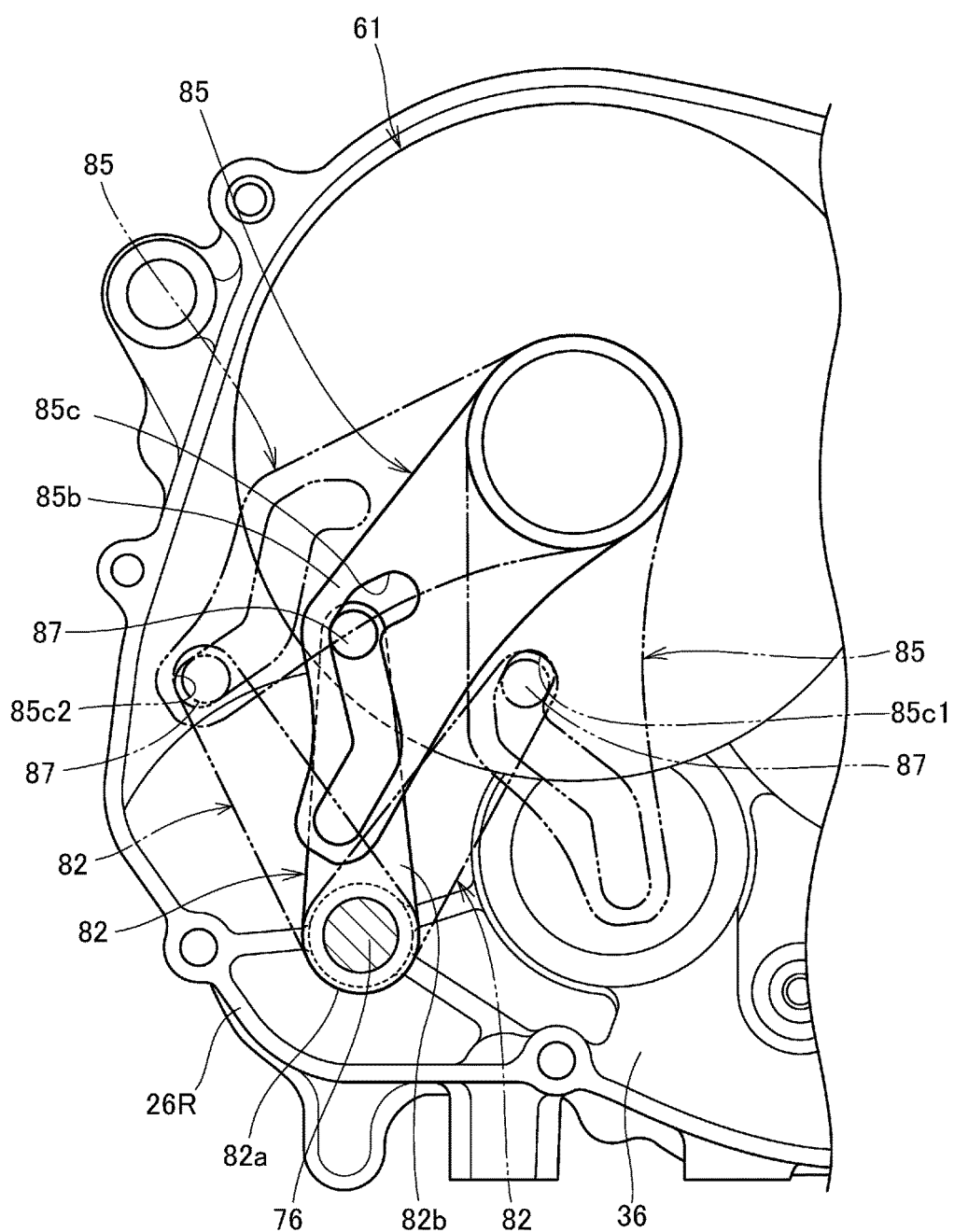
FIG. 4 is a side view illustrating an operation state of a clutch lever and a lifter cam plate.

FIG. 4 is a side view illustrating an operation state of the clutch lever 82 and the lifter cam plate 85.

The cam hole portion 85c of the lifter cam plate is formed into a shape bent along a longitudinal direction of the connection arm portion 85b. The pin 87 of the clutch lever 82 moves in the cam hole portion 85c with rotation of the shift spindle 76, whereby the lifter cam plate 85 rotates. That is, a moving amount in the axial direction per unit rotation amount of the lifter cam plate 85 can be set by a shape of the cam hole portion 85c, and thereby, characteristics of disengagement and engagement of the change clutch 61 can be adjusted.

The shift spindle 76 is in a neutral position at an ordinary time when the shift spindle 76 does not perform operations of upshift and downshift. In the neutral position, the clutch lever 82 extends upward substantially vertically from the shift spindle 76, and the pin 87 is located midway in the cam hole portion 85c.

In the case of upshifting, the shift spindle 76 is rotated in a clockwise direction (an upshift direction) in FIG. 4 from the neutral position, and the pin 87 is located at an inner end portion 85c1 of the cam hole portion 85c.

In the case of downshifting, the shift spindle 76 is rotated in a counterclockwise direction (a downshift direction) in FIG. 4 from the neutral position, and the pin 87 is located at an outer end portion 85c2 of the cam hole portion 85c.

In the case of performing upshift, the control unit 17 rotates the shift motor 75, and rotates the shift spindle 76 in the upshift direction. With rotation of the shift spindle 76, power storage of the power storing mechanism 81 is started, and when the shift spindle 76 rotates by a predetermined amount, the change clutch 61 is disengaged by rotation of the clutch lever 82. Stored power is released with disengagement of the change clutch 61, the shift drum 70 rotates by the master arm 80 rotating, and the gear position is upshifted by one stage.

Further, in the case of performing downshift, the control unit 17 rotates the shift motor 75, and rotates the shift spindle 76 in the downshift direction. At the time of downshift, power storage by the power storing mechanism 81 is not performed. At the time of downshift, the clutch lever 82 rotates and the change clutch 61 is disengaged with rotation of the shift spindle 76, after which, the master arm 80 rotates in the downshift direction. Thereby, the sift drum 70 rotates, and the gear position is downshifted by one stage.

At a time of upshifting and downshifting, the shift spindle 76 is rotated in the reverse direction after a speed change operation, the master arm 80 returns to the neutral position, and the change clutch 61 is engaged.

In the present embodiment, both the gear change mechanism 63 and the clutch operation mechanism 62 are driven by the single shift spindle 76 which is rotated by the single shift motor 75, so that only the single sift motor 75 is required, and the structure can be simplified.

As illustrated in FIG. 2, on a shaft end of the main shaft 65 extended into the clutch chamber 34, a primary driven gear 90 that is meshed with the primary gear 47 at the crankshaft 23 side is provided. The primary driven gear 90 is pivotally supported to be relatively rotatable to the main shaft 65, and the change clutch 61 is connected to the primary driven gear 90.

Figure 5:
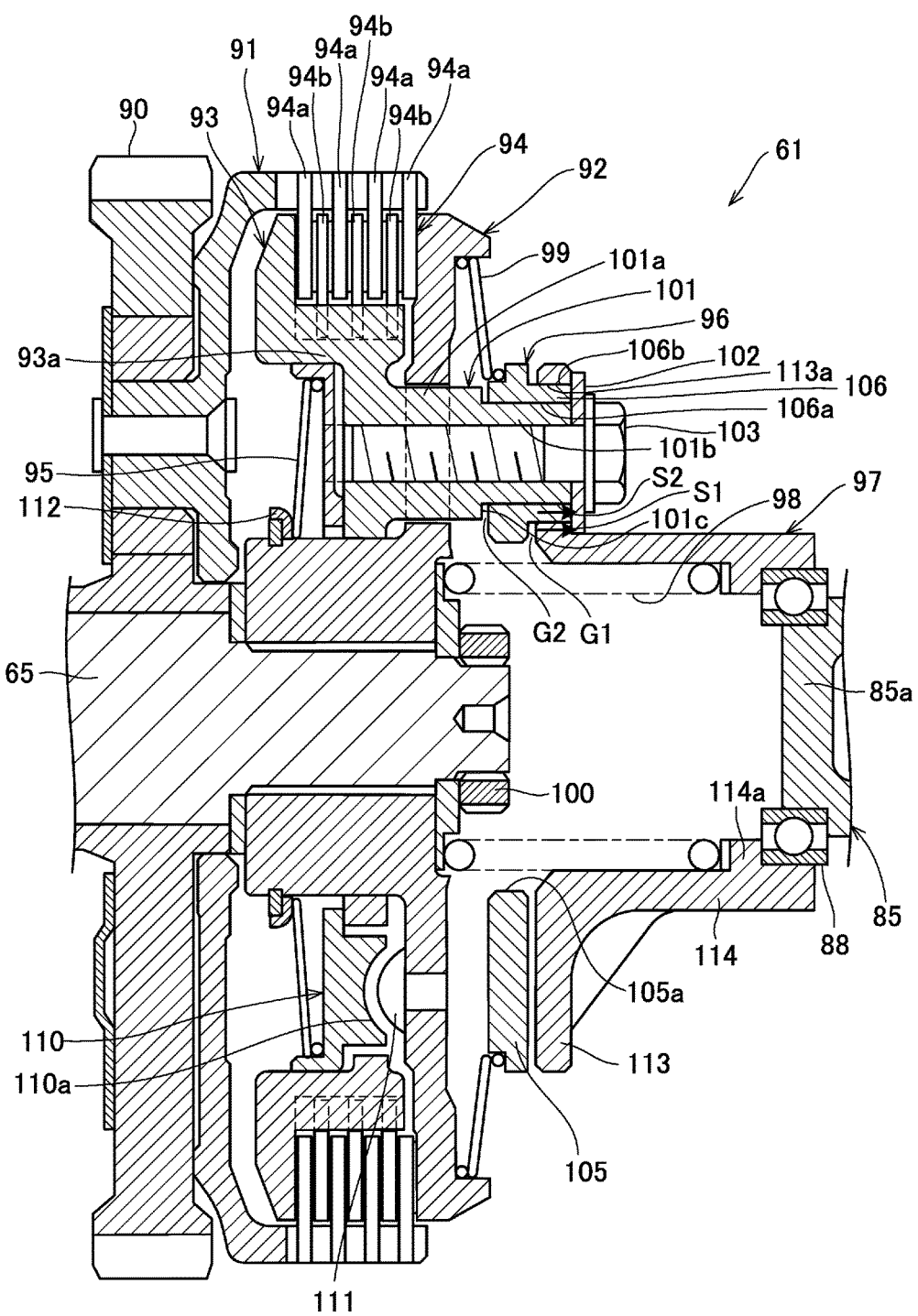
FIG. 5 is a sectional view of the change clutch.

FIG. 5 is a sectional view of the change clutch 61. Here, FIG. 5 illustrates a state in which the change clutch 61 is completely engaged.

The change clutch 61 includes a cup-shaped clutch outer 91 fixed to the primary driven gear 90, a disk-shaped clutch center 92 that is provided inward in a radial direction of the clutch outer 91 and is fixed integrally to the main shaft 65, a pressure plate 93 that is provided inward in the radial direction of the clutch outer 91 and is movable in the axial direction of the main shaft 65, a clutch plate 94 provided between the pressure plate 93 and the clutch center 92, a main spring 95 that urges the pressure plate 93 in a direction to engage the clutch, a lifter plate 96 that is disposed between the clutch center 92 and the lifter cam plate 85, and a sub lifter plate 97 that is disposed between the lifter plate 96 and the lifter cam plate 85.

Further, the change clutch 61 includes a sub spring 98 that is sandwiched between the clutch center 92 and the sub lifter plate 97, a second sub spring 99 that is sandwiched between the clutch center 92 and the lifter plate 96, and a back torque limit member 110.

The clutch center 92 and the pressure plate 93 are combined to be integrated, and configure a clutch inner that is disposed inside the clutch outer 91.

The clutch outer 91 is integrally fixed to an outer side surface of the primary driven gear 90, and is relatively rotatable to the main shaft 65 integrally with the primary driven gear 90.

The clutch center 92 is spline-fitted to the main shaft 65 and is fixed by a nut 100, and is incapable of relatively rotating and incapable of moving in the axial direction, with respect to the main shaft 65.

The pressure plate 93 is disposed inside the cylindrical portion of the clutch outer 91, and is provided to be movable in the axial direction by being fitted to a shaft portion of the clutch center 92. The pressure plate 93 includes a plurality of cylindrical release bosses 101 that penetrate through the clutch center 92 to be connected to the lifter plate 96.

The clutch plate 94 is sandwiched between the clutch center 92 and the pressure plate 93.

The clutch plate 94 includes outer friction plates 94a that are provided at the clutch outer 91, and inner friction plates 94b that are provided at the clutch center 92, and a plurality of outer friction plates 94a and inner friction plates 94b are alternately disposed in layer between the pressure plate 93 and the clutch center 92. The respective outer friction plates 94a are supported by the cylindrical portion of the clutch outer 91 by spline-fitting, and are provided to be movable in the axial direction of the clutch outer 91 and to be incapable of rotating with respect to the clutch outer 91.

The respective inner friction plates 94b are spline-fitted to an outer circumferential portion of an inner cylindrical portion 93a of the pressure plate 93 to be supported, and are provided to be movable in the axial direction of the pressure plate 93 and to be incapable of rotating with respect to the pressure plate 93.

The back torque limit member 110 is formed into a plate shape, and is fixed to an inside of the inner cylindrical portion 93a of the pressure plate 93 integrally with the pressure plate 93.

The back torque limit member 110 and a lifter pin 111 fixed to the clutch center 92 configure a back torque limiter mechanism. The back torque limiter mechanism is a known mechanism described in Japanese Patent Laid-Open No. 8-93786, for example, and is a mechanism that brings the clutch into a half-clutch state from an engaged state when torque of a predetermined value or more acts in an opposite direction to power transmission in a forward direction.

The back torque limit member 110 includes a cam portion 110a that penetrates through the pressure plate 93 to be engaged with the lifter pin 111. When back torque of a predetermined value or more acts from the rear wheel 13 side, the pressure plate 93 relatively rotates with respect to the clutch center 92, whereby the cam portion 110a slides on the lifter pin 111, and the pressure plate 93 moves in a clutch disengaging direction. According to the back torque limiter mechanism, a speed change shock due to back torque can be reduced.

The main spring 95 is sandwiched between a retainer 112 provided at the clutch center 92 and the back torque limit member 110. The main spring 95 urges the pressure plate 93 in a direction to sandwich the clutch plate 94 with the pressure plate 93 and the clutch center 92, that is, a direction to engage the clutch.

The release boss 101 of the pressure plate 93 has a guide shaft portion 101b formed to have a smaller diameter than a base end portion 101a side, at a tip end portion, and a stopper plate 102 having a larger diameter than the guide shaft portion 101b is fastened to a tip end surface of the guide shaft portion 101b with a bolt 103. A step portion 101c facing the stopper plate 102 is formed at a tip end surface of the base end portion 101a.

The lifter plate 96 includes a plate-shaped ring portion 105 facing the clutch center 92, a spring passing hole 105a provided in a center of the ring portion 105, and a lifter plate side boss 106 protruding to the lifter cam plate 85 side from the ring portion 105.

A plurality of lifter plate side bosses 106 are formed by being arranged at substantially equal intervals in a circumferential direction of the lifter plate 96. The lifter plate side boss 106 is formed into a cylindrical shape penetrating through the ring portion 105, and includes a hole portion 106a through which the guide shaft portion 101b of the release boss 101 is inserted, and an outer circumferential portion 106b on which the sub lifter plate 97 is fitted.

The lifter plate 96 is assembled by the lifter plate side boss 106 being slidably fitted over the guide shaft portion 101b of the release boss 101, and is disposed between the stopper plate 102 and the step portion 101c.

The second sub spring 99 is sandwiched between an outer side surface of the clutch center 92 and the lifter plate 96, and urges the lifter plate 96 in such a manner as to press the lifter plate 96 to the stopper plate 102 side. In the clutch engaged state, the lifter plate 96 has the tip end surface of the guide shaft portion 101b caused to abut on the stopper plate 102 by an urging force of the second sub spring 99, and a gap G2 is formed between the ring portion 105 and the step portion 101c.

That is, the second sub spring 99 presses the pressure plate 93 to the clutch center 92 side via the lifter plate 96 and the stopper plate 102, and urges the pressure plate 93 to a direction to engage the clutch.

The sub lifter plate 97 includes a ring-shaped pressing plate portion 113 facing the lifter plate 96, and a cylindrical circular pipe-shaped portion 114 protruding to the lifter cam plate 85 side from an inner circumferential edge of a center of the pressing plate portion 113. The circular pipe-shaped portion 114 is provided substantially coaxially with the main shaft 65.

The pressing plate portion 113 includes a hole portion 113a in which the lifter plate side boss 106 of the lifter plate 96 is fitted. A plurality of hole portions 113a are formed in positions corresponding to the respective lifter plate side bosses 106. A ball bearing 88 is fitted to a tip end portion of the circular pipe-shaped portion 114.

The sub lifter plate 97 is assembled by the lifter plate side bosses 106 of the lifter plate 96 being slidably inserted through the hole portions 113a, and the pressing plate portion 113 of the sub lifter plate 97 is disposed between the stopper plate 102 and the lifter plate 96.

The sub spring 98 is sandwiched between the clutch center 92 and a receiving portion 114a formed at the circular pipe-shaped portion 114 of the sub lifter plate 97, and urges the sub lifter plate 97 in such a manner as to press the sub lifter plate 97 against the stopper plate 102 side.

In the clutch engaged state, the sub lifter plate 97 has the pressing plate portion 113 caused to abut on the stopper plate 102 by the urging force of the sub spring 98, and a gap G1 is formed between the pressing plate portion 113 and the ring portion 105.

That is, the sub spring 98 presses the pressure plate 93 to the clutch center 92 side via the stopper plate 102, and urges the pressure plate 93 to the direction to engage the clutch.

In the clutch engaged state illustrated in FIG. 5, the clutch plate 94 is held by the urging forces of the main spring 95, the second sub spring 99 and the sub spring 98, and rotation of the clutch outer 91 rotated by the primary gear 47 becomes transmittable to the clutch center 92 via the clutch plate 94, and the main shaft 65 is rotated integrally with the clutch center 92.

When the pressure plate 93 is moved to the primary driven gear 90 side against the urging forces of the main spring 95, the sub spring 98 and the second sub spring 99 via the lifter cam plate 85, the hold on the clutch plate 94 is released, and the clutch disengaged state is brought about.

Figure 6A:
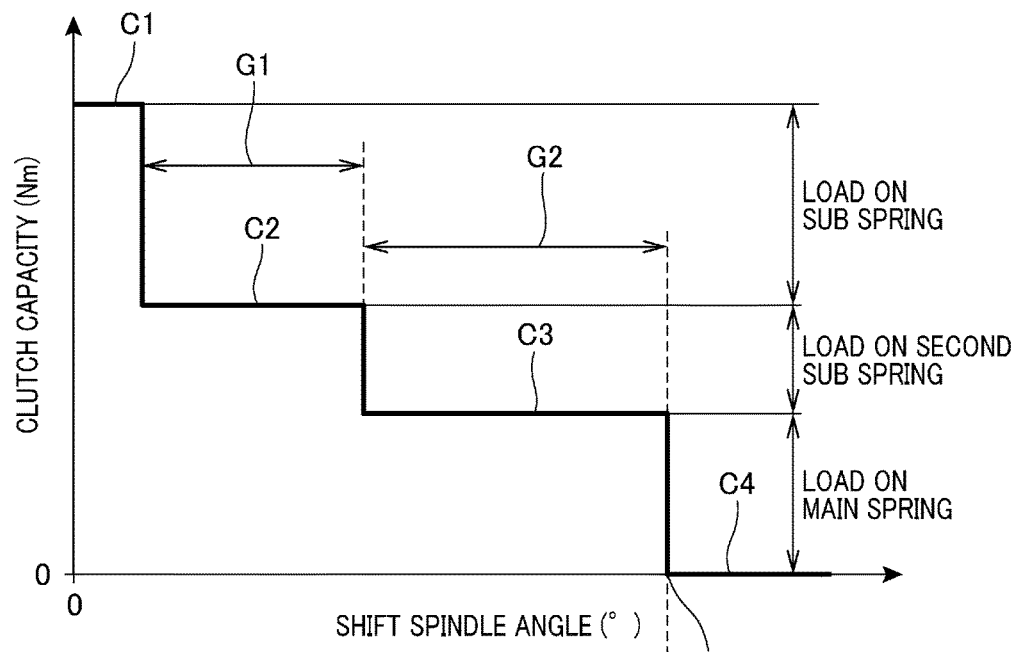
FIGS. 6A and 6B are diagrams illustrating a clutch capacity of the change clutch and a rotation angle of a shift drum, with respect to a rotation angle of a shift spindle.
Figure 6B:
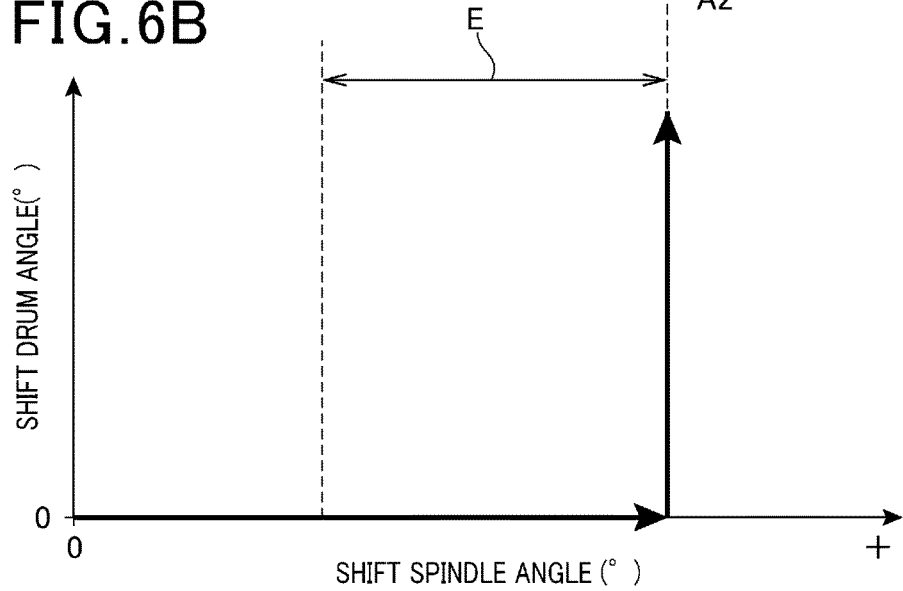

FIGS. 6A and 6B are diagrams illustrating a clutch capacity of the change clutch 61 and a rotation angle of the shift drum 70, with respect to a rotation angle of the shift spindle 76. In the following explanation, a positive direction of rotation of the shift spindle 76 is an upshift direction, and a negative direction of the rotation of the shift spindle 76 is a downshift direction.

As illustrated in FIG. 6A, in the present embodiment, the capacity of the change clutch 61 is variable by the spring contributing to the clutch capacity being changed in accordance with the rotation angle of the shift spindle 76. In detail, the clutch capacity is variable to a plurality of stages of a maximum capacity C1 with the clutch capacity determined by the urging forces of the main spring 95, the sub spring 98 and the second sub spring 99, a first intermediate capacity C2 with the clutch capacity determined by the urging forces of the main spring 95 and the second sub spring 99, a second intermediate capacity C3 with the clutch capacity determined by the urging force of only the main spring 95, and a disengagement capacity C4 with all of the urging force of the main spring 95 removed. The change clutch 61 is in a so-called half clutch state when the change clutch 61 has the first intermediate capacity C2 and the second intermediate capacity C3.

The maximum capacity C1 of the clutch capacity is obtained in the clutch engaged state illustrated in FIG. 5, both the lifter plate 96 and the sub lifter plate 97 abut on the stopper plate 102 in this state, and the urging forces of the second sub spring 99 and the sub spring 98 are transmitted to the pressure plate 93. Therefore, the urging force with which the pressure plate 93 presses the clutch plate 94 is the force obtained by adding up the urging forces (loads) of the main spring 95, the second sub spring 99 and the sub spring 98 and is maximum.

That is, the sub lifter plate 97 and the stopper plate 102 configure a first sub spring load transmitting path S1 that transmits the urging force of the sub spring 98 to the pressure plate 93. Further, the lifter plate 96 and the stopper plate 102 configure a second sub spring load transmitting path S2 that transmits the urging force of the second sub spring 99 to the pressure plate 93.

When the lifter cam plate 85 moves in the clutch disengaging direction with rotation of the shift spindle 76 by the actuator mechanism 64 (FIG. 2), the sub lifter plate 97 is lifted to the ring portion 105 side along the lifter plate side boss 106 against the urging force of the sub spring 98, and separates from the stopper plate 102.

The sub lifter plate 97 separates from the stopper plate 102, whereby the first sub spring load transmitting path S1 is shut off, the urging force of the sub spring 98 is not transmitted to the pressure plate 93, and the clutch capacity is determined by the main spring 95 and the second sub spring 99. Consequently, the moment the sub lifter plate 97 separates from the stopper plate 102, the clutch capacity is reduced to the first intermediate capacity C2 from the maximum capacity C1, as illustrated in FIG. 6A.

When movement of the lifter cam plate 85 is continued after the sub lifter plate 97 separates from the stopper plate 102, the sub lifter plate 97 further continues to move to the ring portion 105 side so as to decrease the gap G1 (FIG. 5). An interval until the pressing plate portion 113 of the sub lifter plate 97 abuts on the ring portion 105 after the pressing plate portion 420 separates from the stopper plate 102 corresponds to an interval of the first intermediate capacity C2. That is, in an interval of the lift amount of the lifter cam plate 85 corresponding to the length of the gap G1, the first intermediate capacity C2 is obtained.

In the interval of the first intermediate amount C2, movement of the sub lifter plate 97 is relative movement to the ring portion 105, and does not influence the loads of the main spring 95 and the second sub spring 99. Consequently, as illustrated in FIG. 6A, in the interval of the first intermediate capacity C2, the clutch capacity is determined by the main spring 95 and the second sub spring 99, and the first intermediate capacity C2 is fixed. In the present embodiment, a play by the gap G1 is provided, so that the interval in which the first intermediate capacity C2 is obtained can be made long, and even if the components and the control method are not made highly precise, the intermediate capacity of the clutch can be easily matched with a set value.

When the lifter cam plate 85 is further lifted to the clutch disengaging direction from the state of the first intermediate capacity C2, the pressing plate portion 113 of the sub lifter plate 97 abuts on the ring portion 105, and the interval of the first intermediate capacity C2 ends. When the lifter cam plate 85 further moves to the clutch disengaging direction from this state thereafter, the lifter plate 96 is pressed via the sub lifter plate 97, is lifted to the step portion 101c side along the guide shaft portion 101b against the urging force of the second sub spring 99, and separates from the stopper plate 102.

The tip end of the lifter plate side boss 106 of the lifter plate 96 separates from the stopper plate 102, whereby the second sub spring load transmitting path S2 is shut off, the urging force of the second sub spring 99 is not transmitted to the pressure plate 93, and the clutch capacity is determined by only the main spring 95. Consequently, the moment the lifter plate 96 separates from the stopper plate 102, the clutch capacity is reduced to the second intermediate capacity C3 from the first intermediate capacity C2, as illustrated in FIG. 6A.

When movement of the lifter cam plate 85 is continued after the lifter plate 96 separates from the stopper plate 102, the lifter plate 96 further continues movement to the step portion 101c side so as to decrease the gap G2. An interval until the lifter plate 96 abuts on the step portion 101c after the lifter plate 96 separates from the stopper plate 102 corresponds to an interval of the second intermediate capacity C3. That is, in the interval of the lift amount of the lifter cam plate 85 corresponding to the length of the gap G2, the second intermediate capacity C3 is obtained.

In the interval of the second intermediate capacity C3, movement of the lifter plate 96 is relative movement to the step portion 101c, and does not influence the load of the main spring 95. Consequently, as illustrated in FIG. 6A, in the interval of the second intermediate capacity C3, the clutch capacity is determined by only the main spring 95, and the second intermediate capacity C3 is fixed. In the present embodiment, a play by the gap G2 is provided, so that the interval in which the second intermediate capacity C3 is obtained can be increased, and even if the components and the control method are not made highly precise, the intermediate capacity of the clutch can be easily matched with a set value.

When the lifter cam plate 85 is further lifted to the clutch disengaging direction from the state of the second intermediate capacity C3, the lifter plate 96 abuts on the step portion 101c and the interval of the second intermediate capacity C3 ends. When the lifter cam plate 85 further moves in the clutch disengaging direction from this state thereafter, the pressure plate 93 is pressed via the sub lifter plate 97 and the lifter plate 96. Thereby, the pressure plate 93 moves in the clutch disengaging direction, the pressure plate 93 separates from the clutch plate 94, and the clutch is disengaged.

At the time of performing automatic transmission, the control unit 17 drives the actuator mechanism 64 based on torque of the countershaft 66, and selects a clutch capacity that can reduce transmission shock. Selection of the clutch capacity is enabled by controlling the shift spindle 76 to a predetermined rotation angle. For example, at the time of upshifting to a second speed from a first speed, the control unit 17 selects the clutch capacity of any one of the maximum capacity C1, the first intermediate capacity C2 and the second intermediate capacity C3 to reduce the transmission shock, based on the torque of the countershaft 66 before transmission which is detected, and changes speed of the gear train of the transmission 60, after which, the control unit 17 engages the change clutch 61 with the above described selected clutch capacity. Specifically, the clutch capacity is selected so that the clutch capacity of the change clutch 61 has a value that does not separate relatively from a range and a band between the torque of the countershaft 66 before speed change and the torque of the countershaft 66 after the change speed.

Thereby, absorption of the rotation difference between the countershaft 66 side and the crankshaft 23 side by the change clutch 61 can be properly performed, and the speed change shock can be reduced. Here, the torques of the countershaft 66 before and after speed change are obtained based on a map storing a relationship among an engine speed, a throttle opening degree and the torque of the countershaft 66, for example.

FIG. 7 is a diagram illustrating a lift amount (a clutch lift amount) of the lifter cam plate 85 to the rotation angle of the shift spindle 76. Further, FIG. 7 illustrates a load of the clutch spring to the rotation angle of the shift spindle 76 in an upshift side.

As illustrated in FIG. 7, a lift characteristic of the lifter cam plate 85 at the upshift side has a play zone U1 in which the lift amount does not increase with respect to rotation to a predetermined angle from a neutral position (0°) of the shift spindle 76, and a lift zone U2 in which the lift amount increases substantially linearly with respect to an increase of the rotation amount of the shift spindle 76.

A lift characteristic of the lifter cam plate 85 at a downshift side has a play zone D1 in which the lift amount does not increase with respect to rotation of the shift spindle 76 to a predetermined angle from the neutral position (0°), a lift zone D2 in which the lift amount increases substantially linearly with respect to increase in the rotation amount of the shift spindle 76, and a lift zone D3 in which the lift amount increases substantially linearly with a more gradual inclination than that in the lift zone D2 with respect to increase in the rotation amount of the shift spindle 76.

The play zone D1 is set to be smaller than the play zone U1. In the lift zone D2, the lift amount of the lifter cam plate 85 increases with a larger inclination than that in the lift zone U2.

The lift characteristic of the lifter cam plate is set at a desired characteristic by adjusting shapes of the cam hole portion 85*c* of the lifter cam plate 85 and the cam hole portion 85*c* of the clutch lever 82.

A load P of the clutch spring at the upshift side illustrated in FIG. 7 is a reaction force that the lifter cam plate 85 receives from the change clutch 61 at the time of the shift spindle 76 being rotated in the upshift direction, and is a force required to disengage the change clutch 61. A change of the load P corresponds to a change in the clutch capacity illustrated in FIG. 6A, so that corresponding zones are assigned with reference signs. The load P increases stepwise in correspondence with a stepwise decrease of the clutch capacity.

A rotation position A2 in which the shift spindle 76 slightly rotates in the clutch disengaging direction after the gap G2 becomes zero is a rotation position of the shift spindle 76 in which the clutch is disengaged. The lift amount of the lifter cam plate 85 in the rotation position A2 is a disengagement lift amount Ld with which the clutch is disengaged.

The disengagement lift amount Ld is the same in the upshift direction and the downshift direction. In a lift zone D2, the lift amount of the lifter cam plate 85 increases more abruptly than in a lift zone U2, so that in the downshift direction, the clutch is disengaged with a smaller rotation amount of the shift spindle 76 than in the upshift direction.

As illustrated in FIGS. 6A and 6B, at the time of upshifting, power storage by the power storing mechanism is started from a stage before the clutch is disengaged, the restraint on the change mechanism 89 by the transmission 60 is canceled by disengagement of the clutch in the rotation position A2, and the shift drum is rotated at once by stored power of the power storing mechanism 81 to perform upshift. A power storage zone E in which the power storing mechanism 81 stores power is a zone from a midpoint of the first intermediate capacity C2 to the rotation position A2.

Figure 8A:
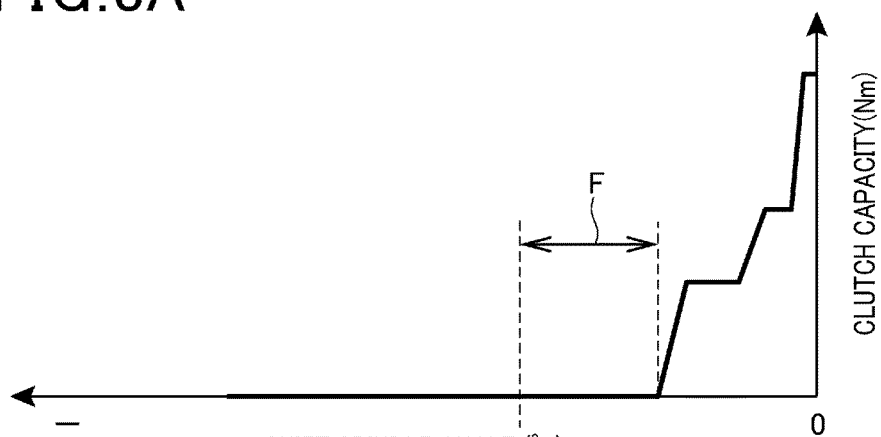
FIGS. 8A and 8B are diagrams illustrating a clutch capacity of the change clutch and a rotation angle of the shift drum with respect to a rotation angle of the shift spindle at the time of downshifting.
Figure 8B:
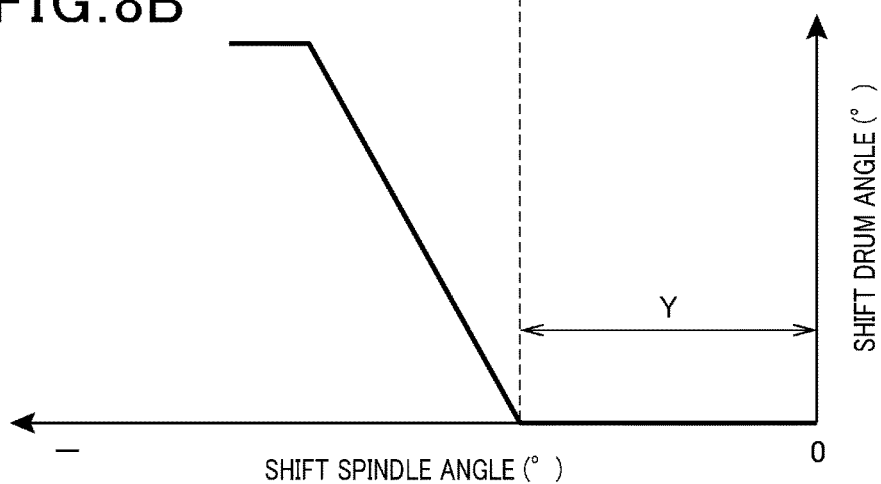

FIGS. 8A and 8B are diagrams illustrating the clutch capacity of the change clutch 61 and the rotation angle of the shift drum 70, with respect to the rotation angle of the shift spindle 76 at the time of downshifting.

At the time of downshifting, stepwise control of the clutch capacity is not performed, and the change clutch 61 is disengaged at once to the disengagement capacity C4 by rotation of the shift spindle 76.

When the spindle 76 further rotates in the downshift direction by a predetermined amount F after the change clutch 61 is completely disengaged, rotation of the shift drum 70 is started via the master arm 80, and downshift is executed.

A speed change shock at the time of downshift is reduced by the back torque limiter mechanism.

Figure 9:
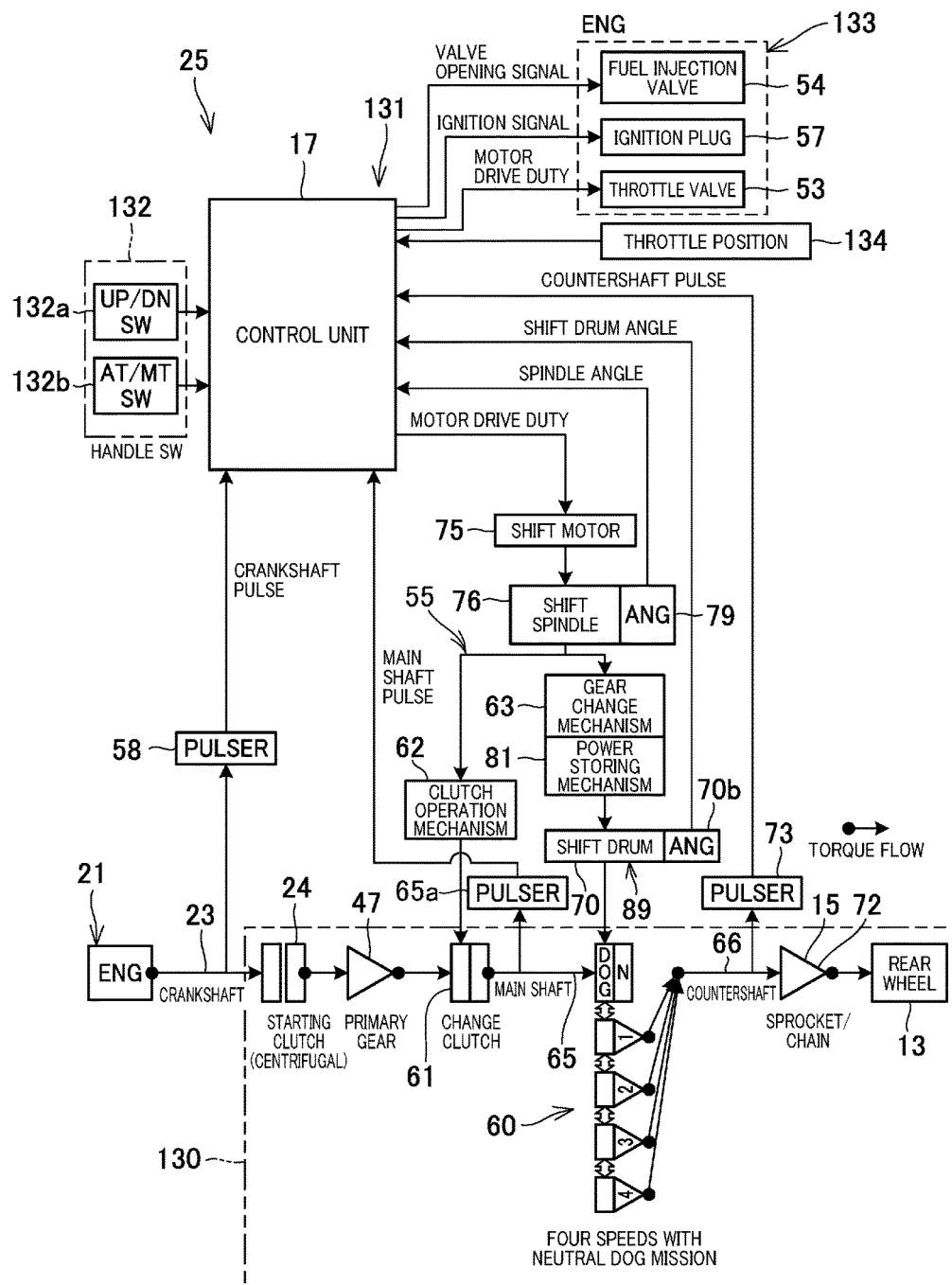
FIG. 9 is a block diagram illustrating a configuration of the automatic transmission device.

FIG. 9 is a block diagram illustrating a configuration of the automatic transmission device 25.

As illustrated in FIG. 9, the automatic transmission device 25 includes a drive transmitting section 130 including the starting clutch 24, the primary gear 47, the change clutch 61, the main shaft 65, the transmission 60, the countershaft 66, the chain 15, the drive sprocket 72 and the rear wheel 13, an actuator machine section 55 that mechanically operates the transmission 60 and the change clutch 61, electrical components section 131, and an engine operation control section 133 that directly controls an operation of the engine 21.

The drive transmitting section 130 mechanically transmits power of the crankshaft 23 to the rear wheel 13.

The actuator machine section 55 includes the shift motor 75, the shift spindle 76, the gear change mechanism 63, the power storing mechanism 81, the change mechanism 89 and the clutch operation mechanism 62.

The engine operation control section 133 includes the throttle valve 53, the fuel injection valve 54, and an ignition plug 57.

The throttle valve 53 is of an electronically controlled type, and is driven by a throttle valve driving motor (not illustrated) that is controlled by the control unit 17. In detail, the control unit 17 detects an operation amount of a throttle grip (not illustrated) that is provided at the handle 11 and is operated by the driver, with a sensor, drives the above described throttle valve driving motor in accordance with the operation amount, and adjusts an opening degree of the throttle valve 53.

The ignition plug 57 is connected to the control unit 17 via an ignition coil driving portion and an ignition coil not illustrated.

The electrical components section 131 includes the control unit 17, an engine speed sensor 58, the shift spindle angle sensor 79, a drum angle sensor 70*b*, a throttle position sensor 134, the countershaft rotational frequency sensor 73, the main shaft rotational frequency sensor 65*a*, and a handle switch 132 provided at the handle 11.

The control unit 17 has a CPU, a storage section configured by a ROM, a RAM and the like, and controls the actuator machine section 55 and the engine operation control section 133 based on control information such as a control map and the like in the storage section.

The engine speed sensor 58 outputs the rotational frequency of the crankshaft 23 to the control unit 17.

The control unit 17 can determine the state of the transmission 60, that is, whether or not the transmission 60 is under speed change, from a detection value of the shift spindle angle sensor 79.

The drum angle sensor 70b outputs the rotation angle of the shift drum 70 to the control unit 17, and the control unit 17 determines the present gear position (speed stage) from the rotation angle.

The throttle position sensor 134 outputs an opening degree of the throttle valve 53 to the control unit 17.

The handle switch 132 includes a mode switch 132b and a shift select switch 132a.

The control unit 17 controls the shift motor 75, based on signals from the engine speed sensor 58, the shift spindle angle sensor 79, the drum angle sensor 70b, the throttle position sensor 134 and the countershaft rotational frequency sensor 73, and automatically performs a speed change operation and a clutch operation.

Further, the control unit 17 adjusts the opening degree of the throttle valve 53, the injection amount of the fuel injection valve 54 and ignition timing of the ignition plug 57 in accordance with the operation amount of the throttle grip, and the control unit 17 corrects the opening degree of the throttle valve 53, the injection amount of the fuel injection valve 54, and the ignition timing of the ignition plug 57 based on detection values of the throttle position sensor 134, the engine speed sensor 58, the shift spindle angle sensor 79, the drum angle sensor 70b and the countershaft rotational frequency sensor 73.

Figure 10:
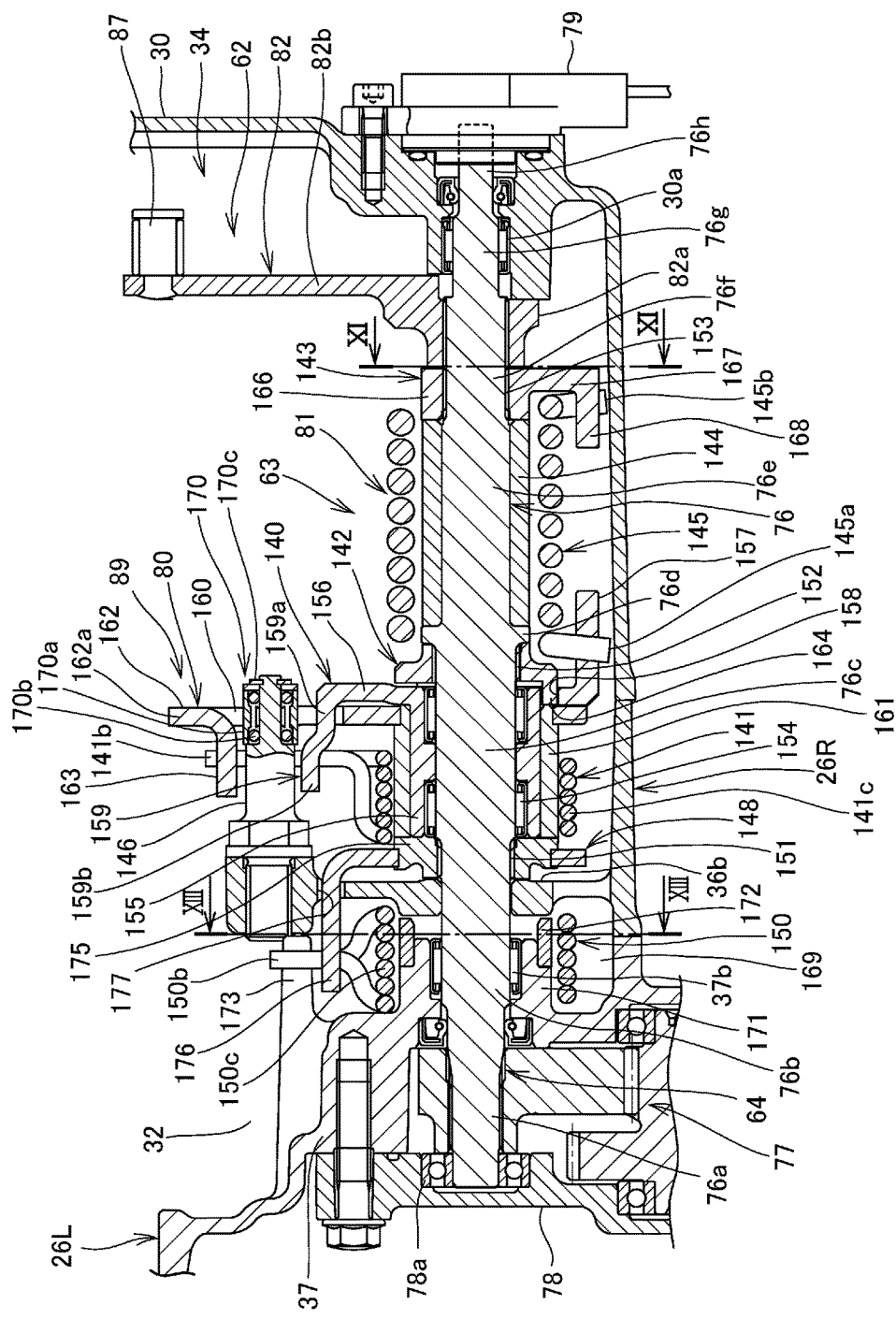
FIG. 10 is a sectional view of a power storing mechanism.

FIG. 10 is a sectional view of the power storing mechanism 81.

The wall portion 36 of the other side case half body 26R includes an inner wall 36b (an inner wall to a matching portion) formed in a vicinity of the matching surface 26F of the crankcase 26, around the shift spindle 76.

The power storing mechanism 81 is disposed between the inner wall 36b of the wall portion 36 of the other side case half body 26R and the clutch cover 30.

The power storing mechanism 81 includes the shift spindle 76, a gear shift arm 140 provided on a shaft of the shift spindle 76 to be relatively rotatable with respect to the shift spindle 76, a return spring 141 that urges the gear shift arm 140 to a neutral position, a downshifting collar 142 that is fixed onto the shaft of the shift spindle 76 in a position close to the gear shift arm 140 and rotates integrally with the shift spindle 76, and a power storage collar 143 that is fixed onto the shaft of the shift spindle 76 in a position separating in an axial direction from the gear shift arm 140 and rotates integrally with the shift spindle 76.

Further, the power storing mechanism 81 includes a spring collar 144 provided on the shaft between the power storage collar 143 and the gear shift arm 140 to be relatively rotatable with respect to the shift spindle 76, a power storage spring 145 provided to be wound on an outer periphery of the spring collar 144 between the power storage collar 143 and the gear shift arm 140, and a stopper pin 146 (a stopper portion) that regulates the rotation position of the master arm 80.

The gear change mechanism 63 includes a sub return spring locking collar 148 that is adjacent to the power storing mechanism 81 and is fixed onto the shift spindle 76, and a sub return spring 150 that is connected to the sub return spring locking collar 148 and urges the shift spindle 76 to the neutral position.

The shift spindle 76 has, in order from the cover 78 side, a connection portion 76a that is connected to the speed reduction gear train 77, a support portion 76b that is supported by the bearing 37b and penetrates through the inner wall 36b, a gear shift arm support portion 76c that supports the gear shift arm 140, a flange portion 76d that protrudes in a radial direction, a spring collar support portion 76e that supports the spring collar 144, a collar support portion 76f that supports the power storage collar 143, a support portion 76g that is supported by the bearing 30a, and a sensor connection portion 76h that is connected to the shift spindle angle sensor 79.

In the shift spindle 76, the flange portion 76d has the largest diameter, and the gear shift arm support portion 76c, the support portion 76b and the connection portion 76a are formed to have smaller diameters stepwise toward the connection portion 76a side. Further, the spring collar support portion 76e, the collar support portion 76f, the support portion 76g and the sensor connection portion 76h are formed to have smaller diameters stepwise toward the sensor connection portion 76h from the flange portion 76d side.

The support portion 76b is provided with a locking collar fixing portion 151 to which the sub return spring locking collar 148 is fixed. A downshifting collar fixing portion 152 to which the downshifting collar 142 is fixed is provided at a position adjacent to the flange portion 76d in the gear shift arm support portion 76c. The collar support portion 76f is provided with a power storage collar fixing portion 153 to which the power storage collar 143 is fixed. The locking collar fixing portion 151, the shift down collar fixing portion 152 and the power storage collar fixing portion 153 are serrations that are formed on an outer periphery of the shift spindle 76. Further, the clutch lever 82 is fixed to the power storage collar fixing portion 153.

The sub return spring locking collar 148, the downshifting collar 142, the power storage collar 143 and the clutch lever 82 are fixed to the shift spindle 76 to be incapable of relatively rotating, and rotates integrally with the shift spindle 76.

Figure 11:
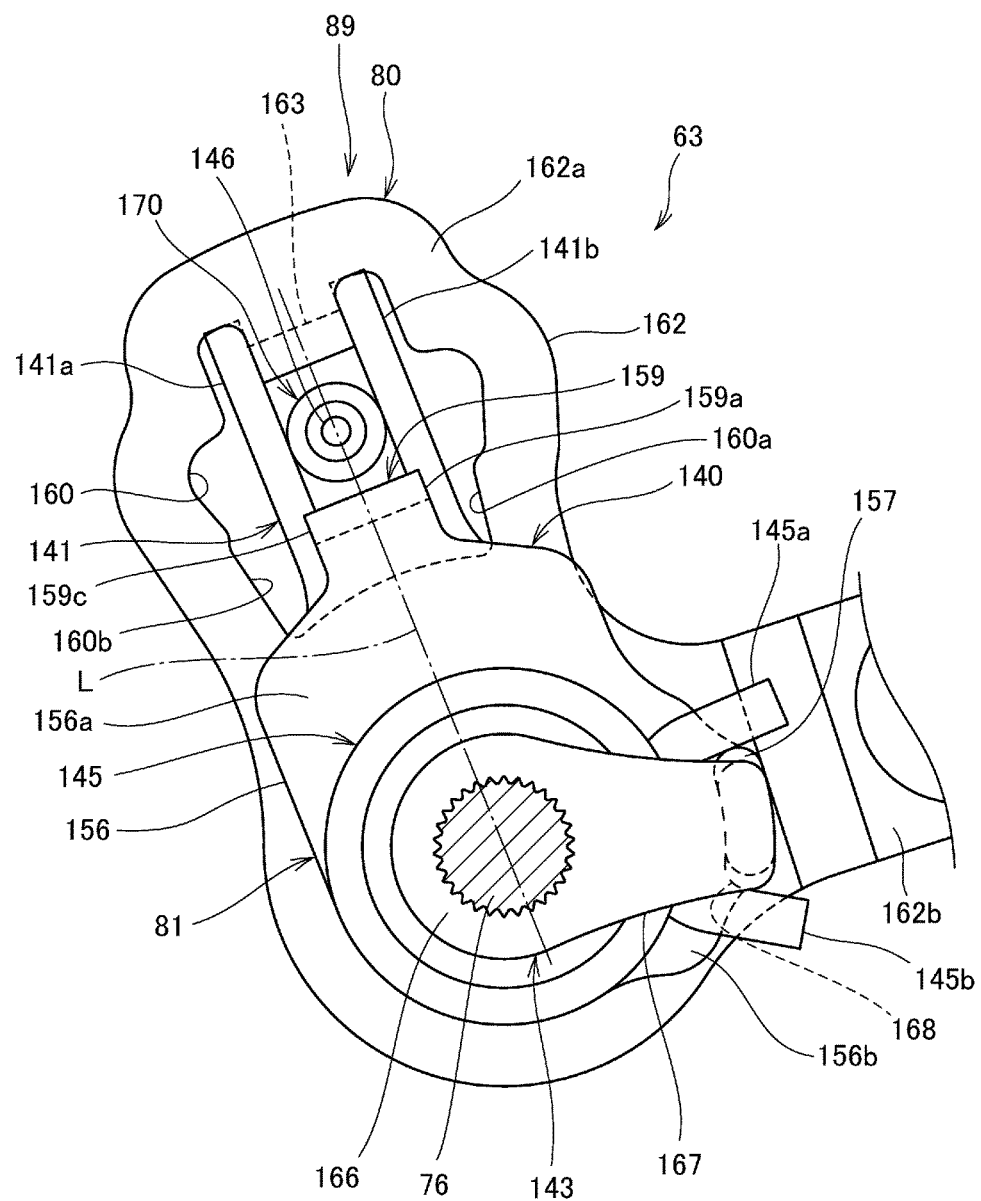
FIG. 11 is a sectional view taken along line XI-XI in FIG. 10, and is a view illustrating a peripheral portion of the power storing mechanism.
Figure 12A:
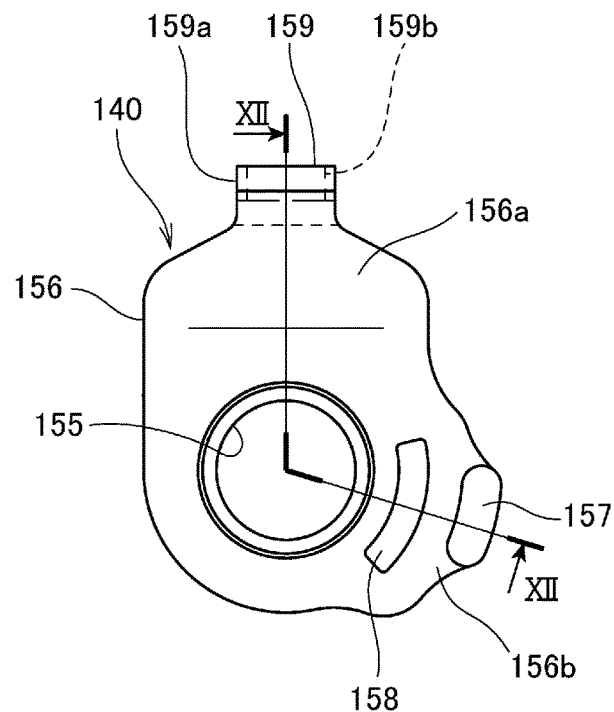
FIGS. 12A and 12B are views illustrating a gear shift arm.
Figure 12B:
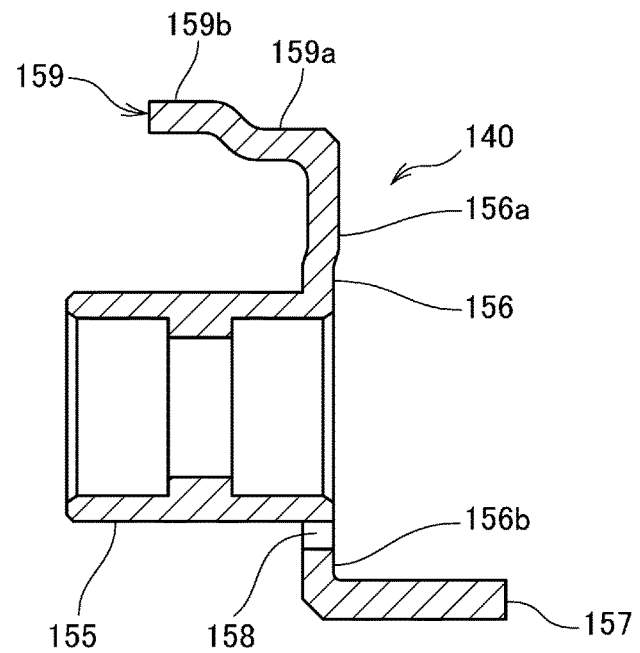

FIG. 11 is a sectional view taken along line XI-XI in FIG. 10, and is a view illustrating a peripheral part of the power storing mechanism 81. FIGS. 12A and 12B are views illustrating the gear shift arm 140, FIG. 12A is a front view and FIG. 12B is a sectional view taken along XII-XII. Here, in FIG. 11, the actuator mechanism 64, the power storing mechanism 81 and the change mechanism 89 are in a neutral state (a neutral position) in which operations of upshift and downshift are not performed. That is, in FIG. 11, the shift spindle 76, the gear shift arm 140, the master arm 80 and the like are in a neutral state. Further, in FIG. 11, the clutch cover 30 is not illustrated.

As illustrated in FIG. 10 to FIGS. 12 A and 12B, the gear shift arm 140 includes a cylinder portion 155 that is fitted on an outer circumferential surface of the shift spindle 76 via a bearing 154, and a plate portion 156 that extends outward in the radial direction from an outer circumferential portion of an end at a power storage spring 145 side in the cylinder portion 155.

The plate portion 156 includes an upward extending portion 156a extending upward from the cylinder portion 155, and an extending portion 156b extending in a direction substantially orthogonal to the upward extending portion 156a from the cylinder portion 155.

The extending portion 156b is provided with a first locking piece 157 extending to the power storage spring 145 side substantially parallel with the shift spindle 76 from a tip end portion of the extending portion 156b. Further, in the plate portion 156, a hole portion 158 in which a part of the downshifting collar 142 is fitted is provided between the cylinder portion 155 and the first locking piece 157. The hole portion 158 is a long hole extending in an arc shape along the cylinder portion 155.

The upward extending portion 156a is provided with a second locking piece 159 extending to a return spring 141 side substantially parallel with the shift spindle 76 after extending outward in the radial direction from a tip end portion of the upward extending portion 156a.

The second locking piece 159 includes an abutment portion 159a at a base end side that is inserted through a regulation opening portion 160 of the master arm 80, and a return spring locking portion 159b at a tip end side to which the return spring 141 is locked. The return spring locking portion 159b is formed to be thinner than the abutment portion 159a.

The master arm 80 includes a cylindrical portion 161 that is slidably fitted onto an outer circumferential surface of the cylinder portion 155 of the gear shift arm 140, and an arm portion 162 that is extended outward in a radial direction from an end at a power storage spring 145 side in the cylindrical portion 161. The master arm 80 is rotatable relatively to the gear shift arm 140. The master arm 80 is disposed so that the arm portion 162 comes close to the plate portion 156 of the gear shift arm 140.

The arm portion 162 is formed into a substantially L shape in front view in FIG. 11, and includes a position regulation arm 162a extending upward from the cylindrical portion 161, and an operation arm 162b extending in a direction substantially orthogonal to the position regulation arm 162a from the cylindrical portion 161. The master arm 80 is connected to the shift drum 70 via the operation arm 162b and the shift drum 70 rotates by the master arm 80 rotating.

The master arm 80 includes the aforementioned regulation opening portion 160 through which the stopper pin 146 is inserted, in a tip end portion of the position regulation arm 162a. The second locking piece 159 of the gear shift arm 140 is inserted through the regulation opening portion 160, in a position under the stopper pin 146. The regulation opening portion 160 has a predetermined width so that the stopper pin 146 and the second locking piece 159 are relatively movable to the regulation opening portion 160 in the regulation opening portion 160.

The master arm 80 includes a spring locking piece 163 extending to a return spring 141 side substantially parallel with the shift spindle 76, at an upper edge portion of the regulation opening portion 160.

The downshifting collar 142 is formed into a cylindrical shape, is butted to the flange portion 76d to be positioned in an axial direction, and is fixed to the downshifting collar fixing portion 152. The downshifting collar 142 has a dog tooth 164 that is inserted through the hole portion 158 of the gear shift arm 140. A total length of the dog tooth 164 is formed to be shorter than a total length of the hole portion 158 so that the dog tooth 164 is movable in the hole portion 158.

The power storage collar 143 includes a cylinder portion 166 that is fixed to the power storage collar fixing portion 153, an extending portion 167 extending outward in the radial direction from the cylinder portion 166, and a power storage arm 168 extending to a gear shift arm 140 side substantially parallel with the shift spindle 76 from a tip end of the extending portion 167. The power storage arm 168 is disposed at substantially the same position in the radial direction and a circumferential direction with respect to the first locking piece 157 of the gear shift arm 140, in an axial view of the shift spindle 76. In detail, the power storage arm 168 is provided at a position slightly deviated in a circumferential direction, with respect to the first locking piece 157.

The spring collar 144 is disposed between the flange portion 76d and the power storage collar 143. The spring collar 144 rotates with respect to the shift spindle 76 when an inner circumferential portion of the power storage spring 145 contacts the spring collar 144, and thereby reduces friction of the power storage spring 145.

The power storage spring 145 is a helical torsion coil spring, and a gear shift arm side end portion 145a at one end is locked to the first locking piece 157 of the gear shift arm 140, whereas a power storage arm side end portion 145b at the other end is locked to the power storage arm 168 of the power storage collar 143.

The return spring 141 is a helical torsion coil spring, and a coil portion 141c is fitted onto an outer circumferential portion of the cylindrical portion 161 of the master arm 80.

In the return spring 141, one end 141a and the other end 141b thereof extend outward in the radial direction, and the one end 141a and the other end 141b are provided to be substantially parallel with each other with a predetermined space left from each other.

The return spring 141 is disposed in a state where the stopper pin 146 is sandwiched between the one end 141a and the other end 141b.

Further, the spring locking piece 163 of the master arm 80 is sandwiched between the one end 141a and the other end 141b, at tip end sides of the one end 141a and the other end 141b from the stopper pin 146. The second locking piece 159 of the gear shift arm 140 is sandwiched between the one end 141a and the other end 141b, at base end sides of the one end 141a and the other end 141b from the stopper pin 146.

The stopper pin 146 is fastened and fixed to the inner wall 36b of the other side case half body 26R. The stopper pin 146 extends substantially parallel with the shift spindle 76, and is inserted through the regulation opening portion 160 of the master arm 80. The stopper pin 146 includes a damper portion 170 at a tip end portion. The damper portion 170 includes a cylindrical collar 170a that is fitted to the stopper pin 146, an elastic member 170b such as rubber that is interposed between the collar 170a and the stopper pin 146, and a washer-shaped stopper 170c that is fitted to a tip end of the stopper pin 146 to prevent the collar 170a from coming off. An inner circumferential portion of the regulation opening portion 160 of the master arm 80 abuts on the damper portion 170 when the master arm 80 rotates. Consequently, hitting sound at the time of the regulation opening portion 160 being received by the stopper pin 146 can be reduced by the damper portion 170.

Figure 13:
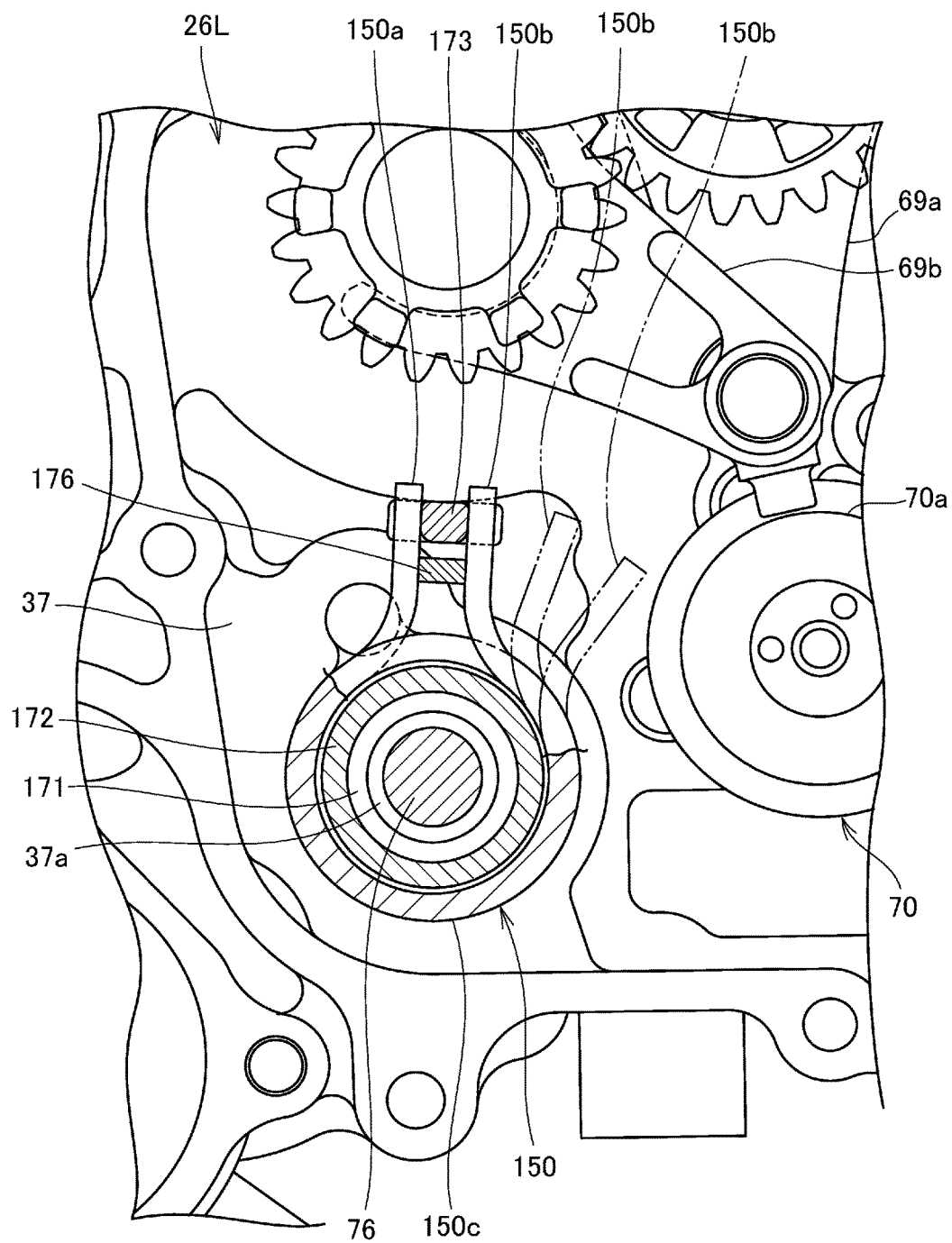
FIG. 13 is a sectional view taken along line XIII-XIII in FIG. 10.
Figure 14:
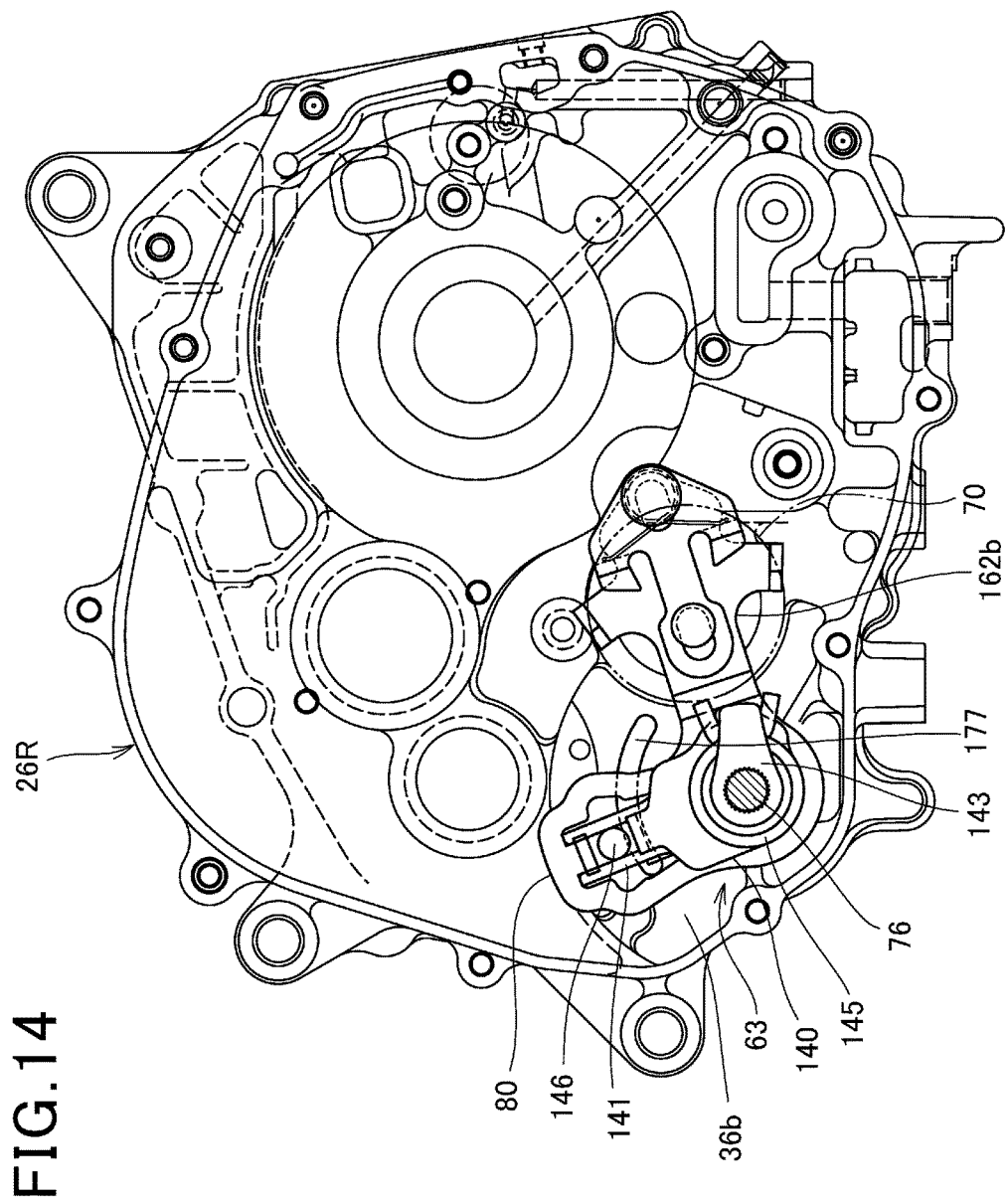
FIG. 14 is a sectional view taken along line XI-XI in FIG. 10.

FIG. 13 is a sectional view taken along line XIII-XIII in FIG. 10. FIG. 14 is a sectional view taken along XI-XI in FIG. 10. Here, FIG. 13 is a view illustrating a neutral state. FIG. 14 does not illustrate the clutch cover 30.

As illustrated in FIG. 10, the wall portion 37 of the one side case half body 26L is located at an outer side of the inner wall 36b of the other side case half body 26R. In a space 169 in the transmission chamber 32 between the wall portion 37 and the inner wall 36b, a cylindrical sub return spring support portion 171 that protrudes to an inner wall 36b side along the shift spindle 76 from the wall portion 37 is provided. The bearing 37b that supports the shift spindle 76 is supported by an inner circumferential portion of the sub return spring support portion 171.

At a tip end of the sub return spring support portion 171, a step portion recessed in a circumferential direction is provided, and a cylindrical guide collar 172 is fixed to the step portion. An outer circumferential portion of the guide collar 172 and an outer circumferential portion of a base end portion of the sub return spring support portion 171 are flush with each other.

The wall portion 37 includes a boss 173 extending substantially parallel with the shift spindle 76 in a vicinity of the sub return spring support portion 171. The boss 173 and the sub return spring support portion 171 are formed integrally with the wall portion 37, and tip end portions thereof extend to a vicinity of the inner wall 36b.

The sub return spring 150 is a helical torsion coil spring, and includes a coil portion 150c, and one end 150a and the other end 150b that respectively protrude outward in a radial direction from both ends of the coil portion 150c.

The sub return spring 150 is disposed in the space 169 by an inner circumferential portion of the coil portion 150c being fitted on and supported by an outer circumferential portion of the sub return spring support portion 171.

The sub return spring 150 is disposed in a state where the boss 173 is sandwiched between the one end 150a and the other end 150b, and is positioned in a circumferential direction by the boss 173.

As illustrated in FIG. 10 and FIG. 13, the sub return spring locking collar 148 is disposed between the inner wall 36b of the other side case half body 26R and the master arm 80, and is located in the clutch chamber 34. Further, the sub return spring locking collar 148 is located between the inner wall 36b and the return spring 141.

The sub return spring locking collar 148 includes a cylindrical portion 175 that is fixed to the locking collar fixing portion 151 of the shift spindle 76, and an arm portion 176 that extends outward in the radial direction from the cylindrical portion 175, and thereafter bends to an opposite side to the return spring 141 to extend to a sub return spring 150 side.

The inner wall 36b includes a hole portion 177 through which the arm portion 176 of the sub return spring locking collar 148 penetrates. The hole portion 177 is formed into a circular arc shape to correspond to a trajectory of rotation of the arm portion 176. The arm portion 176 is inserted through the hole portion 177 to extend into the space 169, and is sandwiched between the one end 150a and the other end 150b of the sub return spring 150, in a position between the boss 173 and the coil portion 150c.

In the neutral state illustrated in FIG. 11, the change clutch 61 is in an engaged state and a driving force is generated in the transmission 60. Consequently, the master arm 80 is restrained by the transmission 60, and is incapable of rotating on the shift spindle 76.

In the neutral state, the master arm 80 has the rotation position regulated to the neutral position by the spring locking piece 163 being sandwiched between the one end 141a and the other end 141b of the return spring 141. The return spring 141 regulates the rotation position of the master arm 80 in a state where a predetermined initial load is applied.

In the neutral state, the gear shift arm 140 has the rotation position regulated to the neutral position by the return spring locking portion 159b being sandwiched between the one end 141a and the other end 141b of the return spring 141. The return spring 141 regulates the rotation position of the gear shift arm 140 in the state where a predetermined initial load is applied.

That is, in the neutral state, the master arm 80 and the gear shift arm 140 are located to be along a straight line L passing through a center of the shift spindle 76 and a center of the stopper pin 146.

In the neutral state, the power storage spring 145 is provided in a state where the power storage spring 145 is given initial deflection by a predetermined torsion amount between the power storage arm 168 and the first locking piece 157, and a predetermined initial load is generated in the power storage spring 145.

As illustrated in FIG. 13, in the neutral state, the sub return spring locking collar 148 has the rotation position regulated to the neutral position by the arm portion 176 being sandwiched between the one end 150a and the other end 150b of the sub return spring 150. The sub return spring 150 regulates the rotation position of the sub return spring locking collar 148 in a state where a predetermined initial load is applied.

Figure 15A:
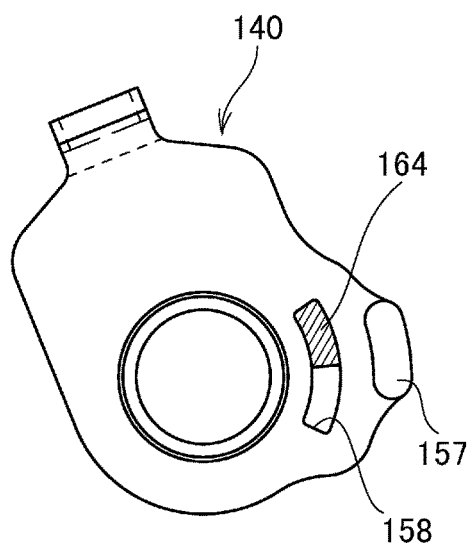
FIGS. 15A to 15D are views illustrating position states of a dog tooth of a downshift collar.
Figure 15B:
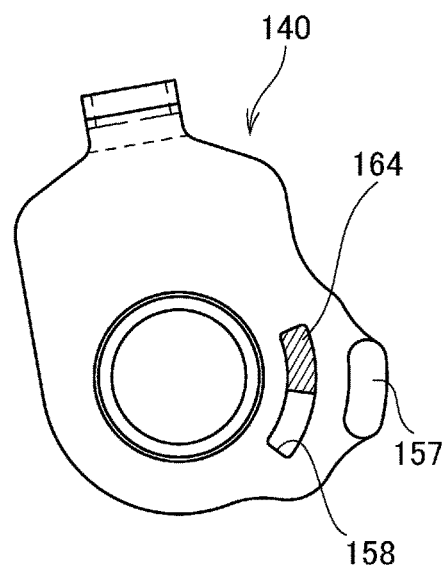
Figure 15C:
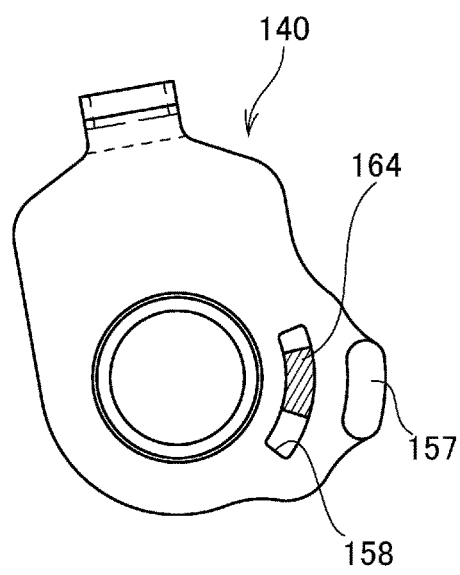
Figure 15D:
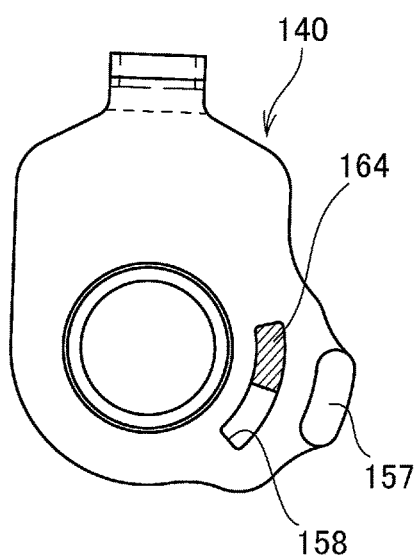

FIGS. 15A to 15D are views illustrating position states of the dog tooth 164 of the downshifting collar 142, FIG. 15A is a neutral state, and FIGS. 15B to 15D are states where the rotation amount of the shift spindle 76 further increases in sequence.

As illustrated in FIG. 15A, the dog tooth 164 is in contact with one end of the hole portion 158 of the gear shift arm 140 in the neutral state, and a gap is formed between the dog tooth 164 and the other end of the hole portion 158.

Here, an operation of the power storing mechanism 81 at the time of upshifting will be described.

When the shift motor 75 of the actuator mechanism is driven in response to an instruction to change speed of the control unit 17, rotation of the shift spindle 76 is started. A direction of upshift is a clockwise direction illustrated by reference sign UP in the drawing.

Figure 16:
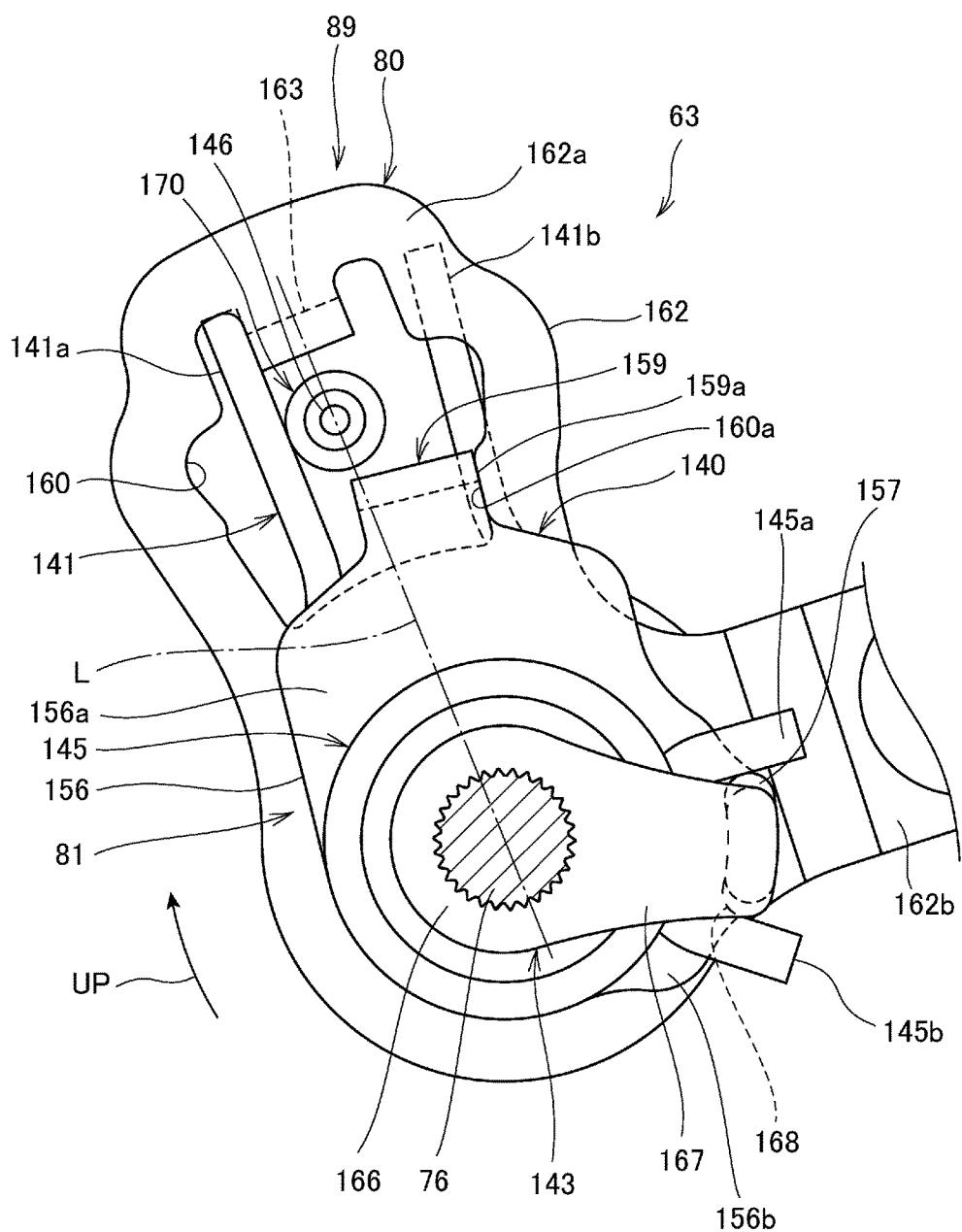
FIG. 16 is a view illustrating a state advanced in an upshift direction from the neutral state.

FIG. 16 is a view illustrating a state advanced to an upshift direction from the neutral state.

The state in FIG. 16 is a state where rotation of the shift spindle 76 advances to such an extent that the abutment portion 159a of the second locking piece 159 of the gear shift arm 140 abuts on the inner edge 160a of the regulation opening portion 160 of the master arm 80 and the gear shift arm 140 cannot rotate, and in the following explanation, this state will be referred to as a power storage preparation state.

In the power storage preparation state, the gear shift arm 140 only rotates integrally with the power storage collar 143 via the power storage spring 145 with rotation of the power storage collar 143. Consequently, the power storing mechanism 81 entirely rotates in the upshift direction, but the deflection amount of the power storage spring 145 does not change, and power storage is not started. Further, in the power storage preparation state, the rotation amount of the master arm 80 from the neutral state is zero.

In the power storage preparation state, the gear shift arm 140 rotates against the urging force of the return spring 141, and the other end 141b of the return spring 141 is opened by only a predetermined amount.

Further, in the power storage preparation state, the sub return spring locking collar 148 rotates against the urging force of the sub return spring 150, and the other end 150b of the sub return spring 150 is opened by a predetermined amount as illustrated by a two-dot chain line in FIG. 13.

In the power storage preparation state, the downshifting collar 142 rotates integrally with the gear shift arm 140, so that as illustrated in FIG. 15B, the dog tooth 164 is in contact with one end of the hole portion 158 of the gear shift arm 140, and a gap is formed between the dog tooth 164 and the other end of the hole portion 158.

Figure 17:
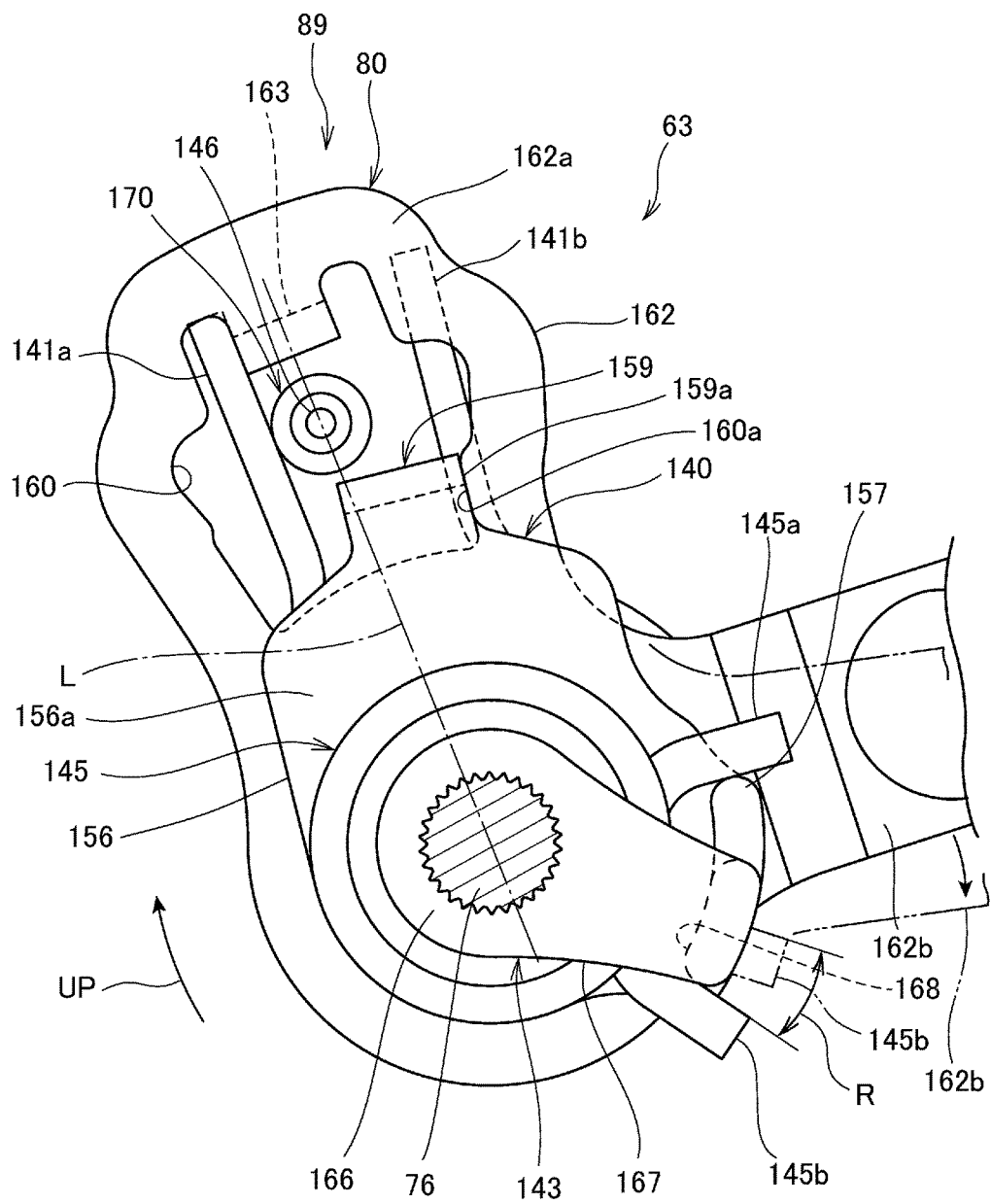
FIG. 17 is a view illustrating a state advanced in an upshift direction from a power storage preparation state.

FIG. 17 is a view illustrating a state advanced to the upshift direction from the power storage preparation state.

In the state in FIG. 17, in the power storage spring 145, only the power storage arm side end portion 145b is rotated by a predetermined amount R by the power storage arm 168 while a position of the gear shift arm side end portion 145*a* is fixed by the first locking piece 157, with rotation of the shift spindle 76. In the following explanation, the state in FIG. 17 will be referred to as a power storage state.

In the power storage state, the deflection amount of the power storage spring 145 increases by the predetermined amount R, and a predetermined amount of power storage of the power storage spring 145 is completed. Further, in the power storage state, the rotation amount of the master arm 80 from the neutral state is zero.

In the power storage state, the downshifting collar 142 rotates with the shift spindle 76, with respect to the gear shift arm 140 that does not rotate by being regulated by the regulation opening portion 160. Consequently, in the power storage state, as illustrated in FIG. 15C, the dog tooth 164 is located in an intermediate portion between the one end and the other end of the hole portion 158 of the gear shift arm 140.

Further, in the power storage state, the sub return spring locking collar 148 rotates against the urging force of the sub return spring 150, and the other end 150*b* of the sub return spring 150 is further opened by a predetermined amount from the state of the power storage preparation state, as illustrated by a two-dot chain line in FIG. 13.

Referring to FIG. 3, the clutch lever 82 rotates integrally with the shift spindle 76, and with rotation of the clutch lever 82, the lifter cam plate 85 moves in the axial direction, and the change clutch 61 is disengaged. When the change clutch 61 is disengaged, restraint on the master arm 80 by the transmission 60 is canceled, and the master arm 80 becomes rotatable. The moment the change clutch 61 is disengaged, the stored power of the power storing mechanism 81 is released, and the master arm 80 rotates at once to a position illustrated by a two-dot chain line in FIG. 17 by the stored power via the gear shift arm 140. Consequently, speed change can be performed quickly. The master arm 80 rotates until a portion at the one end 141*a* side of the regulation opening portion 160 abuts on the damper portion 170 of the stopper pin 146.

When the stored power is released, the gear shift arm 140 rotates in the upshift direction with respect to the downshifting collar 142 which is stopping, and as illustrated in FIG. 15D, the one end of the hole portion 158 of the gear shift arm 140 abuts on the dog tooth 164. Consequently, when the shift spindle 76 is rotated in the downshift direction opposite to the upshift direction, the gear shift arm 140 can be rotated quickly in the downshift direction via the dog tooth 164. Consequently, the state can be quickly returned to the neutral state.

At the time of downshifting, the gear shift arm 140 is rotated in the downshift direction from the neutral state in FIG. 11, and the abutment portion 159*c* of the gear shift arm 140 abuts on the inner edge 160*b* of the regulation opening portion 160 of the master arm 80. An interval until the abutment portion 159*c* abuts on the inner edge 160*b* from the neutral state corresponds to a zone Y in FIG. 8B. In the zone Y, the change clutch 61 is disengaged with rotation of the shift spindle 76, and the shift drum 70 does not rotate yet. When the shift spindle 76 rotates in the downshift direction beyond the zone Y, the master arm 80 rotates in the downshift direction via the abutment portion 159*c*, the shift drum 70 rotates and downshift is performed.

Figure 18:
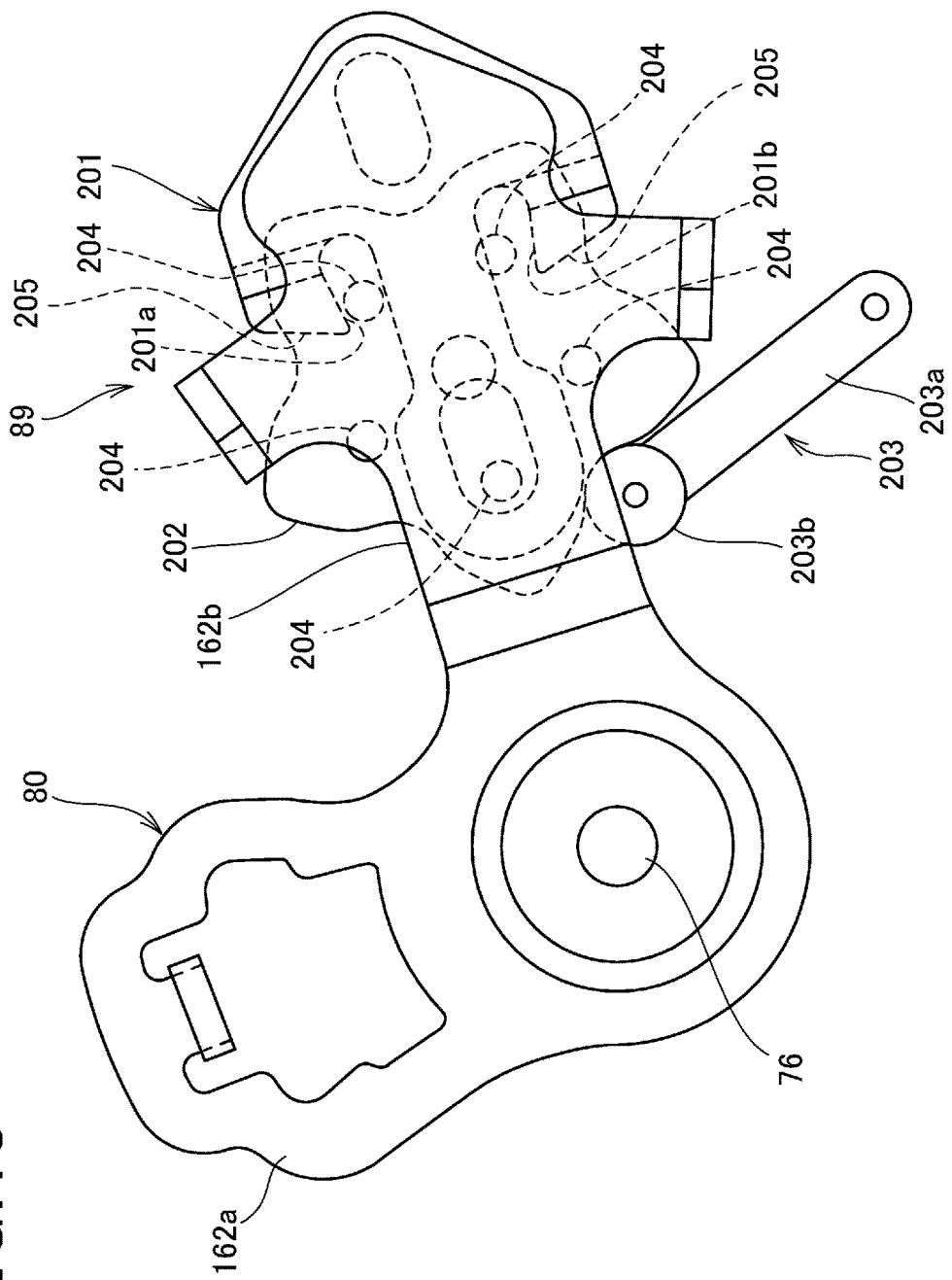
FIG. 18 is a side view of a change mechanism.
Figure 19A:
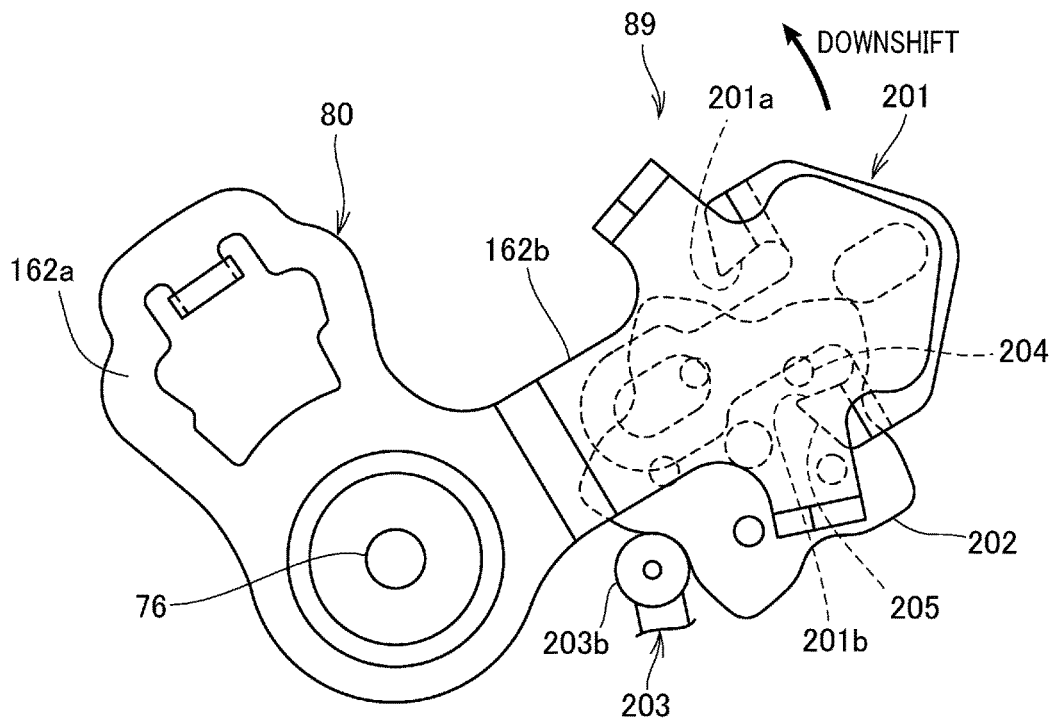
FIGS. 19A and 19B are views illustrating operation states of the change mechanism.
Figure 19B:
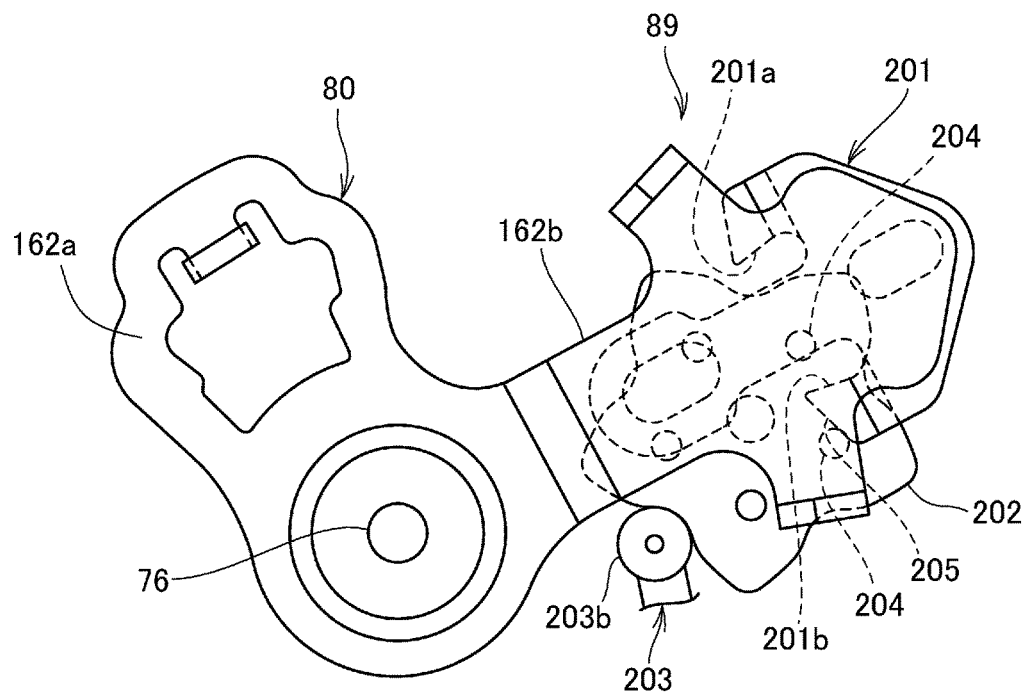

FIG. 18 is a side view of the change mechanism 89. FIGS. 19A and 19B are views illustrating operation states of the change mechanism 89, FIG. 19A illustrates a state completely fed to the downshift direction normally, and FIG. 19B illustrates a state returning to a neutral position side from the state in FIG. 19A.

The change mechanism 89 includes a feeding operation member 201 provided at a tip end portion of the master arm 80, a star-shaped plate 202 provided at a shaft end of the shift drum 70 (FIG. 14), and a stopper arm 203 (an urging member) that abuts on an outer peripheral portion of the star-shaped plate 202 to regulate a rotation position of the star-shaped plate 202.

The star-shaped plate 202 includes a plurality (five) of cam mounting portions that radially protrude at substantially equal intervals in a circumferential direction, and a plurality (five) of locking pins 204 that protrude in an axial direction from outer side surfaces of the respective cam mountain portions. The star-shaped plate 202 is provided integrally at the sift drum 70, and the shift drum 70 rotates by the locking pins 204 being pressed by the feeding operation member 201.

The stopper arm 203 includes an arm portion 203*a* pivotally supported rotatably by the crankcase 26, and a roller 203*b* pivotally supported at a tip end portion of the arm portion 203*a*. The arm portion 203*a* is urged to always abut on the outer periphery portion of the star-shaped plate 202 by a spring (not illustrated) connected to the arm portion 203*a*. That is, when the shift drum 70 rotates, the roller 203*b* moves along a valley portion between the cam mountain portion and the cam mounting portion of the star-shaped plate 202.

The feeding operation member 201 is slidable in a longitudinal direction of the operation arm 162*b* of the master arm 80, and is urged by a spring or the like (not illustrated) to move to a shift spindle 76 side.

The feeding operation member 201 includes an upshifting pressing portion 201*a* and a downshifting pressing portion 201*b* that protrude in an axial direction of the shift drum 70 to the locking pins 204 sides, at a tip end side.

FIG. 18 illustrates the neutral state of the change mechanism 89, and in this state, the roller 203*b* are engaged with the valley portion of the star-shaped plate 202, whereby the shift drum 70 is positioned to a rotation angle corresponding to a predetermined speed stage. Further, in the neutral state, the upshifting pressing portion 201*a* and the downshifting pressing portion 201*b* are respectively located at positions that are slightly separated outward from the two locking pins 204 and 204 that are adjacent each other.

When the master arm 80 rotates in the downshift direction in response to an instruction to downshift, the downshifting pressing portion 201*b* abuts on one of the locking pins 204 from below, and rotates the shift drum 70 in the downshift direction via the locking pin 204. At this time, the downshifting pressing portion 201*b* rotates the shift drum 70 against the urging force of the stopper arm 203. In detail, the downshifting pressing portion 201*b* rotates the shift drum 70 against the urging force of the stopper arm 203 until the roller 203*b* rides over the cam mountain portion of the star-shaped plate 202. After the roller 203*b* rides over the cam mountain portion of the star-shaped plate 202, the shift drum 70 automatically rotates until the roller 203*b* engages with the valley portion by a pressing force generated at the time of the roller 203*b* moving down to a valley portion side. That is, when the shift drum 70 rotates to a position in which the roller 203*b* rides over the cam mountain portion of the star-shaped plate 202, the shift drum 70 automatically rotates to a position corresponding to the next stage, even if the downshifting pressing portion 201*b* separates from the locking pin 204. Consequently, as illustrated in FIG. 19A, in the state where the master arm 80 is completely fed to the downshift direction, the downshifting pressing portion 201b is separated from the locking pin 204. That is, when the shift drum 70 rotates to the position in which the roller 203b rides over the cam mountain portion of the star-shaped plate 202, the master arm 80 is rotatable also in an opposite direction independently from the shift drum 70.

At a time of returning to the neutral state in FIG. 18 from the state in FIG. 19A, the master arm 80 is rotated in the upshift direction. In this case, as illustrated in FIG. 19B, a returning abutment portion 205 provided in a vicinity of the downshifting pressing portion 201b rotates while abutting on another one of the locking pins 204, whereby the feeding operation member 201 moves in the longitudinal direction of the operation arm 162b, and when the feeding operation member 201 completely returns to the neutral position, the state in FIG. 18 is brought about.

Here, the case of downshifting is described, and at the time of upshifting, the upshifting pressing portion 201a presses the locking pin 204 to rotate the shift drum 70 in the upshift direction.

Figure 20:
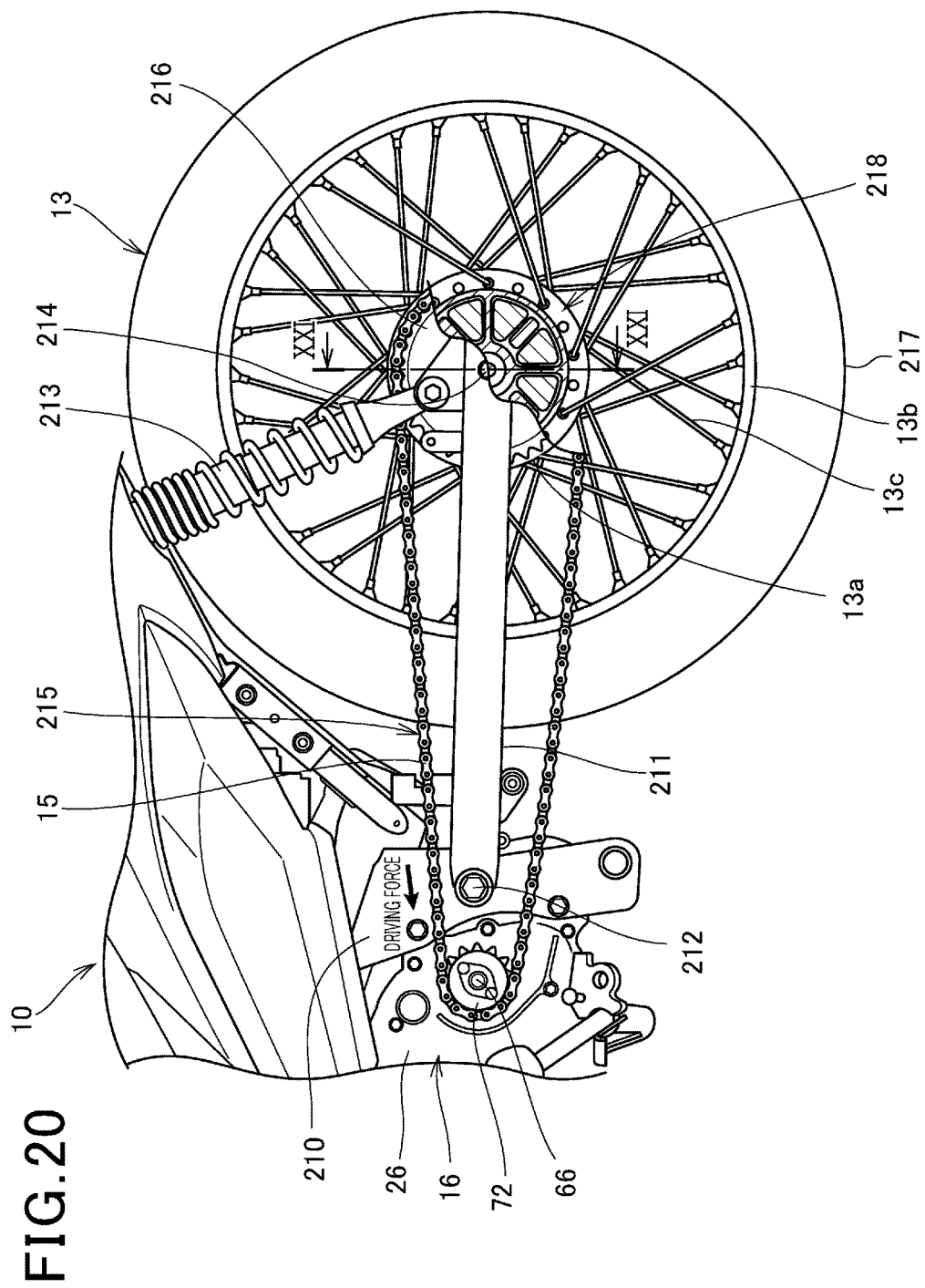
FIG. 20 is a left side view of a rear part of the motorcycle.

FIG. 20 is a left side view of a rear part of the motorcycle 10.

A vehicle body frame of the motorcycle 10 includes a pivot frame 210 extending vertically in a center in a longitudinal direction of a vehicle body. A rear portion of the power unit 16 is supported by the pivot frame 210.

A swing arm 211 that supports the rear wheel 13 is connected to the pivot frame 210 by a pivot shaft 212 that is inserted through a front end. The swing arm 211 is swingable around the pivot shaft 212, and a rear suspension 213 is laid between a rear end of the swing arm 211 and the vehicle body frame. The rear wheel 13 is pivotally supported by an axle 214 provided at a rear end portion of the swing arm 211.

The driving force of the power unit 16 is transmitted to the rear wheel 13 via a driving force transmitting device 215 provided between the engine 21 and the rear wheel 13.

The driving force transmitting device 215 includes the drive sprocket 72 that is fixed to an end of the countershaft 66, a driven sprocket 216 provided at the rear wheel 13, and the chain 15 that is wound between the drive sprocket 72 and the driven sprocket 216.

The rear wheel 13 includes a hub 13a pivotally supported by the axle 214, a rim 13b to which a tire 217 is fitted, and a plurality of spokes 13c (damper members) connecting the rim 13b and the hub 13a.

Figure 21:
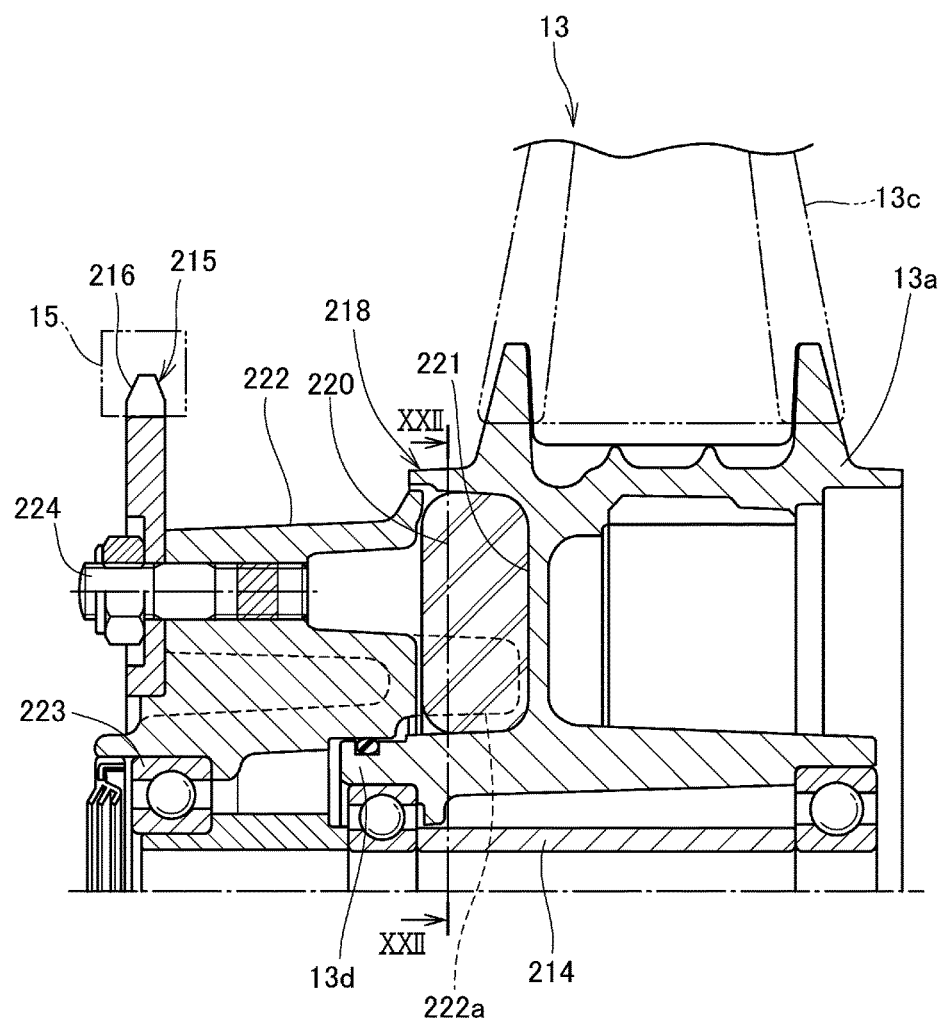
FIG. 21 is a sectional view taken along line XXI-XXI in FIG. 20.
Figure 22:
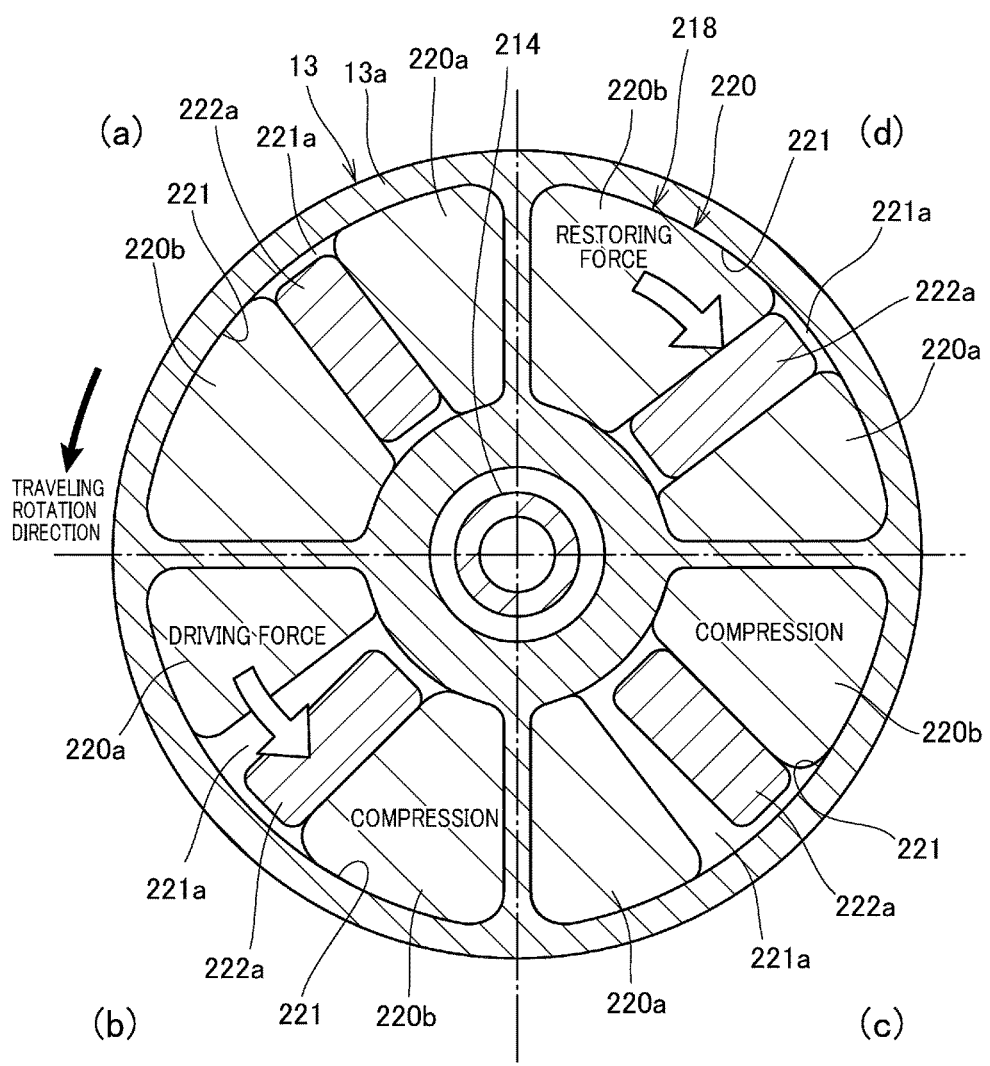
FIG. 22 is a sectional view taken along line XXII-XXII in FIG. 21.

FIG. 21 is a sectional view taken along line XXI-XXI in FIG. 20. FIG. 22 is a sectional view taken along line XXII-XXII in FIG. 21.

As illustrated in FIG. 20 to FIG. 22, a damper mechanism 218 that transmits a driving force from the driving force transmitting device 215 to the rear wheel is provided between the driving force transmitting device 215 and the rear wheel 13.

The damper mechanism 218 includes a plurality of hub dampers 220 (damper members) formed from a rubber or the like, a damper housing portion 221 that is formed in the hub 13a and supports the hub dampers 220, and a cylindrical sprocket support member 222 that supports the driven sprocket 216.

The hub damper 220 includes decelerating dampers 220a that act at a time of decelerating the vehicle, and accelerating dampers 220b that act at a time of acceleration.

The damper housing portion 221 is a recessed portion formed on an outer surface of the hub 13a, and a plurality of damper housing portions 221 are formed in a circumferential direction. In each of the damper housing portions 221, a pair of decelerating damper 220a and accelerating damper 220b are disposed. In each of the damper housing portions 221, the decelerating damper 220a and the accelerating damper 220b are disposed with a gap 221a left in a circumferential direction.

The sprocket support member 222 is provided relatively rotatable with respect to the hub 13a, with an outer end portion in the axial direction pivotally supported by the axle 214 via a bearing 223, and an inner end portion in the axial direction fitted in a cylindrical portion 13d of the hub 13a. The sprocket support member 222 includes a plurality of protruded portions 222a protruding into the damper housing portion 221, and the protruded portion 222a is disposed in the gap 221a and is sandwiched between the decelerating damper 220a and the accelerating damper 220b.

The driven sprocket 216 is fixed to an outer side surface of the sprocket support member 222 with a plurality of bolts 224.

Here, a state of the damper mechanism 218 at a time of traveling will be described with reference to FIG. 22. In FIG. 22, the damper mechanism 218 is divided into four in the circumferential direction, and states (a) to (d) are illustrated. In detail, a region (a) shows a neutral state where the engine 21 and the motorcycle 10 are stopping, a region (b) shows a traveling state where the engine 21 is operated, the change clutch 61 is engaged and the motorcycle 10 is traveling, a region (c) shows a state immediately after the change clutch 61 is disengaged during traveling, and a region (d) shows a state where the motorcycle 10 performs inertial travelling by disengagement of the change clutch 61 immediately after the state (c).

In the neutral state in (a), the motorcycle 10 is stopping, so that deformation of the hub damper 220 by the driving force of the engine 21 does not occur. At an accelerating time, a larger load than the load at a decelerating time works, so that a volume (a capacity) of the accelerating damper 220b is set to be larger than a volume (a capacity) of the decelerating damper 220a.

In the traveling state in (b), the sprocket support member 222 relatively rotates in a forward traveling rotation direction with respect to the hub 13a by the driving force from the engine 21. That is, the moment the motorcycle 10 accelerates in the state in (b), the rotational speed of the protruded portion 222a becomes larger than the rotational speed of the rear wheel 13. As a result, the accelerating damper 220b is compressed in the circumferential direction by the protruded portion 222a to be elastically deformed. Thereby, a variation of torque that is transmitted to the rear wheel 13 from the engine 21 can be absorbed, and impacts at the time of acceleration and a speed change operation can be reduced.

In the state of (c), the moment the change clutch 61 is disengaged, the driving force which is transmitted to the sprocket support member 222 from the engine 21 comes out, the motorcycle 10 starts inertial traveling, and the accelerating damper 220b starts extension and contraction to an original state by a restoring force of its own.

In the state in (d), which is the state immediately after the state in (c), the accelerating damper 220b returns to the original state by the restoring force, and the motorcycle 10 performs inertial traveling. In a time between (c) and (d), the sprocket support member 222 is pushed back in an opposite direction to the direction of the driving force of the engine 21 via the protruded portion 222a, by the restoring force of the accelerating damper 220b, whereby the rotation of the sprocket support member 222 decelerates, and the rotational speed of the sprocket support member 222 becomes lower than the rotational speed of the rear wheel 13. The deceleration of the sprocket support member 222 is also transmitted to the countershaft 66 and the main shaft 65 via the driving force transmitting device 215.

When the change clutch 61 is engaged and the motorcycle 10 travels at a substantially constant speed after the state in (d) is brought about, the deformation amount of the accelerating damper 220b is small, and the damper mechanism 218 is bought into a state close to the state in (d).

Further, when the motorcycle 10 decelerates, the sprocket support member 222 rotates in an opposite direction to the state in (b), and the decelerating damper 220a is compressed by the protruded portion 222a.

FIGS. 23A to 23F are conceptual diagrams illustrating a transmitting state of the driving force of the engine 21 from the engine 21 to a road surface. FIG. 23A illustrates a neutral state where the engine 21 and the motorcycle 10 are stopping, FIGS. 23B to 23F illustrate transmission states of the driving force with a speed change operation during traveling of the motorcycle 10 in time series. FIGS. 24A to 24D are time charts of the operation of the automatic transmission device 25 at the time of upshifting. FIG. 24D shows an engine speed Ne of the engine 21, a rotational frequency Nm of the main shaft 65, and a rotational frequency Nc of the countershaft 66, with respect to a lapse of time.

Here, the rotational frequency Nm of the main shaft 65 is a value obtained by multiplying an actual rotational frequency of the main shaft 65 which is detected by the main shaft rotational frequency sensor 65a by a deceleration ratio between the main shaft 65 and the crankshaft 23. In a state where the change clutch 61 is completely engaged, the engine speed Ne and the rotational frequency Nm are equal to each other. That is, from the diagram of the rotational frequency in FIG. 24D, the engagement state of the change clutch 61 is known. Further, the rotational frequency Nc of the countershaft 66 in FIG. 24D is a value obtained by multiplying an actual rotational frequency of the countershaft 66 which is detected by the countershaft rotational frequency sensor 73 by the deceleration ratio between the countershaft 66 and the crankshaft 23. In the state where the change clutch 61 is completely engaged, the engine speed Ne and the rotational frequency Nc are equal to each other.

In FIG. 23A, the motorcycle 10 is stopping, the driving force of the engine 21 is not generated, the change clutch 61 is engaged, and the dog clutch 67Dc is disengaged. In each of FIGS. 23A to 23F, the output shaft is illustrated, and the countershaft 66 also serve as the output shaft.

In FIG. 23B, the motorcycle 10 has the change clutch 61 engaged, and is traveling by the driving force of the engine 21 in the speed stage established by the dog clutch 67Dc, and the dog clutch 67Dc is engaged. The state in FIG. 23B corresponds to a time t1 in FIGS. 24A to 24D, and in this state, the engine speed Ne, the rotational frequency Nm and the rotational frequency Nc are equal.

Here, in the dog clutch 67Dc, a plurality of dog teeth 67b1 and a plurality of dog teeth 67c1 are formed at intervals respectively in the circumferential direction, and even in the state where the dog clutch 67Dc are engaged and the driving force is applied, a play PL in the circumferential direction is present in the opposite direction to the driving force, between the dog teeth 67b1 and the dog teeth 67c1. By the presence of the play PL, engagement and disengagement of the dog clutch 67Dc are facilitated.

In FIG. 23B, the driving force transmitted to the countershaft 66 is transmitted to the road surface through the driving force transmitting device 215 and the rear wheel 13. At this time, in the driving force transmitting device 215, the chain 15 is pulled to deform elastically, the accelerating damper 220b is compressed to deform elastically in the damper mechanism 218, the spokes 13c elastically deform in such a manner as to bend, and the tire 217 elastically deforms between the rim 13b and the road surface.

FIG. 23C is a diagram illustrating a state immediately after the change clutch 61 is disengaged, with speed change in FIG. 23B. From the state, the motorcycle 10 starts inertial traveling. The state in FIG. 23C corresponds to a time t2 in FIGS. 24A to 24D. The rotational frequency Nm and the rotational frequency Nc start to reduce substantially simultaneously, the moment the change clutch 61 is disengaged and the driving force of the engine 21 is shut off.

In FIG. 23D, as the result that the change clutch 61 is disengaged in FIG. 23C, a restoring force to the elastic deformation acting on the chain 15, the accelerating damper 220b, the spoke 13c and the tire 217 acts, and the restoring force is transmitted to the countershaft 66 and the main shaft 65. A contribution rate to the restoring force is the largest in the accelerating damper 220b.

In detail, the above described restoring force that is transmitted to the countershaft 66 is transmitted from the driven gear 68c of the countershaft 66 to the main shaft 65 via the drive gear 67c of the free gear, the dog clutch 67Dc and the drive gear 67b. The state in FIG. 23D corresponds to a time t3 in FIGS. 24A to 24D.

The main shaft 65 has a smaller moment of inertia apparently than the countershaft 66 driven by the rear wheel 13, and the rotation speed of the main shaft 65 easily reduces. Consequently, when the change clutch 61 is disengaged during traveling, the main shaft 65 relatively rotates to the countershaft 66 in an opposite direction to the driving force, and with this, the dog teeth 67b1 relatively rotate with respect to the dog teeth 67c1 by an amount corresponding to the play PL. Consequently, at the time t3, the rotational frequency Nm becomes smaller than the rotational frequency Nc, and reduces to a minimum rotational frequency Nmmin. The rotational frequency Nm reduces for only a moment at the time of rotating by the amount of the play PL at the time t3, but when the play PL becomes zero, the rotational frequency Nm assimilates with the rotational speed of the countershaft 66 having a large moment of inertia.

After the state in FIG. 23D, before a state in FIG. 23E, the shift drum 70 rotates by rotation of the shift spindle 76, and speed change to the next stage established by the dog clutch 68Dc (FIG. 2) is performed.

FIG. 23E illustrates a state immediately after the change clutch 61 is started to be engaged after completion of the speed change to the next stage. The state in FIG. 23E corresponds to a time t4 in FIGS. 24A to 24D.

The dog clutch 68Dc also includes a play (not illustrated) in the circumferential direction similarly to the dog clutch 67Dc. A dimension of the play depends on an engaged state of the dog clutch 68Dc at the time of performing speed change to the next stage, and the play of a certain dimension is usually present.

As illustrated in FIG. 23E, when engagement of the change clutch 61 is started, the driving force of the engine 21 is transmitted from the drive gear 67b of the main shaft 65 to the countershaft 66 via the driven gear 68b, the dog clutch 68Dc and the driven gear 68c. In detail, the moment the change clutch 61 starts to be engaged in a half-clutch state, rotation of the main shaft 65 is accelerated by the driving force of the engine 21, and with this, rotation of the driven gear 68b that is a free gear is also accelerated. Thereby, the dog teeth 68b1 relatively rotates in the direction of the driving force by the amount corresponding to the above described play, with respect to the dog teeth 68*c*1. That is, the main shaft 65 is relatively rotatable to the countershaft 66 by the amount corresponding to the above described play. Consequently, at the time t4, the rotational frequency Nm becomes larger than the rotational frequency Nc, and increases to the rotational frequency Nmt. The rotational frequency Nmt is substantially equal to the engine speed Ne at the time t4.

FIG. 23F illustrates a state where the dog clutch 68Dc is completely engaged after the state in FIG. 23E. The rotational frequency Nm increases for only a moment at the time of rotating by the amount of the play at the time t4, but when the play becomes zero, the rotational frequency Nm assimilates with the rotational speed of the countershaft 66 having a large moment of inertia.

In the state in FIG. 23F, with engagement of the change clutch 61, the engine speed Ne of the engine 21 comes close to the rotational frequency Nm of the main shaft 65 with a lapse of time, and absorption of a rotation difference is performed, and the engine speed Ne coincides with the rotational frequency Nm at a time t5. In FIGS. 24A to 24D, speed change to a higher gear is performed, so that the engine speed Ne of the engine 21 after speed change becomes smaller than the engine speed Ne before speed change. Here, the rotational frequency Nm at the time of absorption of a rotation difference ending is referred to as a rotation difference absorption end rotational frequency Nmfin.

In FIGS. 24A to 24D, a horizontal axis represents the time, and a vertical axis represents the angle of the shift spindle 76, the torque of the countershaft 66, the angle of the shift drum 70, and the above described engine speed Ne, rotational frequency Nm and rotational frequency Nc.

Figure 24A:
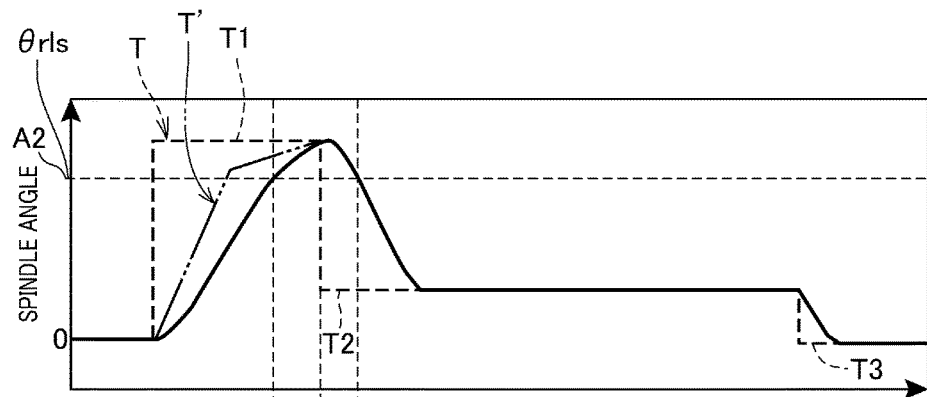
FIGS. 24A to 24D are time charts of an operation of the automatic transmission device at a time of upshifting.
Figure 24B:
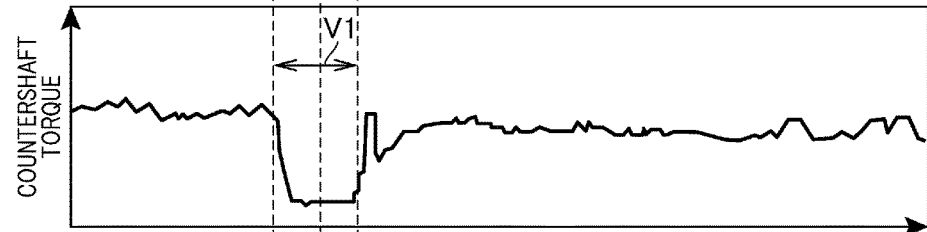

As illustrated in FIG. 24A, in a time chart illustrating the angle of the shift spindle 76, a target angle pattern T of the angle of the shift spindle 76 that is set by the control unit 17 is illustrated together. The control unit 17 drives the shift motor 75 so that the angle of the shift spindle 76 follows the target angle pattern T. The target angle pattern T is a step input by which a final target angle is set at one time, but a target angle may be a ramp input that brings the target angle to a final target angle gradually with respect to a lapse of time, as shown by a target angle pattern T'.

At the time of upshifting, the angle of the shift spindle 76 increases to store force and disengage the clutch, and is returned to the neutral position after speed change.

When the angle of the shift spindle 76 increases and the change clutch 61 is disengaged at a rotation position A2, the torque of the countershaft 66 is reduced because the power from the engine 21 is not supplied, and thereafter the torque of the countershaft 66 increases again when the change clutch 61 is engaged.

Figure 24C:
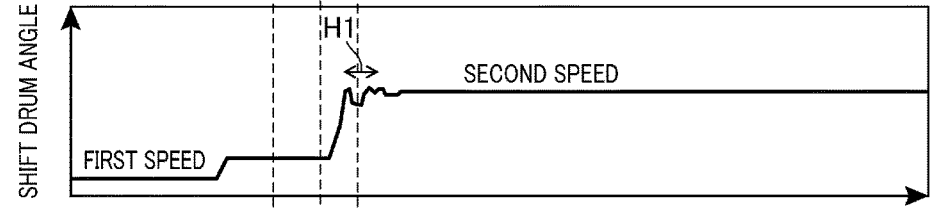
Figure 24D:
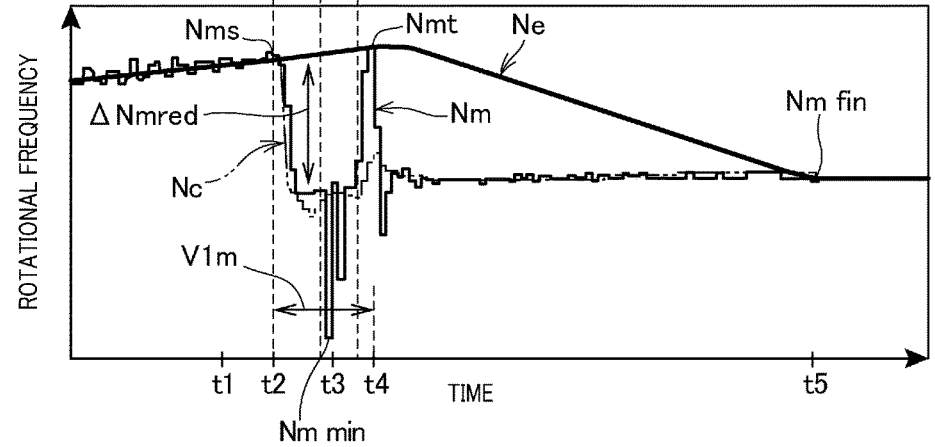

FIG. 24C illustrates a state of the angle of the shift drum 70 in the case of changing the speed from a first speed to a second speed as an example, but the angle of the shift drum 70 is in the similar state in another speed stage.

Figure 25:
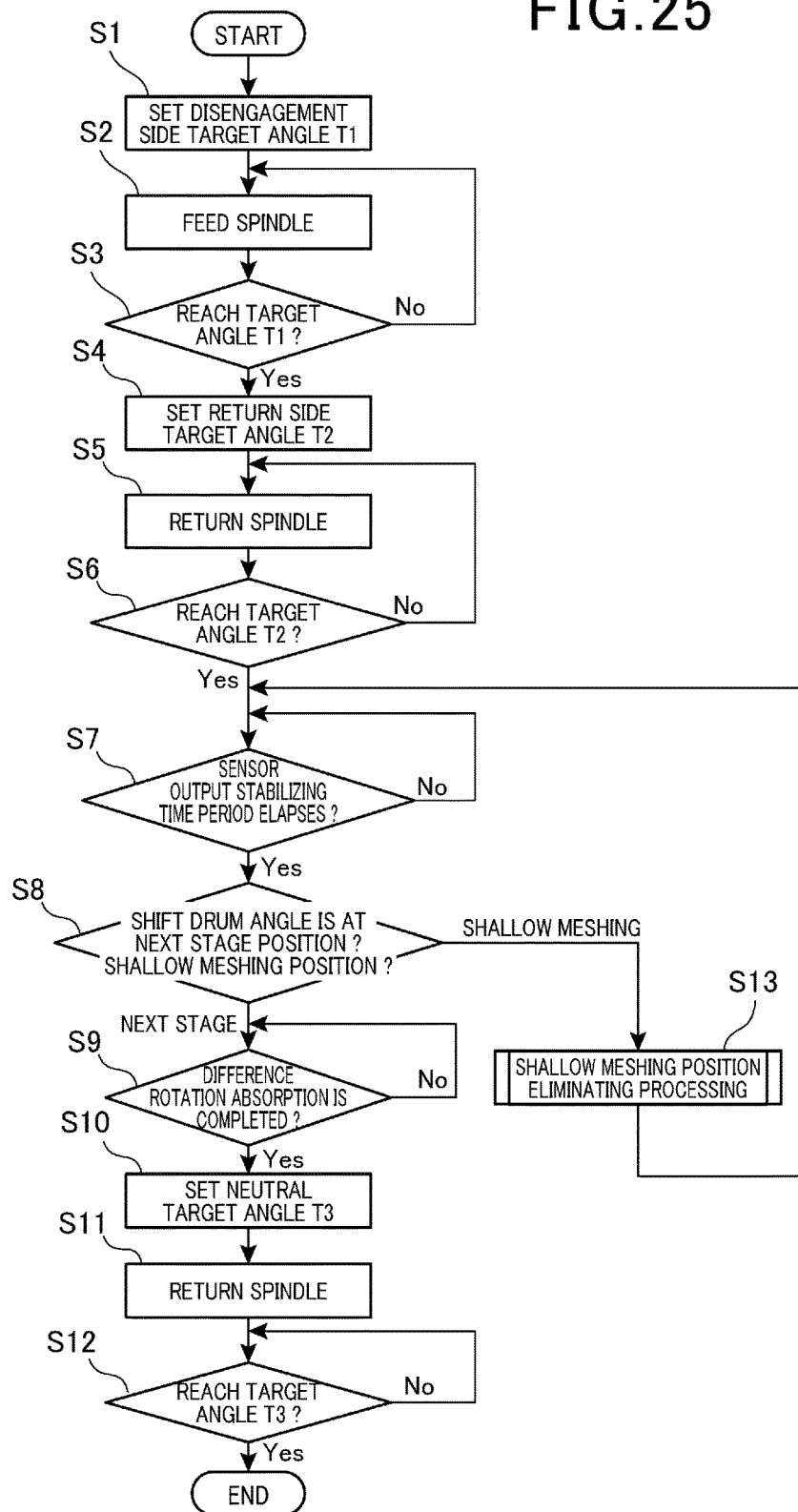
FIG. 25 is a flowchart illustrating a process of the automatic transmission device at a time of upshifting.

FIG. 25 is a flowchart illustrating a process of the automatic transmission device 25 at the time of upshifting.

Referring to FIGS. 24A to 24D and FIG. 25, when an instruction to upshift is issued, the control unit 17 sets the disengagement side target angle T1 that is the target angle of the shift spindle 76 at the clutch disengagement side (step S1), and drives the shift motor 75 so as to realize the disengagement side target angle T1 (step S2). Here, the disengagement side target angle T1 is set at a larger angle than the rotation position A2 of the shift spindle 76 in which the change clutch 61 is completely disengaged. Consequently, the change clutch 61 is disengaged before the shift spindle 76 reaches the disengagement side target angle T1.

In a period until the change clutch 61 is disengaged after the shift spindle 76 rotates, power storage is performed in the power storing mechanism 81. Further, in the period until the change clutch 61 is disengaged after the shift spindle 76 rotates, the engine speed Ne, the rotational frequency Nm and the rotational frequency Nc are equal to one another. When the angle of the shift spindle 76 reaches the rotation position A2 at the time t2, the change clutch 61 is disengaged, whereby the torque of the countershaft 66 is reduced, and the gear change mechanism 63 releases the stored power of the power storing mechanism 81 to start speed change.

When the change clutch 61 is disengaged, the driving force of the engine 21 is not supplied, and the rotational frequency Nm and the rotational frequency Nc are reduced.

The control unit 17 determines whether or not the angle of the shift spindle 76 reaches the disengagement side target angle T1 (step S3), and when the angle of the shift spindle 76 does not reach the disengagement side target angle T1 (step S3: No), the control unit 17 returns to step S2 and continues drive of the shift motor 75.

When the angle of the shift spindle 76 reaches the disengagement side target angle T1 (step S3: Yes), the control unit 17 sets a return side target angle T2 that is a target angle at the clutch engagement side that returns the shift spindle 76 to the neutral position side (step S4), and drives the shift motor 75 to return the shift spindle 76 to the neutral position side (step S5). Step S4 and step S5 are first rotation control that returns the shift spindle 76 to the neutral position side in the process of upshift. Here, the return side target angle T2 is the angle of the shift spindle 76 at which the capacity of the change clutch 61 becomes the first intermediate capacity C2. The return side target angle T2 can be any angle corresponding to the intermediate capacity of the change clutch 61, and may be an angle corresponding to the second intermediate capacity C3. That is, the return side target angle T2 is also the clutch capacity control target angle that determines the capacity of the change clutch 61 controlled by the angle of the shift spindle 76.

When the shift spindle 76 is returned to the neutral position side from the disengagement side target angle T1, the power storing mechanism 81 rotates to the neutral position side from a state (only the master arm is illustrated by a two-dot chain line) after the operation of releasing the stored power from the state in FIG. 17. In this case, as described above, after rotation of the shift drum 70, the master arm 80 is rotatable in an opposite direction independently without influencing the shift drum 70, so that even when the shift spindle 76 returns to the neutral position side, rotation of the shift drum 70 is not influenced.

Next, the control unit 17 determines whether or not the angle of the shift spindle 76 reaches the return side target angle T2 (step S6), and when the angle of the shift spindle 76 does not reach the return side target angle T2 (step S6: No), the control unit 17 returns to step S5, and continues drive of the shift motor 75.

The angle of the shift spindle 76 reaches the rotation position A2 while returning to the return side target angle T2 from the disengagement side target angle T1, and in the rotation position A2, the change clutch is engaged again. In this way, a time period in which the change clutch 61 is disconnected between the rotation position A2 at the disengagement side and the rotation position A2 at the return side is a driving force removal time period V1 in which the power of the engine 21 is not transmitted to the main shaft 65. In the driving force removal time period V1, the motorcycle 10 travels by inertia, so that the driving force removal time period V1 can be the factor that causes the driver to feel a sense of discomfort.

In the present embodiment, the gear change mechanism 63 includes the power storing mechanism 81, and the shift drum 70 is rotated at once by release of the stored power accompanying disengagement of the change clutch 61, so that speed change to the second speed (the next stage) from the first speed (the predetermined speed stage) is completed within the driving force removal time period V1.

When the change clutch 61 is engaged at the return side to the neutral position, the torque of the countershaft 66 increases to be equivalent to the torque before speed change.

Further, when the change clutch 61 is engaged at the return side to the neutral position, the rotational frequency Nm of the main shaft 65 increases to a rotational frequency Nmt for only a moment at the time t4 and returns to an original rotational frequency, and the engine speed Ne decreases to coincide with the rotational frequency Nm with a lapse of time. That is, when the change clutch 61 is engaged at the return side to the neutral position, absorption of the rotation difference between the engine speed Ne and the rotational frequency Nm is performed by the change clutch 61.

A change of the rotational frequency Nc of the countershaft 66 at the time of engaging the change clutch 61 has a similar tendency as the change of the rotational frequency Nm of the main shaft 65, but a degree of the change is smaller than a degree of the change of the main shaft 65.

When the angle of the shift spindle 76 reaches the return side target angle T2 (step S6: Yes), the control unit 17 determines whether or not a sensor output stabilizing time period H1 of the drum angle sensor 70b elapses (step S7). Here, the control unit 17 always detects the rotation position of the shift drum 70 by the drum angle sensor 70b, and the sensor output stabilizing time period H1 refers to a predetermined time period set in advance which is until the output value of the drum angle sensor 70b is stabilized after the drum angle sensor 70b initially detects that the gear position is in the next stage (the second speed). After the sensor output stabilizing time period H1 elapses, vibration of the shift drum 70 converges, and the control unit 17 can correctly detect the rotation position of the shift drum 70.

When the control unit 17 detects that the shift spindle 76 reaches the disengagement side target angle T1 in the present embodiment, the control unit 17 sets the return side target angle T2 and immediately thereafter, returns the shift spindle 76 to the neutral position side. In detail, the control unit 17 starts rotation of the shift spindle 76 to the neutral position side before the control unit 17 detects that the gear position is in the next stage (the second speed) by the drum angle sensor 70b. Thereby, the change clutch 61 can be reengaged earlier and the driving force removal time period V1 can be shortened, correspondingly to omission of the time period required for the power storing mechanism 81 and the change mechanism 89 to operate and the sensor output stabilizing time period H1, so that the driver can be prevented from feeling a sense of discomfort. In the present embodiment, speed change by the rotation of the shift drum 70 is properly performed by the stored power of the power storing mechanism 81, so that rotation to the neutral position side of the shift spindle 76 can be started before the drum angle sensor 70b detects that the gear position is in the next stage.

When the shift drum 70 is rotated by release of the stored power in step S2 and step S3, dog hitting and shallow meshing sometimes occur in the dog clutch of the gear of the transmission 60. Here, dog hitting and shallow meshing will be described with the driven gear 68b and the driven gear 68c cited as an example.

The transmission 60 is of a constant-mesh type, and the driven gear 68b and the driven gear 68c are relatively rotating in the state where the driven gear 68b and the driven gear 68c are not connected to each other, so that when the driven gear 68c which is a shifter gear is slid to the side of the driven gear 68b which is a free gear at the time of speed change, the dog teeth 68b1 and the dog teeth 68c1 are meshed with one another with a normal depth in some cases, and dog hitting in which top surfaces of the dog teeth 68b1 and the dog teeth 68c1 hit one another occurs in other cases.

Dog hitting is eliminated by relative rotation occurring to between the driven gear 68b and the driven gear 68c against the frictional force of the top surfaces of the dog teeth 68b1 and the dog teeth 68c1. In the present embodiment, the return side target angle T2 in step S4 is set at the angle of the shift spindle 76 which corresponds to the first intermediate capacity C2 of the change clutch 61, so that even when dog hitting occurs between the driven gear 68b and the driven gear 68c, relative rotation occurs between the driven gear 68b and the driven gear 68c when the change clutch 61 is engaged, and dog hitting is eliminated.

However, the driven gear 68b that is driven to the crankshaft 23 side rotates faster than the driven gear 68c, so that when a sliding force of the driven gear 68c is insufficient, side surfaces of the dog teeth 68b1 and the dog teeth 68c1 contact one another before the dog teeth 68c1 are completely meshed with the dog teeth 68b1, and a depth of meshing sometimes becomes shallow. A state in which the dog teeth are meshed with one another in a shallower state than a normal meshing depth is defined as shallow meshing here. In the shallow meshing state, the driving force of the engine 21 acts between the side surfaces of the dog teeth 68b1 and the dog teeth 68c1 that are in contact with one another, so that a frictional force occurs, and the driven gear 68c is difficult to slide. Consequently, the shallow meshing state is continued.

Referring to FIGS. 24A to 24D, and FIG. 25, when the sensor output stabilizing time period H1 does not elapse (step S7: No), the control unit 17 waits until the sensor output stabilizing time period H1 elapses, and when the sensor output stabilizing time period H1 elapses (step S7: Yes), the control unit 17 determines whether the angle of the shift drum 70 is in the position of the next stage (the second speed), or in a shallow meshing position (step S8). Here, the shallow meshing position refers to a position in which the angle of the shift drum 70 becomes a slightly smaller angle than in the position of the next stage correspondingly to shallowness of the meshing depth of the dog teeth.

When the angle of the shift drum 70 is at the position of the next stage (step S8: the next stage), the control unit 17 determines whether or not absorption of the rotation difference between the engine speed Ne of the engine 21 and the rotational frequency Nm of the main shaft 65 is completed (whether or not the rotation difference becomes zero) (step S9), and when absorption of the rotation difference is not completed, the control unit 17 waits until the absorption of the rotation difference is completed (step S9: No). That is, the control unit 17 keeps the change clutch 61 at the first intermediate capacity C2 until absorption of the rotation difference is completed after the control unit performs speed change to the next stage. Consequently, after the speed change to the next stage is performed, a speed change shock at the time of engaging the change clutch 61 can be gradually absorbed in a half-clutch state, and the speed change shock can be reduced.

When absorption of the rotation difference is completed at the time t5 (step S9: Yes), the control unit 17 sets a neutral target angle T3 that is a target angle for returning the shift spindle 76 to the neutral position (0°) (step S10), and drives the shift motor 75 so that the angle of the shift spindle 76 reach the neutral target angle T3 (step S11).

Next, the control unit 17 determines whether or not the angle of the shift spindle 76 reaches the neutral target angle T3 (step S12), and when the angle of the shift spindle 76 does not reach the neutral target angle T3 (step S12: No), the control unit 17 returns to step S11 and continues drive of the shift motor 75.

The control unit 17 ends the process when the angle of the shift spindle 76 reaches the neutral target angle T3 (step S12: Yes).

When the angle of the shift drum 70 is in a shallow meshing position (step S8: shallow meshing), the control unit 17 performs a shallow meshing elimination process (step S13).

The shallow meshing elimination process is a similar process to the process from step S1 to step S6, and is a process that disengages the change clutch 61 which is engaged after a speed change operation, again, and rotates the shift drum 70 by the stored power or the force of the stopper arm 203 to eliminate shallow meshing.

Figure 26:
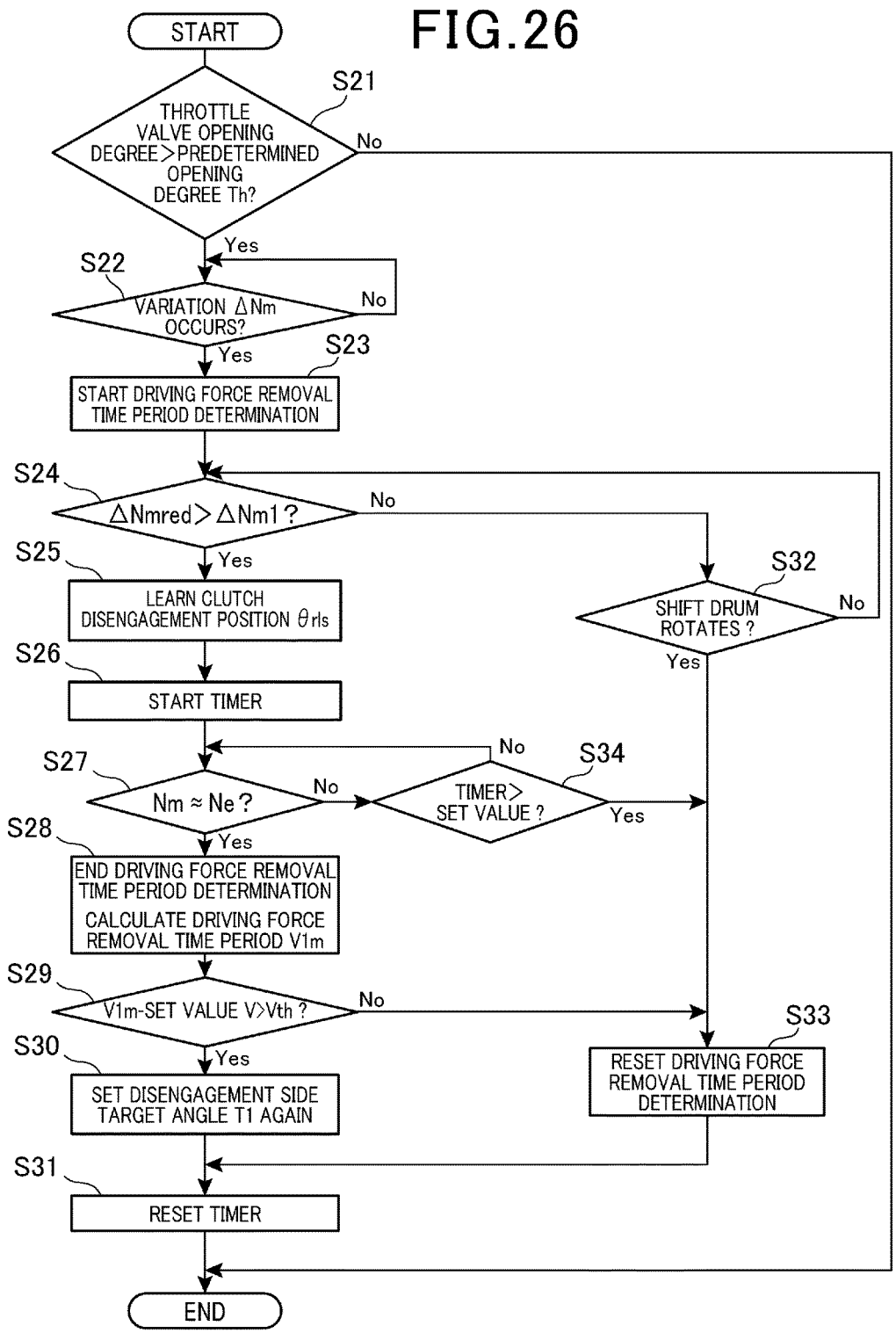
FIG. 26 is a flowchart of a process of detecting a disengagement position of the change clutch during speed change.

FIG. 26 is a flowchart of a process of detecting a disengagement position of the change clutch 61 during speed change. The control unit 17 starts the process in FIG. 26 simultaneously with the start of the process of speed change in FIG. 25.

First, the control unit 17 determines whether or not the opening degree of the throttle valve 53 is a predetermined opening degree Th or more based on an output of the throttle position sensor 134 during traveling (step S21). The predetermined opening degree Th is set at a somewhat large opening degree so that the rotational frequency Nm and the rotational frequency Nc reduce distinctly when the change clutch 61 is disengaged at the time t2. The predetermined opening degree Th is set in advance by an experiment and calculation.

When the opening degree of the throttle valve 53 is smaller than the predetermined opening degree Th (step S21: No), the control unit 17 ends the process in FIG. 26.

When the opening degree of the throttle valve 53 is the predetermined opening degree Th or more (step S21: Yes), the control unit 17 determines whether or not a variation ΔNmred in a deceleration direction occurs to the rotational frequency Nm of the main shaft 65 (step S22). Here, the control unit 17 determines that the variation ΔNmred occurs when a change amount in the deceleration direction of the rotational frequency Nm per unit time becomes larger than a predetermined value. When the variation ΔNmred does not occur (step S22: No), the control unit 17 waits until the variation ΔNmred occurs.

When the variation ΔNmred occurs (step S22: Yes), the control unit 17 starts the process of the driving force removal time period determination for determining the driving force removal time period V1 (step S23), and determines whether or not the variation ΔNmred is a learning starting predetermined value ΔNm1 (a predetermined value) or more (step S24). Here, the learning starting predetermined value ΔNm1 is set at a value that is a negative value showing an abrupt deceleration of the rotational frequency of the main shaft 65, and can be considered as the abrupt deceleration occurring by disengagement of the change clutch 61. The learning starting predetermined value ΔNm1 is set in advance by an experiment and calculation.

When the variation ΔNmred is the learning starting predetermined value ΔNm1 or more (step S24: Yes), the control unit 17 considers that disengagement of the change clutch 61 occurs, stores (learns) the rotation angle (position) of the shift spindle 76 at the time t2 at which the variation ΔNmred starts to occur in the RAM (the volatile memory) as a clutch disengagement rotation angle θrls (a clutch disengagement operation amount) at which the change clutch 61 is disengaged, stores the rotational frequency Nm at the time t2 in the RAM as the deceleration starting time rotational frequency Nms (step S25), and further starts count of a timer for determining increase of rotation of the main shaft 65 (step S26). The clutch disengagement rotation angle θrls corresponds to the rotation position A2. The time t2 corresponds to the state in FIG. 23C.

In this way, by learning the clutch disengagement rotation angle θrls based on the variation ΔNmred of the rotational frequency Nm of the main shaft 65, the clutch disengagement rotation angle θrls can be learned with high precision with the simple configuration.

The control unit 17 compares the learned clutch disengagement rotation angle θrls with a clutch disengagement rotation angle of the shift spindle 76 that is set in the EEPROM (a nonvolatile memory) as an initial value at a time of manufacturing the motorcycle 10, for example, can set the clutch disengagement rotation angle for controlling of the shift spindle 76 again, and can diagnose a failure. Further, a clutch disengagement rotation angle θrlsave that is an average value of the clutch disengagement rotation angles θrls that are learned a plurality of times may be used in setting the clutch disengagement rotation angle again and diagnosing a failure.

Simultaneously with the start of count of the timer, the control unit 17 determines whether or not the rotational frequency Nm of the main shaft 65 increases in a positive direction to a value substantially equal to the engine speed Ne of the engine 21 at that time momentarily (step S27). It can be determined that the rotational frequency Nm momentarily increases, based on the case in which the change amount per unit time in the acceleration direction of the rotational frequency Nm becomes larger than a predetermined threshold value, and that a waveform of the rotational frequency Nm is in a spike shape in the positive direction, for example.

In FIG. 24D, at the time t4, the rotational frequency Nm momentarily increases to the engine speed Ne of the engine 21.

When the rotational frequency Nm of the main shaft 65 momentarily increases to the value substantially equal to the engine speed Ne (step S27: Yes), the control unit 17 ends the driving force removal time period determination, and calculates a driving force removal time period V1m (step S28). In detail, the control unit 17 calculates a time period between the time t2 at which the variation ΔNmred starts to occur, and the time t4 at which the rotational frequency Nm momentarily increases to the value substantially equal to the engine speed Ne of the engine 21 as the driving force removal time period V1m. Here, the time t4 corresponds to the state in FIG. 23E.

In this way, by calculating the driving force removal time period V1m based on the variation of the rotational frequency Nm, the driving force removal time period can be obtained easily with high precision.

Next, the control unit 17 determines whether or not a difference between the calculated driving force removal time period V1m and a set value V of the driving force removal time period set in design set in advance is a predetermined threshold value Vth or more (step S29).

When the difference between the driving force removal time period V1m and the set value V is the predetermined threshold value Vth or more (step S29: Yes), the control unit 17 sets the disengagement side target angle T1 of the shift spindle 76 again (step S30). That is, when the driving force removal time period V1m is too large, the disengagement side target angle T1 is set at an appropriate value again. In detail, a new disengagement side target angle T1rev that is set again is calculated by expression (1), for example.

$$\text{Disengagement side target angle } T1rev = \text{present disengagement side target angle } T1 - \text{set value } V \times \text{coefficient } \alpha \quad (1)$$

Here, a unit of the disengagement side target angle T1 is an angle (°), a unit of the set value V is a time (sec), and a unit of the coefficient $\alpha$ is (°/sec). The coefficient $\alpha$ is set in advance by an experiment and calculation.

Subsequently, the control unit 17 resets the count of the timer which is started in step S26 (step S31), and ends the process in FIG. 26.

Here, returning to step S24, when the variation $\Delta$Nmred is smaller than the learning starting predetermined value $\Delta$Nm1 (step S24: No), the control unit 17 determines whether or not the shift drum 70 rotates to the next stage (step S32).

When the shift drum 70 does not rotate to the next stage (step S32: No), the control unit 17 returns to processing in step S24. When the shift drum 70 rotates to the next stage (step S32: Yes), the control unit 17 resets the process of the driving force removal time period determination (step S33), and ends the process in FIG. 26. In this way, speed change to the next stage is sometimes completed without the variation $\Delta$Nmred reaching the learning starting predetermined value $\Delta$Nm1.

When the rotational frequency Nm of the main shaft 65 does not increase to the value substantially equal to the engine speed Ne momentarily (step S27: No), the control unit 17 determines whether or not the count of the timer reaches a set value (step S34). When the count of the timer does not reach the set value (step S34: No), the control unit 17 returns to the processing in step S27.

When the count of the timer reaches the set value (step S34: Yes), the control unit 17 resets the process of the driving force removal time period determination (step S33), and resets the count of the timer (step S31), and ends the process in FIG. 26. This case is the case in which increase of the rotational frequency Nm of the main shaft 65 by engagement of the change clutch 61 is small, and calculation of the driving force removal time period V1m is not performed.

When the difference between the driving force removal time period V1m and the set value V is smaller than a predetermined threshold value Vth (step S29: No), the control unit 17 resets the process of the driving force removal time period determination (step S33), resets the count of the timer (step S31), and ends the process in FIG. 26. This case is the case in which a deviation of the driving force removal time period V1m is small, and the disengagement side target angle T1 is not set again.

Figure 27A:
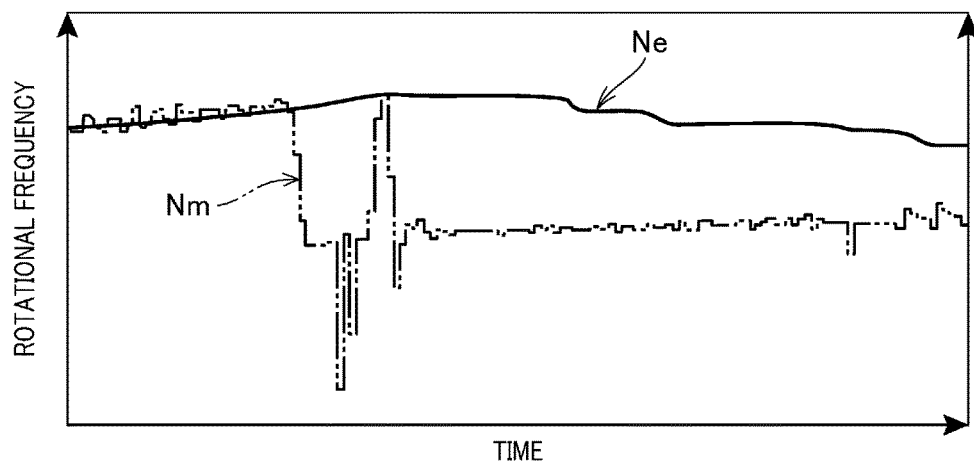
FIGS. 27A and 27B are diagrams illustrating a state in which a deviation occurs in a relationship between an angle of the shift spindle and a capacity of the change clutch at a time of engagement of the clutch.
Figure 27B:
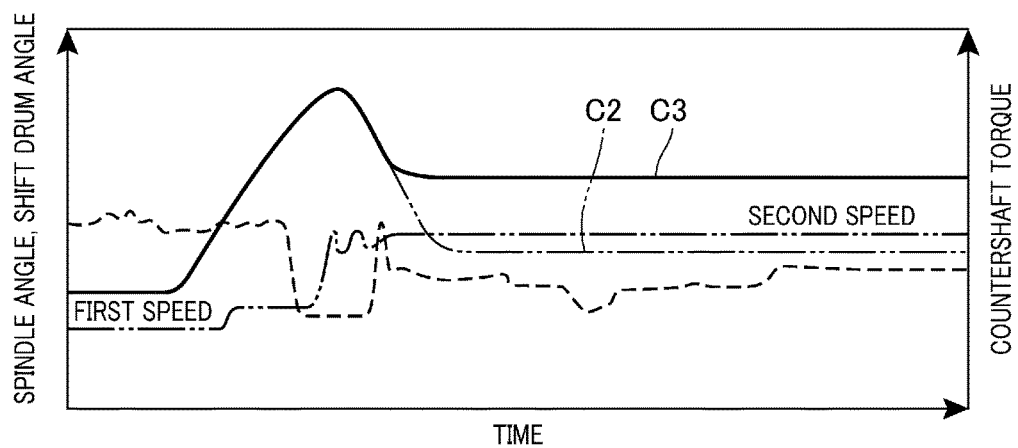

FIGS. 27A and 27B are diagrams illustrating a state in which a deviation occurs to a relationship between the angle of the shift spindle 76 and the capacity of the change clutch 61 at the time of engaging the clutch. In the diagram of FIG. 27B, the angle of the shift spindle 76 is shown by a solid line, the torque of the countershaft 66 is shown by a broken line, and the angle of the shift drum 70 is shown by a two-dot chain line. Further, in the diagram in FIG. 27B, reference signs of the capacities of the change clutch 61 corresponding to the angles of the shift spindle 76 are illustrated.

In FIGS. 27A and 27B, the control unit 17 controls the shift spindle 76 so that the capacity of the change clutch 61 becomes the intermediate capacity C2 at the time of engaging the change clutch 61 after speed change, but for the reasons of abrasion of the components, an assembly error and the like, the capacity of the change clutch 61 becomes the second intermediate capacity C3 which is a smaller capacity. Consequently, the capacity of the change clutch 61 is insufficient with respect to the driving force of the engine 21 so that the rotation difference between the engine speed Ne and the rotational frequency Nm does not converge, the half-clutch state is continued, and torque of the countershaft 66 after speed change is reduced.

The control unit 17 monitors the rotation difference between the engine speed Ne and the rotational frequency Nm after engagement of the change clutch 61, and when the rotation difference does not become zero (the state at the time t5 in FIGS. 24A to 24D) within a predetermined time period after engagement of the change clutch 61 is started, the control unit 17 determines that a deviation occurs to the relationship between the angle of the shift spindle 76 and the capacity of the change clutch 61. Next, the control unit 17 corrects the rotation amount of the shift spindle 76. In the case of the state in FIGS. 27A and 27B, the rotation angle of the shift spindle 76 at the time of engaging the change clutch 61 is changed more to a neutral position side so that the capacity becomes the first intermediate capacity C2. Thereby, at the time of engaging the change clutch 61 next time, the change clutch 61 can be engaged with an appropriate clutch capacity.

As described above, according to the first embodiment to which the present invention is applied, the motorcycle 10 includes the transmission 60 having the main shaft 65 to which the rotation power from the engine 21 is inputted via the change clutch 61, and the countershaft 66 to which rotation power of the main shaft 65 is transmitted via a constant-mesh gear, the shift spindle 76 that is driven by the shift motor 75 and performs disengaging and engaging operations of the change clutch 61, the shift spindle angle sensor 79 that detects an operation amount of the shift spindle 76, the control unit 17 that operates the shift motor 75, and the rear wheel 13 to which the rotation power of the countershaft 66 is transmitted via the driving force transmitting device 215, the main shaft rotation frequency sensor 65a that detects the rotation frequency Nm of the main shaft 65 is provided, the chain 15, the hub damper 220 and the spoke 13c are provided as the damper members that are elastically deformed by the driving force are provided among the countershaft 66, the driving force transmitting device 215 and the rear wheel 13, and the control unit 17 learns the clutch disengagement rotation angle θrls of the shift spindle 76 when the control unit 17 detects that the variation $\Delta$Nmred in the deceleration direction of the rotation frequency Nm of the main shaft 65 during operation of the change clutch 61 is the learning starting predetermined value $\Delta$Nm1 or more. The chain 15, the hub damper 220 and the spoke 13c transmit the driving force to the downstream rear wheel 13 side in the state where the chain 15, the hub damper 220 and the spoke 13c are elastically deformed by the drive torque from the engine 21, but when the change clutch 61 is disengaged and the driving force from the engine 21 comes out, the rotation of the main shaft 65 is decelerated by the restoring force to the elastic deformation. Thereby, the rotation frequencies Nm and Nc of the main shaft 65 and the countershaft 66 reduce, the moment the change clutch 61 is disengaged. The control unit 17 learns the clutch disengagement rotation angle θrls of the shift spindle 76 when the control unit 17 detects that the variation ΔNmred of the rotational frequency Nm of the main shaft 65 is the learning starting predetermined value ΔNm1 or more, so that the clutch disengagement rotation angle θrls can be detected with high precision even during speed change at the time of ordinary use, based on the deceleration of the rotational frequency Nm of the main shaft 65. A similar effect can be also obtained at the time of factory shipment or the like.

Further, the intake pipe 52 that supplies intake air to the engine 21 is provided with the throttle valve 53 that adjusts the intake air amount by being opened and closed, and the control unit 17 executes learning of the clutch disengagement rotation angle θrls when the opening degree of the throttle valve 53 is the predetermined opening degree Th or more. When the opening degree of the throttle valve 53 is the predetermined opening degree Th or more, the restoring forces of the chain 15, the hub damper 220 and the spoke 13c become large, and deceleration of the rotational frequency Ne of the main shaft 65 becomes large. Therefore, learning of the clutch disengagement rotation angle θrls can be executed based on the large deceleration of the rotational frequency Ne of the main shaft 65, and the clutch disengagement position can be detected with high precision.

Further, the constant-mesh transmission 60 is a dog clutch type transmission including a dog clutch 67Dc provided to be capable of being engaged and disengaged by the drive gear 67b that rotates integrally with the main shaft 65 and is movable in the axial direction, the drive gears 67a and 67c that are relatively rotatable to the main shaft 65 and are fixed in the axial direction, and the dog teeth 67b1 and 67c1 that are provided to be raised in the axial direction from the opposing surfaces of the drive gear 67b and the drive gear 67c, and the dog clutch 68Dc that is provided to be capable of being engaged and disengaged by the driven gear 68c that rotates integrally with the countershaft 66 and is movable in the axial direction, the driven gears 68b and 68d that are relatively rotatable to the countershaft 66 and is fixed in the axial direction, and the dog teeth 68c1 and 68b1 that are provided to be raised in the axial direction from the opposing surfaces of the driven gear 68c and the driven gear 68b, and it is detected that the variation ΔNmred is the learning starting predetermined value ΔNm1 or more, based on the rotational frequency Ne of the main shaft 65. In the dog clutch type transmission, plays are present in the circumferential direction of the dog clutch 67Dc and the dog clutch 68Dc, so that when the driving force comes out, variation in the rotational frequency easily occurs at the main shaft 65 side. Consequently, the variation ΔNmred is detected from the rotational frequency Ne of the main shaft 65, whereby the clutch disengagement rotation angle θrls can be detected with high precision.

Further, the rotational frequency Nm of the main shaft 65 is a value obtained by multiplying the actual rotational frequency of the main shaft 65 which is detected by the main shaft rotation sensor 65a by the deceleration ratio of the main shaft 65 and the crankshaft 23 of the engine 21, and when the control device 17 detects that the rotational frequency Nm of the main shaft 65 momentarily becomes the rotational frequency substantially equal to the engine speed Ne of the engine 21 while engaging the change clutch 61, the control device 17 stores the time period between the time t4 of the detection time, and the time t2 at which deceleration of the learning starting predetermined value ΔNm1 or more is started, as the drive force removal time period V1m. Thereby, the time period between the time of start of deceleration of the learning starting predetermined value ΔNm1 or more and the time at which the rotational frequency Nm of the main shaft 65 momentarily increases at the time of engagement of the change clutch 61 can be stored as the driving force removal time period V1m, and the driving force removal time period V1m can be easily detected from the change of the rotational speed Ne of the main shaft 65.

Further, the driving force transmitting device 215 includes the drive sprocket 72 provided at the countershaft 66 side, the driven sprocket 216 provided at the rear wheel 13 side, and the chain 15 that is wound between the drive sprocket 72 and the driven sprocket 216, and the hub damper 220 is provided between the hub 13a of the rear wheel 13 and the driven sprocket 216. The hub damper 220 that is provided between the hub 13a of the rear wheel 13 and the driven sprocket 216 has a relatively large deformation amount by the driving force, so that deceleration of the rotational frequency Ne of the main shaft 65 by the restoring force becomes large. Consequently, the clutch disengagement rotation angle θrls can be detected with high precision based on the deceleration of the rotational frequency Ne.

[Second Embodiment]

Hereinafter, with reference to FIG. 28, a second embodiment to which the present invention is applied will be described. In the second embodiment, parts that are configured similarly to the parts in the above described first embodiment will be assigned with the same reference signs and explanation thereof will be omitted.

The present second embodiment differs from the above described first embodiment in a point that a process in which step S26a, and steps S28a to 28e are further added to the process in FIG. 26 is performed.

Figure 28:
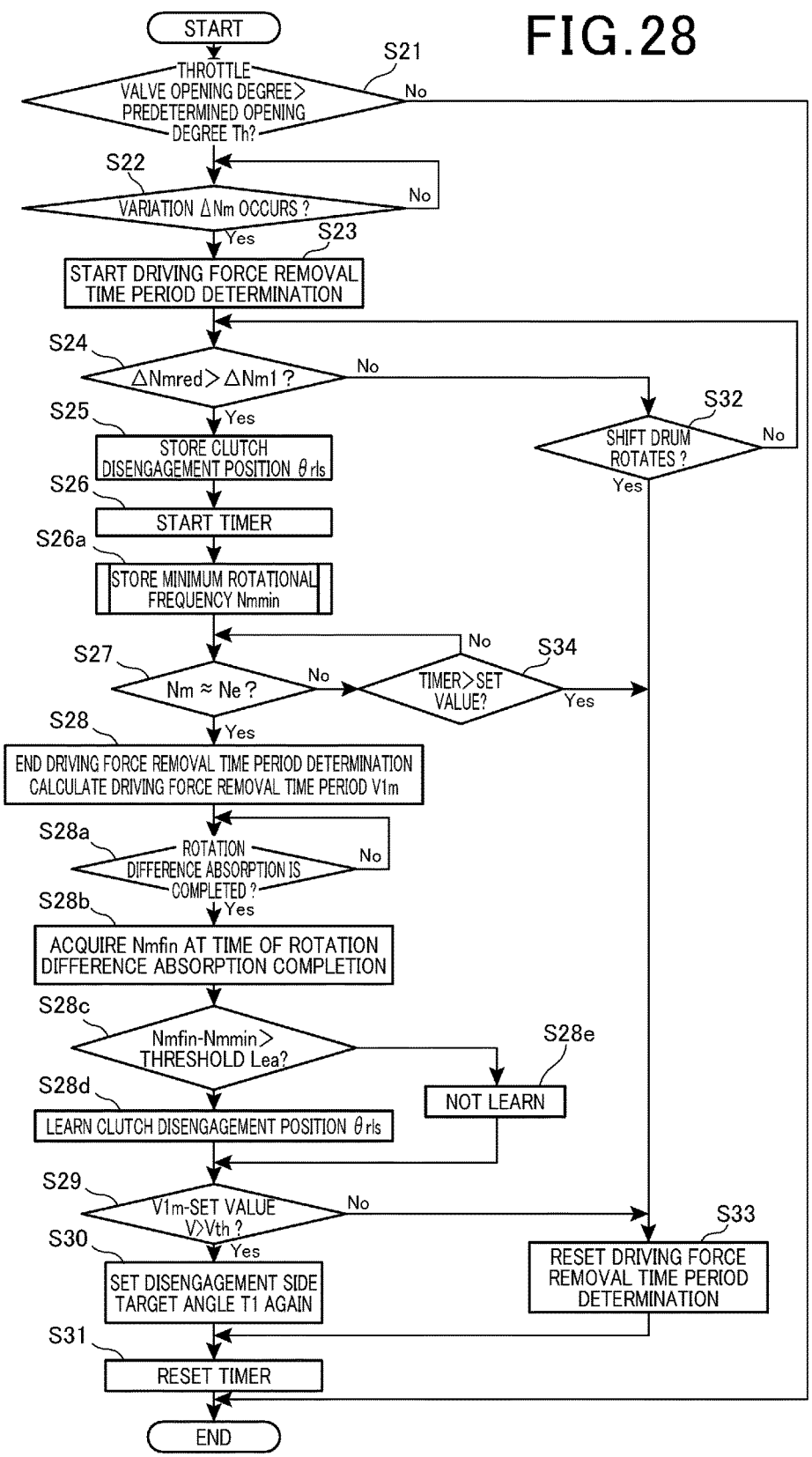
FIG. 28 is a flowchart of process of detecting a disengagement position of the change clutch during speed change, in a second embodiment.

FIG. 28 is a flowchart of a process of detecting a disengagement position of the change clutch 61 during speed change, in the second embodiment. In the process included in an operation illustrated in FIG. 28, steps of performing a similar process as in FIG. 26 in the aforementioned first embodiment will be assigned with the same numbers and explanation thereof will be omitted.

The control unit 17 starts the process in FIG. 28 simultaneously with start of the process of speed change in FIG. 25.

First, the control unit 17 determines whether or not the opening degree of the throttle valve 53 is the predetermined opening degree Th or more during traveling (step S21). When the opening degree of the throttle valve 53 is smaller than the predetermined opening degree Th (step S21: No), the control unit 17 ends the process in FIG. 28.

When the opening degree of the throttle valve 53 is the predetermined opening degree Th or more (step S21: Yes), the control unit 17 determines whether or not the variation ΔNmred in the deceleration direction occurs to the rotational frequency Nm of the main shaft 65 (step S22). When the variation ΔNmred does not occur (step S22: No), the control unit 17 waits until the variation ΔNmred occurs.

When the variation ΔNmred occurs (step S22: Yes), the control unit 17 starts the process of the driving force removal time period determination (step S23), and determines whether or not the variation ΔNmred is the learning starting predetermined value ΔNm1 or more (step S24).

When the variation ΔNmred is the learning starting predetermined value ΔNm1 or more (step S24: Yes), the control unit 17 considers that disengagement of the change clutch 61 occurs, stores the rotation angle (position) of the shift spindle 76 at the time t2 when the variation ΔNmred starts to occur, in the RAM (the volatile memory) as the clutch disengagement rotation angle θrls at which the change clutch 61 is disengaged, and stores the rotational frequency Nm at the time t2 as the deceleration starting time rotational frequency Nms (step S25), further starts count of the timer for determining increase of the rotation of the main shaft 65 (step S26), and stores the minimum rotational frequency Nmmin that is the smallest value of the rotational frequency Nm after the time t2 when the variation ΔNmred starts to occur in the RAM (step S26a).

Simultaneously with the start of the count of the timer, the control unit 17 determines whether or not the rotational frequency Nm of the main shaft 65 increases in the positive direction to the value substantially equal to the engine speed Ne momentarily (step S27). In FIG. 24D, at the time t4, the rotational frequency Nm momentarily increases to the engine speed Ne.

When the rotational frequency Nm of the main shaft 65 increases to the value substantially equal to the engine speed Ne momentarily (step S27: Yes), the control unit 17 ends the driving force removal time period determination, and calculates the driving force removal time period V1m (step S28). In detail, the control unit 17 calculates the time period between the time t2 at which the variation ΔNmred starts to occur and the time t4 at which the rotational frequency Nm momentarily increases to the value substantially equal to the engine speed Ne, as the driving force removal time period V1m. Here, the time t4 corresponds to the state in FIG. 23E.

Next, the control unit 17 determines whether or not absorption of the rotation difference between the engine speed Ne and the rotational frequency Nm is completed by engagement of the change clutch 61 after speed change, based on the outputs of the engine speed sensor 58 and the main shaft rotational frequency sensor 65a (step S28a). When absorption of the rotation difference is not completed (step S28a: No), the control unit 17 waits until completion of absorption of the rotation difference.

When absorption of the rotation difference is completed (step S28a: Yes), the control unit 17 acquires the rotation difference absorption end rotational frequency Nmfin that is the rotational frequency Nm at the time t5 at which absorption of the rotation difference is completed (step S28b).

Subsequently, the control unit 17 determines whether or not a difference between the rotation difference absorption end rotational frequency Nmfin and the minimum rotational frequency Nmmin is a learning propriety threshold value Lea or more (step S28c).

Here, the learning propriety threshold value Lea is a threshold value for the control unit 17 to determine whether or not to adopt the clutch disengagement rotation angle θrls, and is set in advance by an experiment and calculation.

In detail, as the restoring forces of the chain 15, the hub damper 220 and the spoke 13c as the damper members are generated more greatly by disengagement of the change clutch 61, the rotation of the main shaft 65 decelerates more remarkably, and the value of the minimum rotation frequency Nmmin becomes smaller. Consequently, the difference between the rotation difference absorption end rotational frequency Nmfin and the minimum rotation frequency Nmmin has a large value when deceleration of the main shaft 65 by the restoring forces of the damper members at the time of disengagement of the change clutch 61 is generated greatly, and reaches the learning propriety threshold value Lea or more.

When the difference between the rotation difference absorption end rotational frequency Nmfin and the minimum rotational frequency Nmmin has the learning propriety threshold value Lea or more (step S28c: Yes), the control unit 17 learns the clutch disengagement rotation angle θrls (step S28d), and goes to step S29. The control unit 17 can use the learned clutch disengagement rotation angle θrls in setting the clutch disengagement rotation angle for controlling the shift spindle 76 again, and diagnosing a failure.

When the difference between the rotation difference absorption end rotational frequency Nmfin and the minimum rotation frequency Nmmin is smaller than the learning propriety threshold value Lea (step S28c: No), the control unit 17 does not learn the clutch disengagement rotation angle θrls stored in the RM in step S25 (step S28e), and goes to step S29. In this case, the control unit 17 uses the clutch disengagement rotation angle used so far, continuously for controlling or the like.

In the present second embodiment, the clutch disengagement rotation angle θrls is learned when the difference between the rotation difference absorption end rotational frequency Nmfin and the minimum rotational frequency Nmmin reaches the learning propriety value Lea or more by the restoring forces of the damper members at the time of disengagement of the change clutch 61, so that the clutch disengagement rotation angle θrls can be learned based on the fact that the main shaft 65 decelerates greatly. Consequently, the clutch disengagement rotation angle θrls can be learned with high precision.

Next, the control unit 17 determines whether or not the difference between the driving force removal time period V1m calculated in step S28, and the set value V of the driving force removal time period in design set in advance is equal to or more than the predetermined threshold value Vth (step S29).

When the difference between the driving force removal time period V1m and the set value V is equal to or more than the predetermined threshold value Vth (step S29: Yes), the control unit 17 sets the disengagement side target angle T1 of the shift spindle 76 again (step S30).

Subsequently, the control unit 17 resets count of the timer started in step S26 (step S31), and ends the process in FIG. 28.

Returning to step S24 here, when the variation ΔNmred is smaller than the learning starting predetermined value ΔNm1 (step S24: No), the control unit 17 determines whether or not the shift drum 70 rotates to the next stage (step S32).

When the shift drum 70 does not rotate to the next stage (step S32: No), the control unit 17 returns to the processing in step S24. When the shift drum 70 rotates to the next stage (step S32: Yes), the control unit 17 resets the process of the driving force removal time period determination (step S33), and ends the process in FIG. 28.

When the rotational frequency Nm of the main shaft 65 does not increase to the value substantially equal to the engine speed Ne momentarily (step S27: No), the control unit 17 determines whether or not the count of the timer reaches a set value (step S34). When the count of the timer does not reach the set value (step S34: No), the control unit 17 returns to the processing in step S27.

When the count of the timer reaches the set value (step S34: Yes), the control unit 17 resets the process of the driving force removal time period determination (step S33), resets the count of the timer (step S31), and ends the process in FIG. 28.

When the difference between the driving force removal time period V1m and the set value V is smaller than the predetermined threshold value Vth (step S29: No), the control unit 17 resets the process of the driving force removal time period determination (step S33), resets the count of the timer (step S31), and ends the process in FIG. 28.

As described above, according to the second embodiment to which the present invention is applied, operation of the shift spindle 76 is performed at the time of speed change operation, the control unit 17 stores the minimum rotational frequency Nmmin after occurrence of deceleration of the learning starting predetermined value ΔNm1 or more, compares the rotation difference absorption end rotational frequency Nmfin at the time of end of absorption of the rotation difference of the change clutch 61 and the minimum rotational frequency Nmmin, and thereby determines propriety of learning of the clutch disengagement rotation angle θrls. Consequently, by comparison of the minimum rotational frequency Nmmin after deceleration of the main shaft 65 and the rotation difference absorption end rotational frequency Nmfin, the clutch disengagement rotation angle θrls can be learned when deceleration of the main shaft 65 is large, and the clutch disengagement rotation angle θrls can be learned with high precision.

When the clutch disengagement rotation angle θrls is learned based on deceleration of the countershaft 66, instead of the minimum rotational frequency Nmmin, a minimum rotational frequency Ncmin (not illustrated) of the countershaft 66 at the time t3, and the rotation difference absorption end rotational frequency Ncfin (not illustrated) of the countershaft 66 at the time of end of absorption of the rotation difference may be compared.

[Third Embodiment]

Hereinafter, with reference to FIG. 29 to FIG. 32, a third embodiment to which the present invention is applied will be described. In the third embodiment, parts configured similarly to the parts in the above described first embodiment will be assigned with the same reference signs and explanation thereof will be omitted.

In the above described first embodiment, the configuration including the driving force transmitting device 215 including the chain 15 and the hub damper 220 is explained as an example, and the present third embodiment differs from the above described first embodiment in the point that a driving force transmitting device 315 includes a drive shaft 304 and damper members are provided in a different form, the point that a clutch operation member is a piston 361a operated by hydraulic pressure and the like. Further, in the third embodiment, control that is performed by the control unit 17 is similar to the control in the above described first embodiment, so that explanation will be simplified. Further, an automatic transmission device 325 in the present third embodiment is of a constant-mesh type and a dog clutch type, and includes similar components to the components in the above described first embodiment, so that explanation thereof will be simplified.

Figure 29:
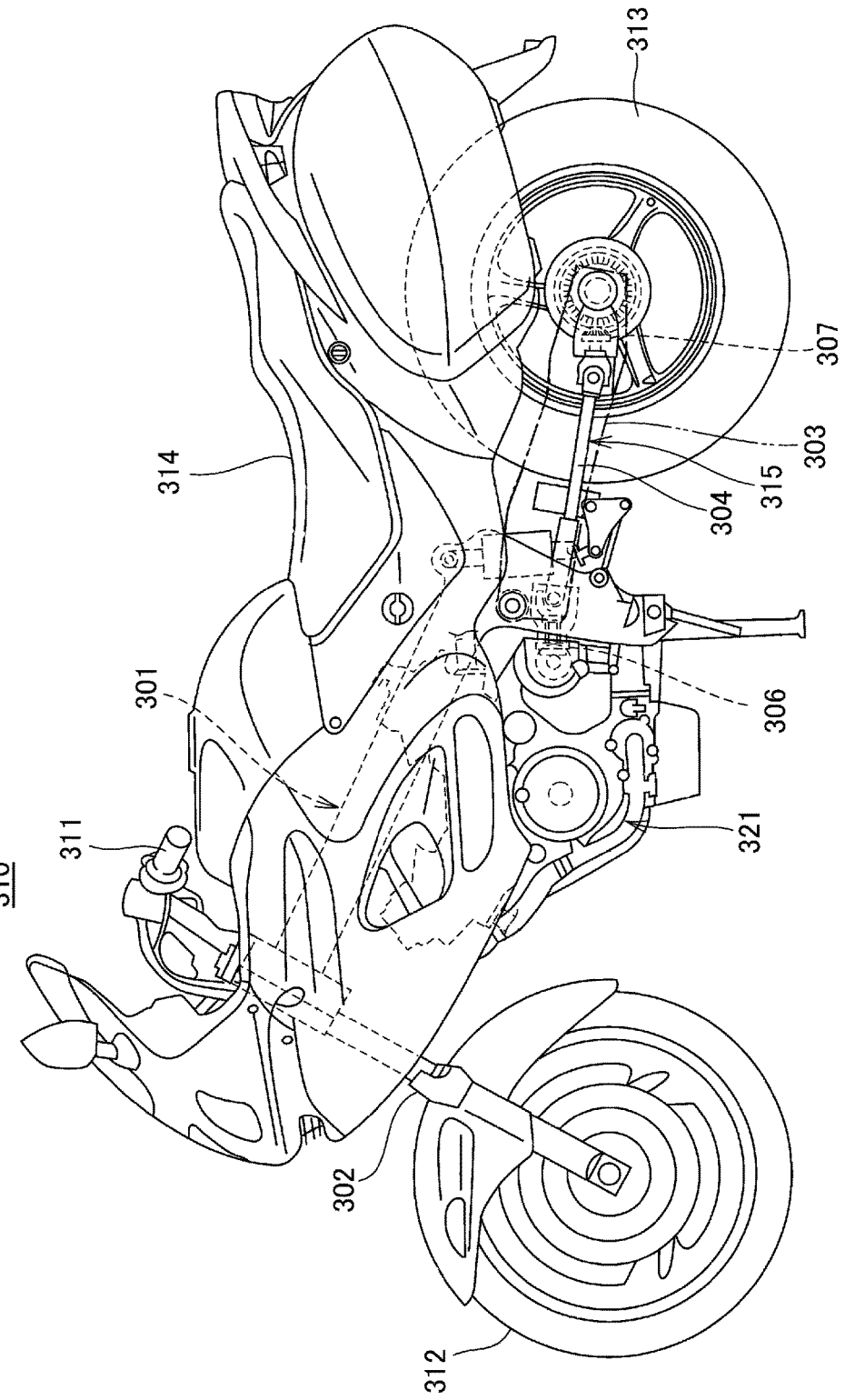
FIG. 29 is a left side view of a motorcycle including an automatic transmission device according to a third embodiment.

FIG. 29 is a left side view of a motorcycle 310 including the automatic transmission device 325 according to the third embodiment.

The motorcycle 310 is a vehicle in which an engine 321 as a power unit is supported by a vehicle body frame 301, a front fork 302 supporting a front wheel 312 is supported at a front end of the vehicle body frame 301 to be steerable, and a swing arm 303 supporting a rear wheel 313 is provided at a rear portion of the vehicle body frame 301. The motorcycle 310 is a saddled vehicle in which a seat 314 on which a passenger is seated in such a manner as to sit astride the seat is supported at an upper portion of a rear portion of the vehicle body frame 301.

A handle 311 steered by the passenger is fixed to an upper end of the front fork 302.

Though not illustrated in explanation of the third embodiment, the motorcycle 310 includes the throttle valve 53, the throttle position sensor 134, the main shaft rotational frequency sensor 65a, the countershaft rotational frequency sensor 73, the engine speed sensor 58 and the drum angle sensor 70b.

The engine 321 is supported by the vehicle body frame 301. A driving force of the engine 321 is transmitted to the rear wheel 313 by the driving force transmitting device 315 extending longitudinally to a rear wheel 313 side from a rear portion of the engine 321.

The driving force transmitting device 315 is connected to the rear wheel 313 through an inside of the swing arm 303. The driving force transmitting device 315 includes a drive shaft 304, a first bevel gear 306 provided at a front end of the drive shaft 304, and a second bevel gear 307 provided at a rear end of the drive shaft 304. The second bevel gear 307 drives the rear wheel 313 via a ring gear (not illustrated) of the rear wheel 313.

Figure 30:
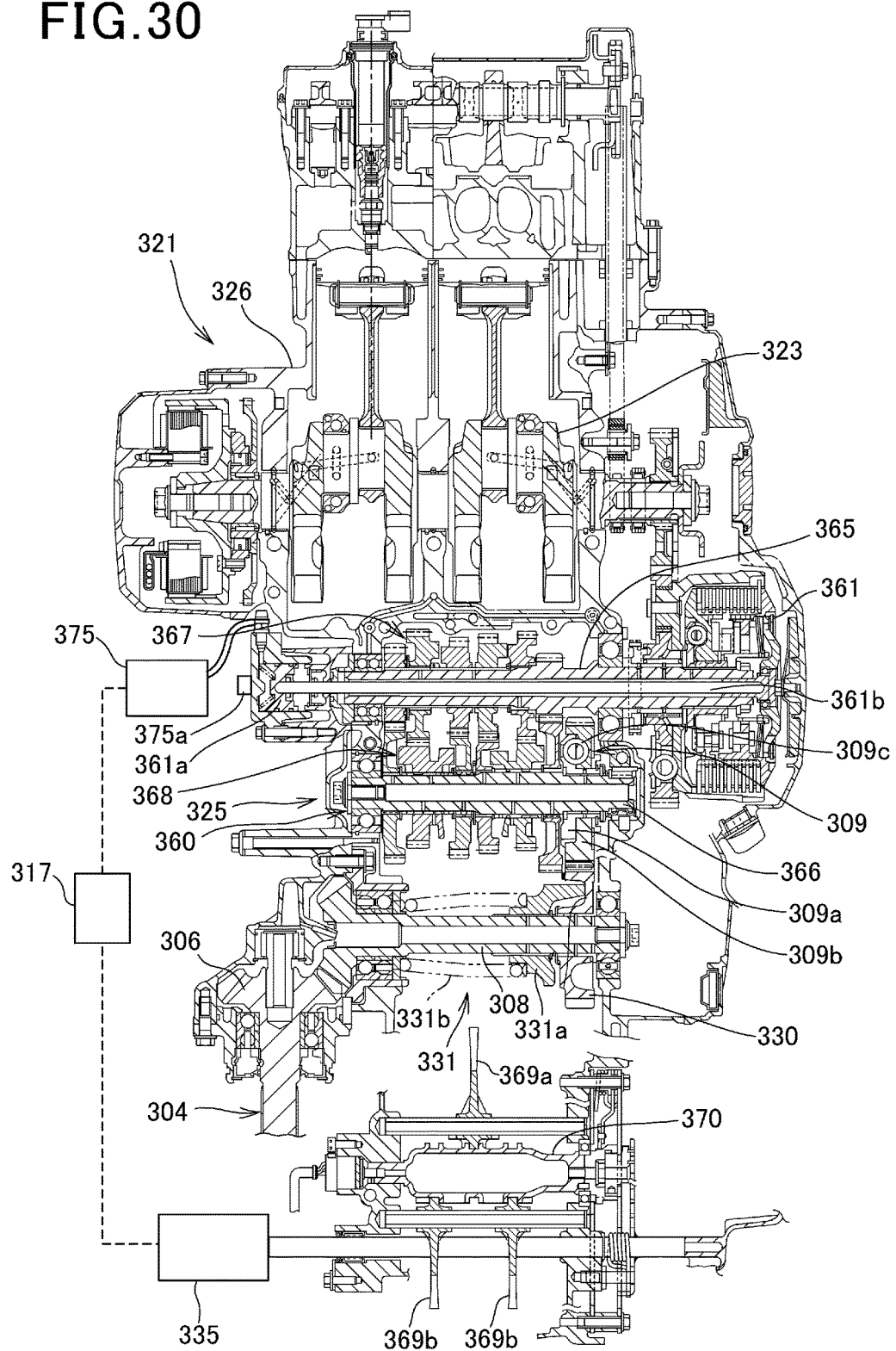
FIG. 30 is a sectional view illustrating an internal structure of an engine.

FIG. 30 is a sectional view illustrating an internal structure of the engine 321.

The engine 321 includes a crankshaft 323 and a transmission 360 in a crankcase 326. The transmission 360 includes a main shaft 365, a countershaft 366 and an output shaft 308 parallel with the countershaft 366. A driving force of the crankshaft 323 is transmitted to the main shaft 365 via a change clutch 361 provided at a shaft end of the main shaft 365.

The main shaft 365 includes a drive gear train 367 configured by a plurality of drive gears, and the countershaft 366 includes a driven gear train 368 configured by a plurality of gears meshed with the drive gear train 367.

The crankcase 326 is provided with a shift drum 370. The shift drum 370 is connected to a shifter gear of the drive gear train 367 and a shifter gear of the driven gear train 368 via a plurality of shift forks 369a and 369b. The shift forks 369a and 369b are operated along grooves of the shift drum 370, whereby the shifter gears slide, and speed change is performed by engagement and disengagement of the dog clutches of the shifter gears.

The countershaft 366 includes an intermediate drive gear 309 (a damper member) meshed with an intermediate driven gear 330 of the output shaft 308. The intermediate drive gear 309 includes a fixed gear portion 309a that is fixed to the countershaft 366, a movable gear portion 309b rotatable relatively to the fixed gear portion 309a, and a damper portion 309c that is interposed in a circumferential direction between the movable gear portion 309b and the fixed gear portion 309a. A part of a torque variation that acts on the countershaft 366 is absorbed by the damper portion 309c.

The output shaft 308 is provided with a cam type torque damper 331 (a damper member). The torque damper 331 includes a cylindrical cam member 331a provided movably in an axial direction by being spline-fitted to the output shaft 308, and a spring 331b that presses a cam portion of the cam member 331a to a recessed portion on a side surface of the intermediate driven gear 330. When the torque increases, the intermediate driven gear 330 relatively rotates with respect to the cam member 331, against an urging force by the cam member 331. A part of the torque variation acting on the countershaft 366 is absorbed by the torque damper 331.

The output shaft 308 includes a gear 308a that is meshed with the first bevel gear 306 of the driving force transmitting device 315, at a shaft end.

The motorcycle 310 includes a control unit 317 that controls the engine 321 and the automatic transmission device 325.

The change clutch 361 is a hydraulic clutch, and a rod 361b, which is connected to a piston 361a (a clutch operation member) that is pressed by hydraulic pressure, operates the change clutch 361, whereby the change clutch 361 is disengaged and engaged.

Supply of the hydraulic pressure to the piston 361a is performed by a clutch actuator 375 (an actuator) controlled by the control unit 317. The clutch actuator 375 is configured by including a solenoid (not illustrated) that controls hydraulic pressure supplied from an oil pump of the engine 321 and supplies the hydraulic pressure to the piston 361a.

That is, in the present third embodiment, the control unit 317 operates disengagement and engagement of the change clutch 361 by the piston 361a which is controlled by the clutch actuator 375, instead of the shift spindle 76.

The control unit 317 detects an operation amount of the piston 361a by a hydraulic pressure sensor 375a (a clutch operation amount detecting sensor) that detects the hydraulic pressure that is supplied to the piston 361a.

The shift drum 370 is operated by a shift actuator 335 that is controlled by the control unit 317. The shift actuator 335 includes a motor (not illustrated) driven by the control unit 317, and a decelerator (not illustrated) that decelerates rotation of the motor to transmit the rotation to the shift drum 370.

Figure 31:
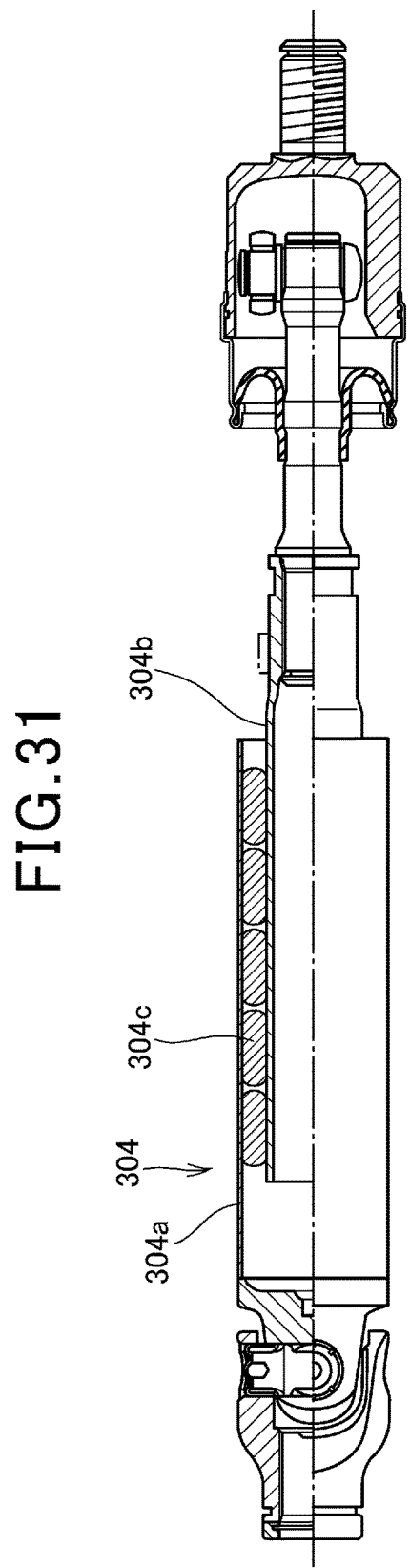
FIG. 31 is a view illustrating a drive shaft.

FIG. 31 is a view illustrating the drive shaft 304.

The drive shaft 304 includes an outer pipe 304a that is connected to a countershaft 366 side via the output shaft 308, an inner pipe 304b connected to a rear wheel 313 side, and a damper rubber 304c (a damper member) connecting the outer pipe 304a and the inner pipe 304b. A front portion of the inner pipe 304b is inserted to a rear portion of the outer pipe 304a, and the damper rubber 304c connects an outer circumferential portion of the inner pipe 304b and an inner circumferential portion of the outer pipe 304a by adhesion, in the front portion of the inner pipe 304b.

The first bevel gear 306 is connected to a front end of the outer pipe 304a, and the second bevel gear 307 is connected to a rear end of the inner pipe 304b.

Referring to FIGS. 23A to FIG. 23F, the output shaft illustrated in FIGS. 23A to FIG. 23F corresponds to the output shaft 308 in the third embodiment, the driving force transmitting device 215 corresponds to the driving force transmitting device 315, and the rear wheel 13 corresponds to the rear wheel 313. Further, between the countershaft 366 and the output shaft 308, the intermediate drive gear 309 and the torque damper 331 are provided as the damper members.

When the change clutch 361 is disengaged at the time of speed change or the like, restoring forces of the damper rubber 304c, the intermediate drive gear 309 and the torque damper 331 as the damper members are transmitted to the countershaft 366 side, and rotation of the main shaft 365 and the countershaft 366 decelerates.

In the case of performing a process of speed change during travelling, the control unit 317 firstly sets a disengagement side target hydraulic pressure P1 (not illustrated), drives the clutch actuator 375 to obtain the disengagement side target hydraulic pressure P1 to disengage the change clutch 361 by operation of the piston 361a, subsequently executes speed change to a next stage by driving the shift actuator 335, and thereafter drives the clutch actuator 375 in a returning direction to engage the change clutch 361.

Figure 32:
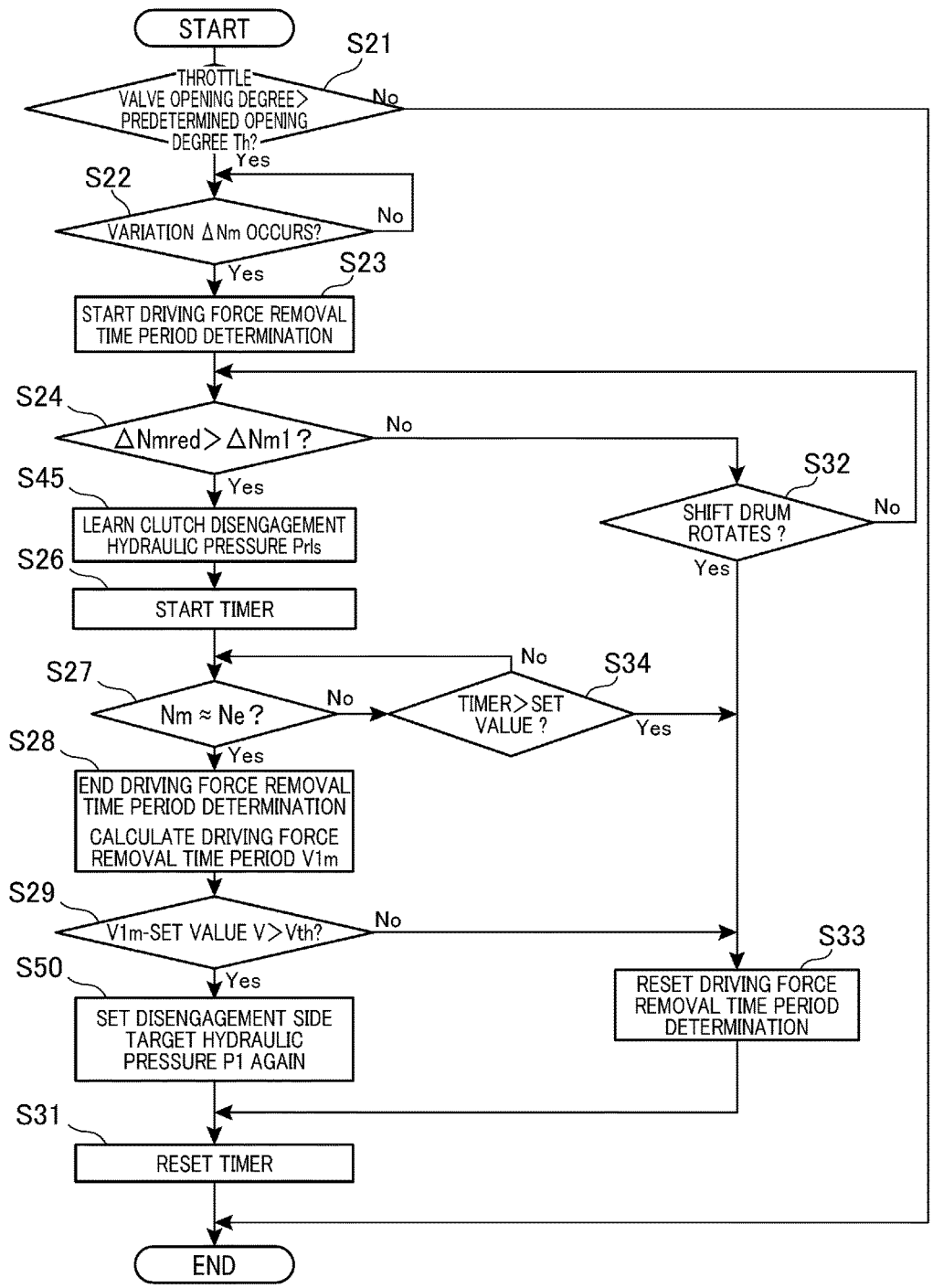
FIG. 32 is a flowchart of a process of detecting a disengagement position of the change clutch during speed change.

FIG. 32 is a flowchart of the process of detecting the disengagement position of the change clutch 61 during speed change. In processings included in the operations illustrated in FIG. 32, steps of performing similar processings to the processings in FIG. 26 in the aforementioned first embodiment will be assigned with the same numbers and explanation thereof will be simplified. The control unit 317 starts the process in FIG. 32 simultaneously with the start of the process of speed change described above. In the following explanation, FIGS. 24A to 24D are referred to, but the piston 361a is controlled by hydraulic pressure instead of a shift spindle angle, so that the diagram of the shift spindle angle in FIG. 24A is not referred to.

First, the control unit 317 determines whether or not the opening degree of the throttle valve 53 is the predetermined opening degree Th or more during travelling (step S21).

When the opening degree of the throttle valve 53 is smaller than the predetermined opening degree Th (step S21: No), the control unit 317 ends the process in FIG. 32.

When the opening degree of the throttle valve 53 is the predetermined opening degree Th or more (step S21: Yes), the control unit 317 determines whether or not the variation ΔNmred in the deceleration direction occurs to the rotational frequency Nm of the main shaft 365 (step S22). When the variation ΔNmred does not occur (step S22: No), the control unit 317 waits until the variation ΔNmred occurs.

When the variation ΔNmred occurs (step S22: Yes), the control unit 317 starts the process of the driving force removal time period determination that determines the driving force removal time period (step S23), and determines whether or not the variation ΔNmred is the learning starting predetermined value ΔNm1 or more (step S24).

When the variation ΔNmred is the learning starting predetermined value ΔNm1 or more (step S24: Yes), the control unit 317 considers that disengagement of the change clutch 361 occurs, and stores (learns) the hydraulic pressure of the piston 361a at the time t2 at which the variation ΔNmred starts to occur, in the RAM (the volatile memory) as the clutch disengagement hydraulic pressure Prls (the clutch disengagement operation amount) at which the change clutch 361 is disengaged, and stores the rotational frequency Nm at the time t2 in the RAM, as the deceleration start time rotational frequency Nms (step S45), and further starts count of the timer for determining increase of rotation of the main shaft 365 (step S26). The time t2 corresponds to the state in FIG. 23C.

In this way, the clutch disengagement hydraulic pressure Prls is learned based on the variation ΔNmred of the rotational frequency Nm of the main shaft 365, whereby the clutch disengagement hydraulic pressure Prls can be learned with high precision with the simple configuration.

The control unit 317 compares the learned clutch disengagement hydraulic pressure Prls with hydraulic pressure of the piston 361a for control that is set in the EEPROM (the nonvolatile memory) as the initial value at the time of manufacture of the motorcycle 310, for example, and can set the hydraulic pressure for controlling the piston 361a again, and diagnose a failure. Further, a clutch disengagement hydraulic pressure Prlsave that is an average value of the clutch disengagement hydraulic pressures Prls that are learned a plurality of times may be used in setting the clutch disengagement hydraulic pressure again and diagnosing a failure.

The control unit 317 determines whether or not the rotational frequency Nm of the main shaft 365 is momentarily increases in the positive direction to the value substantially equal to the engine speed Ne, simultaneously with the start of the count of the timer (step S27). In FIG. 24D, at the time t4, the rotational frequency Nm momentarily increases to the engine speed Ne.

When the rotational frequency Nm of the main shaft 365 momentarily increases to the value substantially equal to the engine speed Ne (step S27: Yes), the control unit 317 ends the driving force removal time period determination, and calculates the driving force removal time period V1$m$ (step S28). In detail, the control unit 317 calculates the time period between the time t2 at which the variation ΔNmred starts to occur and the time t4 at which the rotational frequency Nm momentarily increases to the value substantially equal to the engine speed Ne, as the driving force removal time period V1$m$. Here, the time t4 corresponds to the state in FIG. 23E.

Next, the control unit 317 determines whether or not the difference between the driving force removal time period V1$m$ which is calculated, and the set value V of the driving force removal time period in design that is set in advance is equal to or more than the predetermined threshold value Vth (step S29).

When the difference between the driving force removal time period V1$m$ and the set value V is equal to or larger than the predetermined threshold value Vth (step S29: Yes), the control unit 317 sets the disengagement side target hydraulic pressure P1 again (step S50). That is, when the driving force removal time period V1$m$ is too large, a target value of the hydraulic pressure is set at an appropriate value again. In detail, a new disengagement side target hydraulic pressure P1$rev$ that is set again is calculated by expression (2), for example.

$$\text{Disengagement side target hydraulic pressure } P1rev = \text{present disengagement side target hydraulic pressure } P1 - \text{set value } V \times \text{coefficient } \alpha \quad (2)$$

Here, a unit of the target value of the hydraulic pressure is a pressure (pa), a unit of the set value V is a time (sec), and a unit of the coefficient α is (Pa/sec). The coefficient α is set in advance by an experiment and calculation.

Subsequently, the control unit 317 resets the count of the timer started in step S26 (step S31), and ends the process in FIG. 32.

Returning to step S24 here, when the variation ΔNmred is smaller than the learning starting predetermined value ΔNm1 (step S24: No), the control unit 317 determined whether or not the shift drum 370 rotates to the next stage (step S32).

When the shift drum 370 does not rotate to the nest stage (step S32: No), the control unit 317 returns to the processing in step S24. When the shift drum 370 rotates to the next stage (step S32: Yes), the control unit 317 resets the process of the driving force removal time period determination (step S33), and ends the process in FIG. 32. In this way, speed change to the next stage is sometimes completed without the variation ΔNmred reaching the learning starting predetermined value ΔNm1.

When the rotational frequency Nm of the main shaft 365 does not momentarily increase to the value substantially equal to the engine speed Ne (step S27: No), the control unit 317 determines whether or not the count of the timer reaches the set value (step S34). When the count of the timer does not reach the set value (step S34: No), the control unit 317 returns to the processing in step S27.

When the count of the timer reaches the set value (step S34: Yes), the control unit 317 resets the process of the driving force removal time period determination (step S33), resets the count of the timer (step S31), and ends the process in FIG. 32. This case is the case where the increase of the rotational frequency Nm of the main shaft 365 by engagement of the change clutch 361 is small, and calculation of the driving force removal time period V1$m$ is not performed.

When the difference between the driving force removal time period V1$m$ and the set value V is smaller than the predetermined threshold value Vth (step S29: No), the control unit 317 resets the process of the driving force removal time period determination (step S33), resets the count of the timer (step S31), and ends the process in FIG. 32. This case is the case where a deviation of the driving force removal time period V1$m$ is small, and the disengagement side target angle T1 is not set again.

By adding the processings in step S26$a$ and steps S28$a$ to S28$e$ in FIG. 28 in the second embodiment to the process in FIG. 32, a similar effect to the process in FIG. 28 can be obtained.

As described above, according to the third embodiment to which the present invention is applied, the motorcycle 310 includes the transmission 360 having the main shaft 365 to which the rotation power from the engine 321 is inputted via the change clutch 361, and the countershaft 366 to which rotation power of the main shaft 65 is transmitted via the constant-mesh gear, the piston 361$a$ that is driven by the clutch actuator 375 and performs disengaging and engaging operations of the change clutch 361, the hydraulic pressure sensor 375$a$ that detects the hydraulic pressure that is the operation amount of the piston 361$a$, the control unit 317 that operates the clutch actuator 375, and the rear wheel 313 to which the rotation power of the countershaft 366 is transmitted via the driving force transmitting device 315, the main shaft rotation frequency sensor 65$a$ that detects the rotation frequency of the main shaft 365 is provided, the damper rubber 304$c$, the intermediate drive gear 309 and the torque damper 331 are provided as the damper members that are elastically deformed by the driving force, among the countershaft 366, the driving force transmitting device 315 and the rear wheel 313, and the control unit 317 learns the clutch disengagement hydraulic pressure Prls of the piston 361$a$ when the control unit 317 detects deceleration of the learning starting predetermined value ΔNm1 or more of the rotational frequency Nm of the main shaft 365 during operation of the change clutch 361. The damper rubber 304$c$, the intermediate drive gear 309 and the torque damper 331 transmit the driving force to the downstream rear wheel 313 side in the state where the damper rubber 304$c$, the intermediate drive gear 309 and the torque damper 331 are elastically deformed by the drive torque from the engine 321, but when the change clutch 361 is disengaged and the driving force from the engine 321 comes out, the rotation of the main shaft 365 is decelerated by the restoring force to the elastic deformation. Thereby, the rotation frequencies of the main shaft 365 and the countershaft 366 decrease, the moment the change clutch 316 is disengaged. The control unit 317 learns the clutch disengagement hydraulic pressure Prls of the piston 361$a$ when the control unit 317 detects deceleration of the learning starting predetermined value ΔNm1 or more of the rotational frequency Ne of the main shaft 365, so that the clutch disengagement hydraulic pressure Prls can be detected with high precision even during speed change, based on the deceleration of the rotational frequency Ne of the main shaft 365.

Further, the driving force transmitting device 315 includes the first bevel gear 306 provided at the countershaft 366 side, the second bevel gear 307 provided at the rear wheel 313 side, and the drive shaft 304 provided between the first bevel gear 306 and the second bevel gear 307, and the damper rubber 304c is provided between the outer pipe 304a and the inner pipe 304b that configure the drive shaft 304. The damper rubber 304c that is provided between the outer pipe 304a and the inner pipe 304b of the drive shaft 304 has a relatively large deformation amount by the driving force, so that deceleration of the rotational frequencies Nm and Nc of the main shaft 365 and the countershaft 366 by the restoring force becomes large. Consequently, the clutch disengagement hydraulic pressure Prls can be detected with high precision based on deceleration of the rotational frequency Nm.

Further, the output shaft 308 is provided separately from the countershaft 366, and the damper member is configured as the cam type torque damper 331 which is provided at the output shaft 308 side. The cam type torque damper 331 has a relatively large deformation amount by the driving force, so that deceleration of the rotational frequencies Nm and Nc of the main shaft 365 and the countershaft 366 by the restoring force becomes large. Consequently, the clutch disengagement hydraulic pressure Prls can be detected with high precision based on deceleration of the engine speed Ne. In the configuration as in the first embodiment in which the countershaft 66 (FIG. 2) is used as the output shaft, the countershaft 66 may be provided with a cam type torque damper similar to the torque damper 331, as the damper member.

[Fourth Embodiment]

Hereinafter, with reference to FIG. 33 to FIG. 35, a fourth embodiment to which the present invention is applied will be described. In the fourth embodiment, parts that are configured similarly to the parts in the above described first embodiment will be assigned with the same reference signs and explanation thereof will be omitted.

The present fourth embodiment describes another example of the damper members provided on a driving force transmission path between a main shaft and a road surface via a driving wheel, and control of speed change that is performed by a control unit is the same as in the above described first embodiment, so that explanation thereof will be omitted.

Figure 33:
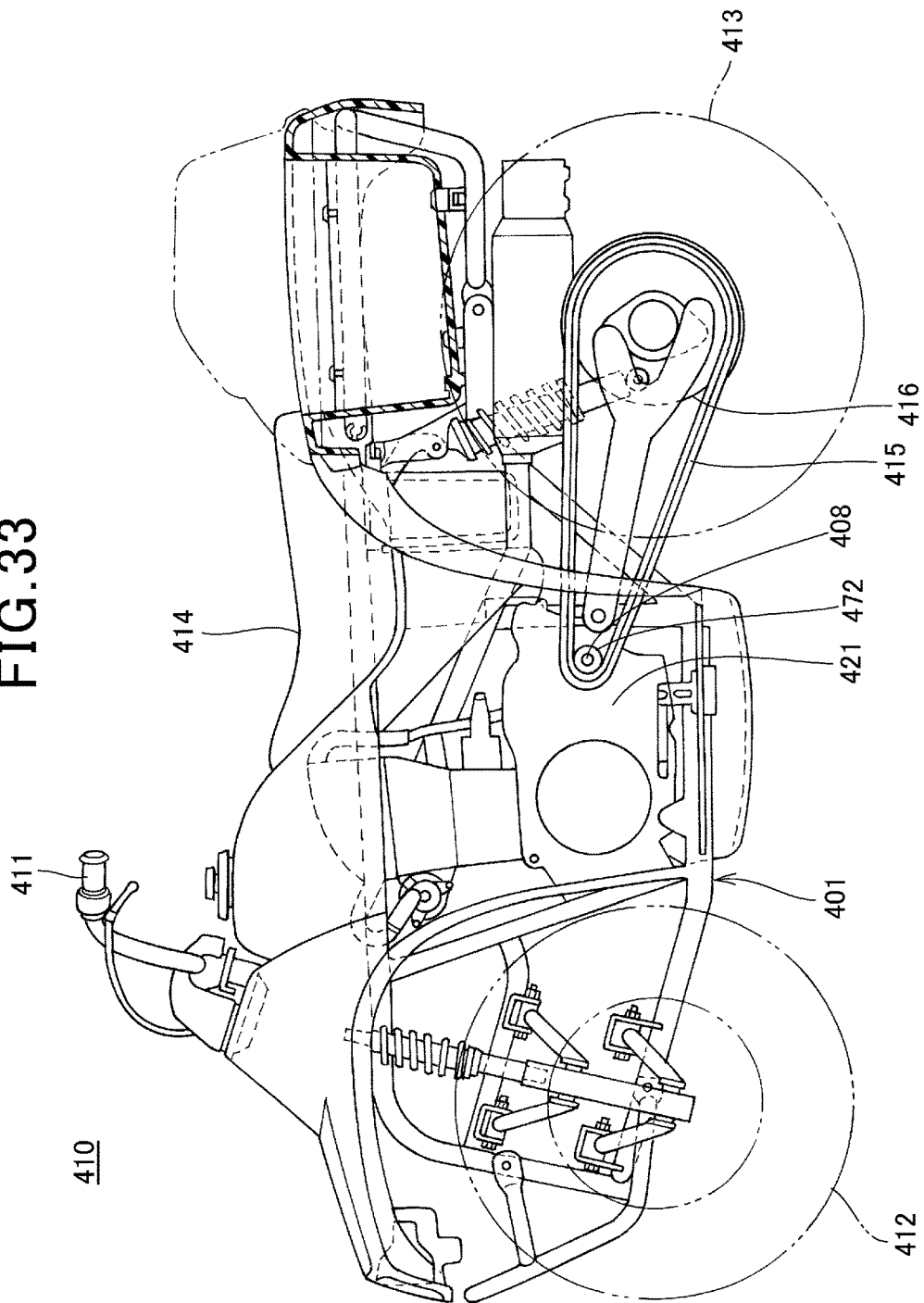
FIG. 33 is a left side view of a rough terrain traveling vehicle including an automatic transmission device according to a fourth embodiment.

FIG. 33 is a left side view of a rough terrain traveling vehicle 410 including an automatic transmission device 425 according to the fourth embodiment.

The rough terrain traveling vehicle 410 is a saddled four wheel vehicle including a vehicle body frame 401, a pair of left and right front wheels 412 provided at a front portion of the vehicle body frame 401, a pair of left and right rear wheels 413 (driving wheels) provided at a rear portion of the vehicle body frame 401, an engine 421 as a power unit that is supported by the vehicle body frame 401, a handle 411 for steering and a seat 414 for a passenger.

A drive sprocket 472 is provided at an output shaft 408 of the engine 421. A driving force of the engine 421 is transmitted to the rear wheel 413 by a chain 415 that is wound between the drive sprocket 472 and a driven sprocket 416 of the rear wheel 413. The drive sprocket 472, the chain 415 and the driven sprocket 416 configure a driving force transmitting device. The chain 415 also functions as a damper member.

Though not illustrated in explanation of the fourth embodiment, the rough terrain traveling vehicle 410 includes the throttle valve 53, the throttle position sensor 134, the main shaft rotational frequency sensor 65a, the countershaft rotational frequency sensor 73, the engine speed sensor 58, the shift spindle angle sensor 79, the drum angle sensor 70b and the control unit 17.

Figure 34:
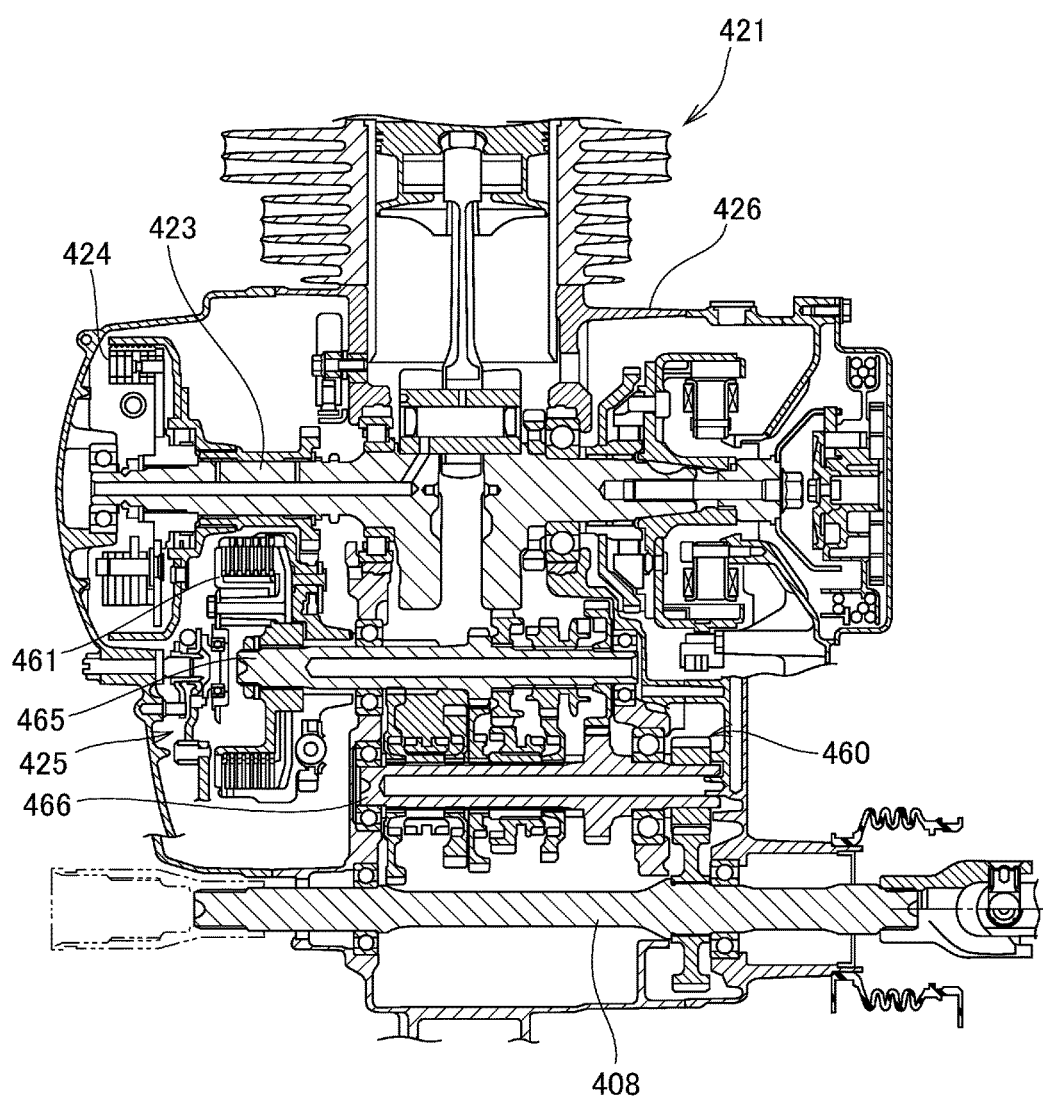
FIG. 34 is a sectional view illustrating an internal structure of the engine.

FIG. 34 is a sectional view illustrating an internal structure of the engine 421.

The engine 421 is configured similarly to the engine 21 in the first embodiment except for a point that a transmission 460 includes the output shaft 408, so that explanation will be simplified. In the following explanation, parts having the same names as in the explanation of the above described first embodiment include the same functions.

The engine 421 includes a crankcase 426, a crankshaft 423, a starting clutch 424, a change clutch 461, a transmission 460, a main shaft 465, a drive gear train, a countershaft 466, a driven gear train, an output shaft 408 that is driven by the countershaft 466, an interlocking type shift spindle (not illustrated), a shift motor (not illustrated), a shift drum (not illustrated) and the like.

The transmission 460 is of a constant-mesh type and a dog clutch type.

Figure 35:
FIG. 35 is a perspective view of a balloon tire of a rear wheel.

FIG. 35 is a perspective view of a balloon tire 417 of the rear wheel 413.

The balloon tire 417 (the damper member) is attached to a wheel of the rear wheel 413. The balloon tire 417 includes a donut-shaped tire main body portion 417a, and a plurality of block portions 417b that protrude outward in a radial direction from an outer circumferential portion of the tire main body portion 417a. The block portions 417b are formed integrally with the tire main body portion 417a of a rubber. A grip force of the balloon tire 417 in a rough terrain is ensured by the block portions 417b.

The rough terrain traveling vehicle 410 travels on a rough terrain, so that the balloon tire 417 is used with a low air pressure in order to ensure cushioning characteristics and a grip force on a rough terrain. Specifically, the balloon tire 417 is used with an air pressure of 70 kPa or less, for example.

By the driving force of the engine 421, the block portions 417b of the balloon tire 417 elastically deform in such a manner as to bend between the tire main body portion 417a and a road surface. Further, the balloon tire 417 has a low pressure and easily deforms, so that the tire main body portion 417a elastically deforms in such a manner as to bend between the wheel and the road surface by the driving force of the engine 421.

Consequently, when the driving force from the engine 421 side is shut off by disengagement of the change clutch 461, restoring forces of the block portions 417b and the tire main body portion 417a are transmitted to the countershaft 466 and the main shaft 465 via the chain 415 and the like, and decelerate the rotational frequencies Nc and Nm of the countershaft 466 and the main shaft 465.

When the control unit 17 of the rough terrain traveling vehicle 410 detects that the variation ΔNmred of the rotational frequency Nm of the main shaft 465 is the learning starting predetermined value ΔNm1 (FIG. 26) or more, the control unit 17 learns the clutch disengagement rotation angle θrls of the shift spindle.

As described above, according to the fourth embodiment to which the present invention is applied, the block portions 417b are integrally formed on the balloon tire 417 of the rear wheel 413, and the damper member is configured by the block portions 417b, so that the damper members can be provided, with the simple configuration.

Further, the balloon tire 417 is a balloon tire with the air pressure of 70 kPa or less, so that the tire itself can be caused to function as the damper member, and the damper member can be provided, with the simple configuration.

The above described first to fourth embodiments each illustrates one aspect to which the present invention is applied, and the present invention is not limited to the above described embodiments.

In the above described first to fourth embodiments, it is described that the clutch disengagement rotation angle θrls and the clutch disengagement hydraulic pressure Prls are learned based on deceleration of the rotational frequency Nm of the main shaft, but the present invention is not limited to this, and may adopt a configuration in which the clutch disengagement rotation angle θrls and the clutch disengagement hydraulic pressure Prls are learned based on deceleration of the rotational frequency Nc of the countershaft, for example. In this case, when the variation ΔNcred (not illustrated) of the rotational frequency Nc is the learning starting predetermined value ΔNc1 (not illustrated) or more, the control unit considers that disengagement of the change clutch occurs, and stores (learns) the rotation angle (position) of the shift spindle at the time t2 at which the variation ΔNcred starts to occur, in the RAM as the clutch disengagement rotation angle θrls (the clutch disengagement operation amount) at which the change clutch is disengaged.

Further, at least one of the countershaft rotation frequency sensor and the main shaft rotation frequency sensor can be provided in correspondence with an object the deceleration of which is detected. Further, the rotational frequencies Nm and Nc do not have to be strictly the same as those of the main shaft and the countershaft as long as deceleration of the rotation can be detected, and as in the above described embodiments, the rotational frequency obtained by multiplying the constant such as a deceleration ratio. Further, the rotational frequencies Nm and Nc may be angular velocities. Further, the clutch disengagement rotation angle θrls and the clutch disengagement hydraulic pressure Prls which are learned may be stored in either one of the nonvolatile memory or the volatile memory in accordance with the use purpose.

In the above described first to fourth embodiments, the dog clutches are described by citing the dog clutches 67Dc and 68Dc each configured by a pair of dog teeth as an example, but the present invention is not limited to this, and the dog clutch may be such that dog teeth provided on the side surface of a gear are engaged in dog holes provided on the side surface of the other gear, for example.

Further, the above described first to fourth embodiments are described by citing the case of upshifting as an example, but the present invention is not limited to this, and the clutch disengagement rotation angle θrls and the clutch disengagement hydraulic pressure Prls may be learned based on deceleration of the predetermined value or more of the rotational frequency of the main shaft or the countershaft that occurs by disengagement of the change clutch at the time of downshifting.

Further, the disposition places of the damper members are not limited to the above described embodiments, and the damper members can be disposed in arbitrary places on the driving force transmitting path between the main shaft and the road surface via the rear wheel.

Further, in the above described first embodiment, it is described that the control unit 17 calculates the time period between the time t2 at which the variation ΔNmred starts to occur, and the time t4 at which the rotational frequency Nm increases to the value substantially equal to the engine speed Ne of the engine 21 momentarily, as the driving force removal time period V1m, but the driving force removal time period V1m may be calculated by another method. For example, the control unit 17 may store the rotational frequency of the main shaft 65 at the time t2 at which deceleration of the learning starting predetermined value ΔNm1 or more starts as the deceleration starting time rotational frequency Nms, and when the control unit 17 detects that the rotational frequency Nm of the main shaft 65 momentarily becomes the rotational frequency substantially equal to the deceleration starting time rotational frequency Nms while engaging the change clutch 61, the control unit 17 may store the time period between the time t4 at the time of detection and the time t2 at which deceleration of the learning starting predetermined value ΔNm1 or more starts as the driving force removal time period V1m.

Further, the above described embodiments are described with the motorcycle and the four-wheeled vehicle cited as examples as the vehicles, but the present invention is not limited to this, and the present invention may be applied to a tricycle and the like.

REFERENCE SIGNS LIST 10, 310 Motorcycle (vehicle)
13, 313, 413 Rear wheel
13a Hub
13c Spoke (damper member)
15 Chain (damper member)
17, 317 Control unit (Control device)
21, 321, 421 Engine
23 Crankshaft
25, 325, 425 Automatic transmission device
52 Intake pipe
53 Throttle valve
60, 360, 460 Transmission
61, 361, 461 Change clutch (clutch)
65, 365, 465 Main shaft
65a Main shaft rotational frequency sensor
66, 366, 466 Countershaft
67b Drive gear (drive side shifter gear)
67b1, 67c1 Dog tooth
67c Drive gear (drive side free gear)
67Dc Dog clutch
68b Driven gear (driven side free gear)
68b1, 68c1 Dog tooth
68c Driven gear (driven side shifter gear)
68Dc Dog clutch
72 Drive sprocket
73 Countershaft rotational frequency sensor
75 Shift motor (actuator)
76 Shift spindle (clutch operation member)
79 Shift spindle angle sensor (clutch operation amount detecting sensor)
215, 315 Driving force transmitting device
216 Driven sprocket
220 Hub damper (damper member)
304 Drive shaft
304a Outer pipe
304b Inner pipe
304c Damper rubber (damper member)
306 First bevel gear
307 Second bevel gear
308 Output shaft
309 Intermediate drive gear
331 Torque damper (cam damper)
361a Piston (clutch operation member)
375 Clutch actuator (actuator)

375a Hydraulic sensor (clutch operation amount detecting sensor)
410 Rough terrain traveling vehicle (vehicle)
417 Balloon tire (tire, damper member)
417b Block portion (damper member)
$\Delta Nm1$ learning starting predetermined value (predetermined value)
$\theta rls$ Clutch disengagement rotation angle (clutch disengagement operation amount)
Nc Rotational frequency (rotational frequency of countershaft)
Ne Engine speed (speed of engine)
Nm Rotational frequency (rotational frequency of main shaft)
Nmfin rotation difference absorption end rotational frequency (rotational frequency of main shaft at time of end of absorption of rotation difference)
Nmmin Minimum rotational frequency
Prls Clutch disengagement hydraulic pressure (clutch disengagement operation amount)
Th Predetermined opening degree
V1m Driving force removal time period

The invention claimed is:

1. A vehicle transmission device comprising a transmission including a main shaft to which rotational power from an engine is inputted via a clutch, and a countershaft to which rotational power of the main shaft is transmitted via a constant-mesh gear, a clutch operation member that is driven by an actuator and performs disengaging and engaging operations of the clutch, a clutch operation amount detecting sensor that detects an operation amount of the clutch operation member, a control device that operates the actuator, and a driving wheel to which rotational power of the countershaft is transmitted via a driving force transmitting device,
   wherein at least one of a main shaft rotation sensor that detects a rotational frequency of the main shaft, or a countershaft rotation sensor that detects a rotational frequency of the countershaft is provided,
   a damper member elastically deformed by a driving force is provided in at least any one of the countershaft, the driving force transmitting device and the driving wheel, or among the countershaft, the driving force transmitting device and the driving wheel, and
   the control device learns a clutch disengagement operation amount of the clutch operation member when the control device detects deceleration of a predetermined value or more of the rotational frequency of the main shaft or the rotational frequency of the countershaft during clutch disengagement operation.

2. The vehicle transmission device according to claim 1, wherein a throttle valve that adjusts an intake air amount by being opened and closed is provided in an intake pipe that supplies intake air to the engine, and learning of the clutch disengagement operation amount is executed when an opening degree of the throttle valve is a predetermined opening degree or more.

3. The vehicle transmission device according to claim 1, wherein an operation of the clutch operation member is performed at a time of a speed change operation, and the control device stores a minimum rotational frequency of the main shaft or the countershaft after occurrence of the deceleration of the predetermined value or more, and determines propriety of learning of the clutch disengagement operation amount, by comparing a rotational frequency of the main shaft or the countershaft at a time of end of absorption of a rotation difference of the clutch and the minimum rotational frequency.

4. The vehicle transmission device according to claim 1, wherein the transmission of a constant-mesh type is a dog clutch type transmission including a dog clutch provided to be engageable and disengageable by a drive side shifter gear that rotates integrally with the main shaft and is movable in an axial direction, a drive side free gear that is rotatable relatively to the main shaft and is fixed in the axial direction, and dog teeth that are provided to be raised in the axial direction from opposing surfaces of the drive side shifter gear and the drive side free gear, and a dog clutch provided to be engageable and disengageable by a driven side shifter gear that rotates integrally with the countershaft and is movable in the axial direction, a driven side free gear that is rotatable relatively to the countershaft and is fixed in the axial direction, and dog teeth that are provided to be raised in the axial direction from opposing surfaces of the driven side shifter gear and the driven side free gear, and
   the deceleration of the predetermined value or more is detected from the rotational frequency of the main shaft.

5. The vehicle transmission device according to claim 4, wherein the rotational frequency of the main shaft is a value obtained by multiplying an actual rotational frequency of the main shaft detected by the main shaft rotation sensor by a deceleration ratio between the main shaft and a crankshaft of the engine, and
   when the control device detects that the rotational frequency of the main shaft momentarily becomes a rotational frequency substantially equal to an engine speed of the engine while engaging the clutch, the control device calculates a time period between a time of the detection and a time at which the deceleration of the predetermined value or more starts, as a driving force removal time period.

6. The vehicle transmission device according to claim 1, wherein the driving force transmitting device comprises a drive sprocket provided at a side of the countershaft, a driven sprocket provided at a side of the driving wheel, and a chain that is wound between the drive sprocket and the driven sprocket, and
   the damper member is provided between a hub of the driving wheel and the driven sprocket.

7. The vehicle transmission device according to claim 1, wherein the driving force transmitting device comprises a first bevel gear provided at a side of the countershaft, a second bevel gear provided at a side of the driving wheel, and a drive shaft provided between the first bevel gear and the second bevel gear,
   and the damper member is provided between an outer pipe and an inner pipe that configure the drive shaft.

8. The vehicle transmission device according to claim 1, wherein an output shaft is provided separately from or integrally with the countershaft, and the damper member is configured as a cam damper provided at a side of the output shaft.

9. The vehicle transmission device according to claim 1, wherein a block portion is integrally formed on a tire of the driving wheel, and the damper member is configured by the block portion.

10. The vehicle transmission device according to claim 1, wherein the tire of the driving wheel is a balloon tire with an air pressure of 70 kPa or less.

* * * * *